United States Patent
Konomura et al.

[11] Patent Number: 5,697,885
[45] Date of Patent: Dec. 16, 1997

[54] ENDOSCOPE FOR RECORDING AND DISPLAYING TIME-SERIAL IMAGES

[75] Inventors: Yutaka Konomura, Tachikawa; Takao Tsuruoka; Kazunari Nakamura, both of Hachioji; Tetsuo Nonami, Tama; Keiichi Hiyama, Akishima; Akihiko Yajima, Kunitachi, all of Japan

[73] Assignee: Olympus Optical Co., Ltd., Tokyo, Japan

[21] Appl. No.: 382,579

[22] Filed: Feb. 2, 1995

Related U.S. Application Data

[62] Division of Ser. No. 331,874, Nov. 1, 1994, abandoned, which is a continuation of Ser. No. 111,057, Aug. 24, 1993, abandoned, which is a continuation of Ser. No. 400,317, Aug. 29, 1989, abandoned.

[30] Foreign Application Priority Data

| Jan. 30, 1989 | [JP] | Japan | 1-20246 |
| Jan. 31, 1989 | [JP] | Japan | 1-23451 |
| Mar. 30, 1989 | [JP] | Japan | 1-81807 |
| Apr. 27, 1989 | [JP] | Japan | 1-108035 |
| Jun. 30, 1989 | [JP] | Japan | 1-168746 |

[51] Int. Cl.$^6$ ...................... A61G 1/04
[52] U.S. Cl. .............. 600/109; 348/220; 348/65
[58] Field of Search ............... 600/921, 118, 600/109, 160; 364/413.13; 358/335; 348/220

[56] References Cited

U.S. PATENT DOCUMENTS

| 4,009,331 | 2/1977 | Goldmark et al. | 358/335 |
| 4,712,133 | 12/1987 | Kikuchi | 348/74 |
| 4,727,417 | 2/1988 | Kanno et al. | 348/74 |
| 4,819,059 | 4/1989 | Pape | 348/220 |
| 5,034,888 | 7/1991 | Uehara et al. | 364/413.13 |

Primary Examiner—Richard J. Apley
Assistant Examiner—John P. Leubecker
Attorney, Agent, or Firm—Armstrong, Westerman, Hattori, McLeland & Naughton

[57] ABSTRACT

An image recording apparatus which includes a time-serial image recording arrangement for recording time-serial images of an object, and still image filling arrangements for recoding a still image. The apparatus also includes an outputting arrangement capable of outputting an image information data of at least a part of the time-serial images to be recorded or having been recorded by the time-serial image recording arrangement, which is used as a standard for observing variations in the time-serial images of the object which occur with lapse of time. The outputting arrangement includes an extracting arrangement for extracting a selected feature of at least one image among the time-serial images as the image information to be a standard of the position and a composing arrangement for composing and outputting image information of the selected feature extracted by the extracting arrangement and for composing and outputting the time-serial images.

10 Claims, 45 Drawing Sheets

| PATIENT ID NUMBER | INSPECTION DATA AND TIME | RECORDING BEGINNING TRACK | RECORDING ENDING TRACK |
|---|---|---|---|
| 1037 | 1988-10-30-08-10.11 | (i) | (j-1) |
| 1025 | 1988-11-02-13-25.03 | (j) | (k-1) |
| 1181 | 1988-11-05-10-00.51 | k | |

INSPECTION A →
INSPECTION B →
INSPECTION C →

FIG.49

| COMMAND | PARAMETER | OPERATION |
|---|---|---|
| RECORDING MODE IS SET | — | REPRODUCTION OF IMAGE IS STOPPED AND HEAD IS MOVED TO TOP OF VACANT TRACK OF DISC TO ENABLE RECORDING TO START |
| STILL PICTURE IS RECORDED | — | IMAGE OF I FRAME IS RECORDED AND HEAD IS MOVED TO NEXT FRAME |
| RECORDING IS STARTED | — | MOVING PICTURE RECORDING IS STARTED. IF IN RECORDING, NOTHING IS DONE |
| RECORDING IS STOPPED | — | RECORDING IS STOPPED TO END RECORDING MODE. IF NOT IN RECORDING MODE, NOTHING IS DONE |
| TRACK IS SOUGHT | TRACK No. | HEAD IS MOVED TO DESIGNATED TRACK AND RECORDED IMAGE IS REPRODUCED TO BE STILL PICTURE. IF IN RECORDING MODE, NOTHING IS DONE. IF IN MOVING PICTURE REPRODUCTION, IT IS STOPPED AND THEN THIS IS CARRIED OUT |
| MOVING PICTURE IS REPRODUCED | — | REPRODUCTION OF MOVING PICTURE IS STARTED FROM PRESENT TRACK POSITION OF HEAD. IF IN THE RECORDING MODE, NOTHING IS DONE |
| MOVING PICTURE REPRODUCTION IS STOPPED | — | REPRODUCTION OF MOVING PICTURE IS STOPPED. IF NOT IN REPRODUCTION OF OF MOVING PICTURE, NOTHING IS DONE |
| STATE IS CHECKED | — | WHETHER IN ANY OF THE STATES THAT : 1.RECORDING MODE IS ON STANDBY, 2.RECORDING MODE IS IN RECORDING, 3.STILL PICTURE IS BEING REPRODUCED AND 4.MOVING PICTURE IS BEING REPRODUCED IS CHECKED AND THE STATE IS RETURNED |
| TRACK No. IS CHECKED | — | PRESENT TRACK POSITION OF HEAD IS RETURNED |

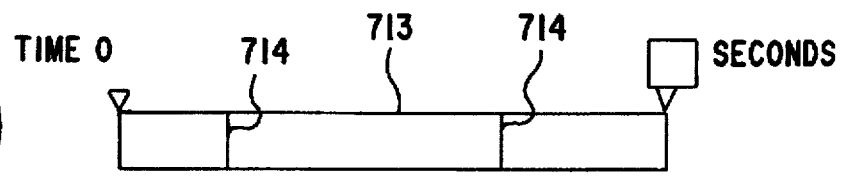
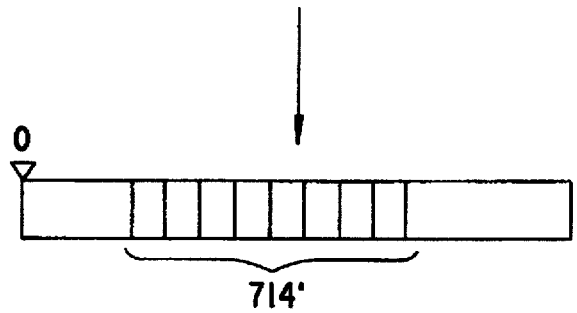
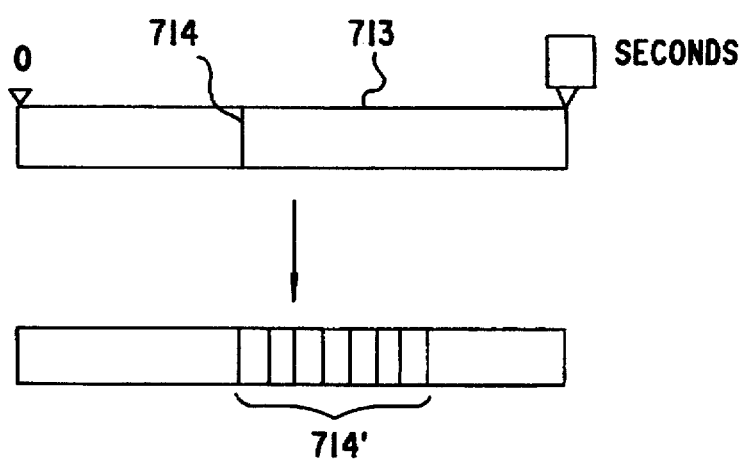
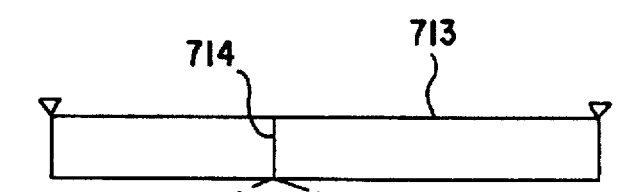
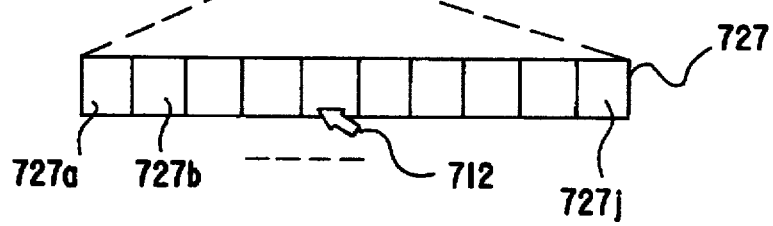

ENDOSCOPE FOR RECORDING AND DISPLAYING TIME-SERIAL IMAGES

This is a division of application Ser. No. 08/331,874 filed Nov. 1, 1994, now abandoned, which is a continuation of application Ser. No. 08/111,057 filed Aug. 24, 1993, now abandoned, which is a continuation of application Ser. No. 07/400,317, filed Aug. 29, 1989, now abandoned.

BACKGROUND OF THE INVENTION

1. Field of the Invention

This invention relates to an image recording apparatus for recording time-serial images and adapted to observe variations with the lapse of time of an object through these time-serial images and an endoscope observing apparatus adapted to observe variations with the lapse of time of the object.

2. Related Art Statement

Recently, an endoscope has become known whereby organs within a body cavity can be observed by inserting an elongate insertable part into the body cavity and various therapeutic treatments can be made by using treating instruments inserted through treating instrument channels as required.

Also, there are suggested various electronic endoscopes using such solid state imaging devices as charge coupled devices (CCD's) for imaging means.

Now, such apparatus wherein a fluorescent agent is administered to such part to be inspected as an internal organ, an exciting light is radiated to the fluorescent agent and a fluorescent image by the fluorescence issued from the above mentioned fluorescent agent is observed as is shown, for example, in the respective publications of Japanese utility model application laid open No. 173020/1984 and Japanese patent applications laid open Nos.114543/1987, 247232/1987 and 122421/1988 and in U.S. Pat. No. 4,821, 117 is known as an apparatus for inspecting the states of internal organs and the like of a human body by utilizing such endoscope.

One of the objects of the diagnosis by utilizing such fluorescent image is to find out a tumor part by discriminating a part issuing a fluorescence and a part issuing no fluorescent in one still image.

Now, the size of the fluorescence amount can be a parameter representing the amount of the agent having reached the object part during a fixed time after the fluorescent agent is administered. Therefore, such living body information as in the following can be obtained by observing the variations with the lapse of time of the fluorescence amount in the same part. First, the advance of the disease can be known by the variations with the lapse of time of the fluorescent intensity. Second, as a benign tumor and a malignant tumor are different in the time variations of the fluorescent intensity, the type can be judged by knowing the difference in the time variation. Third, such minor measurement in the circulating system as of the blood flow velocity can be made by the time difference until the fluorescence begins to issue in the respective parts. (In the part in which the blood flow velocity is high, the fluorescent substance circulates so fast that the time until the fluorescence issues is short.)

In the case of determining the variations with the lapse of time of the above mentioned fluorescence amount, it is considered to compare time-serial images, that is, a plurality of images taken at different times in the time of the same object. In microscope images and the like having no motion, by comparing the above mentioned time-serial images, it is possible to observe the variations with the lapse of time of the fluorescence amount and the like. However, in the endoscope, the object fluctuates and the visual field fluctuates and, in each of the time-serial images, the position of the same part is not fixed. This fact makes it difficult to observe the variations with the lapse of time of the same part in the endoscope image.

By the way, in the publication of Japanese patent application laid open No.57784/1985 is disclosed an apparatus wherein a visible image and an infrared image can be displayed as overlapped in any part on the picture. However, this apparatus is to overlap the visible image and infrared image taken at the same time but can not position each of the time-serial images.

Also, there are also known apparatus for recording and seeking time-serial images as are shown in the respective publications of Japanese patent applications laid open Nos. 43279/1987 and 6965/1988.

However, as described above, in the case of comparing time-serial images, with the conventional apparatus, a plurality of images separated in the time have not been able to be simultaneously displayed to be compared and observed.

In the endoscope inspection and the like, still images have been recorded and reproduced and it is desired to record and reproduce the above mentioned time-serial images together with such still images.

However, an apparatus for recording and reproducing time-serial images and an apparatus for recording and reproducing still images have respectively singly existed but there has been no apparatus handling time-serial images and still images simultaneously as related with each other. Therefore, there has been a defect that, in the case of seeking, for example, a desired image, the seeking will be troublesome.

Also, for example, a video disc recorder apparatus is known as an image recording apparatus. This is to record and reproduce video signals on the tracks of a photodisc and has features that both still pictures and moving pictures can be recorded and reproduced and further a random access to a specific frame of the image can be easily made.

Now, in the endoscope inspection, for example, in case, while noting the observed part, an agent is administered to the person to be inspected and the variations of the observed part by the agent are investigated, with the above mentioned video disc recorder apparatus, the moving picture will be recorded or the still image will be recorded intermittently at a predetermined timing and thereafter the images recorded as ordered by these time-series will be reproduced to make a more accurate observation.

By the way, in the publication of Japanese patent application laid open No.6965/1988 is shown an image seeking apparatus wherein a frame feeding to images and a frame feeding to images separated by a fixed number of images can be made by a simple operation.

In the case of making such endoscope inspection as is described above, it will be important to respectively reproduce and comparatively observe the image with which a fixed time has elapsed after the agent was administered and the image with which a fixed time has further elapsed after that. However, even a moving image record, for example, for several minutes will be several thousand frames. Therefore it has been difficult to correctly select and reproduce a desired image out of them.

Even if the technique disclosed, for example, in the publication of the above described Japanese patent application laid open No.6965/1988 is used, as the seeking of such image as is related in time is not considered, the above mentioned problem will not be solved.

OBJECTS AND SUMMARY OF THE INVENTION

An object of the present invention is to provide an image recording apparatus for recording time-serial images and making it easy to observe in detail the variations with the lapse of time of an object with these time-serial images.

Another object of the present invention is to provide an image recording apparatus for recording time-serial images and making it easy to observe the variations with the lapse of time of the same part in these time-serial images.

Further another object of the present invention is to provide an image recording apparatus for recording time-serial images and making it possible to simultaneously observe images separated in the time among these time-serial images.

Further another object of the present invention is to provide an image recording apparatus for recording time-serial images and still images and capable of recording and seeking said time-serial images and still images as related with each other.

Further another object of the present invention is to provide an image recording apparatus for recording time-serial images and correctly and quickly selecting a desired image out of these time-serial images.

Further another object of the present invention is to provide an endoscope observing apparatus for making it easy to observe the variations with the lapse of time of the same part in time-serial images.

The image recording apparatus of the present invention comprises a time-serial image recording means for recording time- serial images of an object and an outputting means capable of outputting the data of at least a part of the above mentioned time-serial images to be recorded or having been recorded in the above mentioned time-serial image recording means as made to correspond to the information related to the observation of the variations with the lapse of time of the above mentioned object. Also, the endoscope observing apparatus comprises an extracting means for extracting the feature of at least one image of the time-serial images and a composing means for composing and outputting the image information of the feature extracted by the above mentioned extracting means and the above mentioned time-serial images or comprises a recognizing means for making one image of the time-serial images an image to be a standard of the position and recognizing the identical part between this one image and the other images among the above mentioned time-serial images and a data outputting means for outputting the data of the part recognized to be the identical part by the above mentioned recognizing means among the above mentioned other images.

The other features and advantages of the present invention will become apparent enough with the following explanation.

BRIEF DESCRIPTION OF THE DRAWINGS

FIG. 1 is a block diagram showing the formation of an endoscope apparatus.

FIG. 2 is a side view showing the whole of an endoscope apparatus.

FIG. 3 is an explanatory view of a Laplacean matrix.

FIG. 4 is a block diagram showing the formation of a feature amount extracting circuit.

FIG. 5 is a block diagram showing the formation of an image processing part.

FIG. 6 is an explanatory view for explaining the positioning of an endoscope image.

FIG. 7 is a block diagram showing the formation of an endoscope apparatus.

FIG. 8 is an explanatory view showing a band limiting filter unit.

FIG. 9 is a block diagram showing the formation of an image processing apparatus.

FIG. 10 is a characteristic diagram showing the transmitted wavelength regions of respective filters of a rotary filter.

FIG. 11 is a characteristic diagram showing the transmitted wavelength region of one filter of a band limiting filter unit.

FIG. 12 is a characteristic diagram showing absorption and fluorescence characteristics of fluorescein.

FIGS. 13 to 15 are flow charts for explaining the operation of this embodiment.

FIG. 16 is a function block diagram of an image processing apparatus.

FIGS. 17 to 23 relate to the third embodiment of the present invention.

FIG. 17 is an explanatory diagram showing the schematic formation of an endoscope apparatus and image recording, seeking and displaying apparatus.

FIG. 18 is a block diagram showing the formation of an image recording and seeking apparatus.

FIG. 19 is an explanatory diagram showing the formation of an endoscope apparatus.

FIG. 20 is a flow chart showing a recording operation.

FIG. 21 is a flow chart showing a seeking operation.

FIG. 22 is an explanatory diagram showing a displaying example of a monitor.

FIG. 24 is an explanatory view showing the schematic formation of an endoscope apparatus and image recording, seeking and displaying apparatus.

FIG. 25 is a block diagram showing the formation of an image recording, seeking and displaying apparatus.

FIG. 26 is an explanatory view showing the formation of the whole of an image filing system.

FIG. 27 is a block diagram showing the internal formation of an image filing controller.

FIG. 28 is an explanatory diagram showing the formation of an endoscope apparatus.

FIG. 29 is an explanatory diagram showing one row of information data recorded temporarily in the memory part in the case of recording images of one inspection.

FIG. 30 is a block diagram showing the internal formation of an image filing controller.

FIG. 31 is a block diagram showing the formation of a video signal editing part.

FIG. 32 is an explanatory view showing a monitor picture in which still pictures are multi-displayed in the case of seeking.

FIG. 33 is an explanatory view showing a monitor picture in which time-serial images are multi-displayed.

FIG. 34 is a flow chart showing a processing process in a seeking mode.

FIG. 35 is an explanatory view showing the formation of the whole of an image filing system.

FIG. 36 is a block diagram showing the internal formation of an image filing controller.

FIG. 37 is a block diagram showing an example of a recording controlling memory part.

FIG. 38 is a flow chart showing a processing process in a recording mode.

FIGS. 39 to 51 relate to the eighth embodiment of the present invention.

FIG. 39 is an explanatory diagram showing the whole of an endoscope image recording and reproducing system.

FIG. 40 is an explanatory view showing a track of a photodisc.

FIG. 41 is an explanatory view showing control items of a data base.

FIGS. 42 to 45 are flow charts for explaining the operation of an endoscope image recording and reproducing system.

FIG. 46 is an explanatory view showing a command menu picture.

FIG. 47 is an explanatory view showing a search menu picture.

FIG. 48 is an explanatory view showing a computer display picture at the time of a frame seeking.

FIG. 49 is a table of commands of a video disc recorder apparatus.

FIG. 50 is a function block diagram showing a main formation of this embodiment.

FIG. 51 is an explanatory view showing a seeking menu picture in a modification of this embodiment.

FIG. 54 is an explanatory diagram showing the whole of an endoscope image recording and reproducing system.

FIG. 55 is an explanatory view showing pictures displayed in the second television monitor.

FIGS. 56 to 58 relate to a modification of the eighth to tenth embodiments.

FIGS. 56 and 57 are views for explaining another method of designating a plurality of seeking positions.

FIG. 58 is a view for explaining a method of more minutely designating frames.

DETAILED DESCRIPTION OF PREFERRED EMBODIMENTS

FIGS. 1 to 6 show the first embodiment of the present invention.

Figures 2, 3:
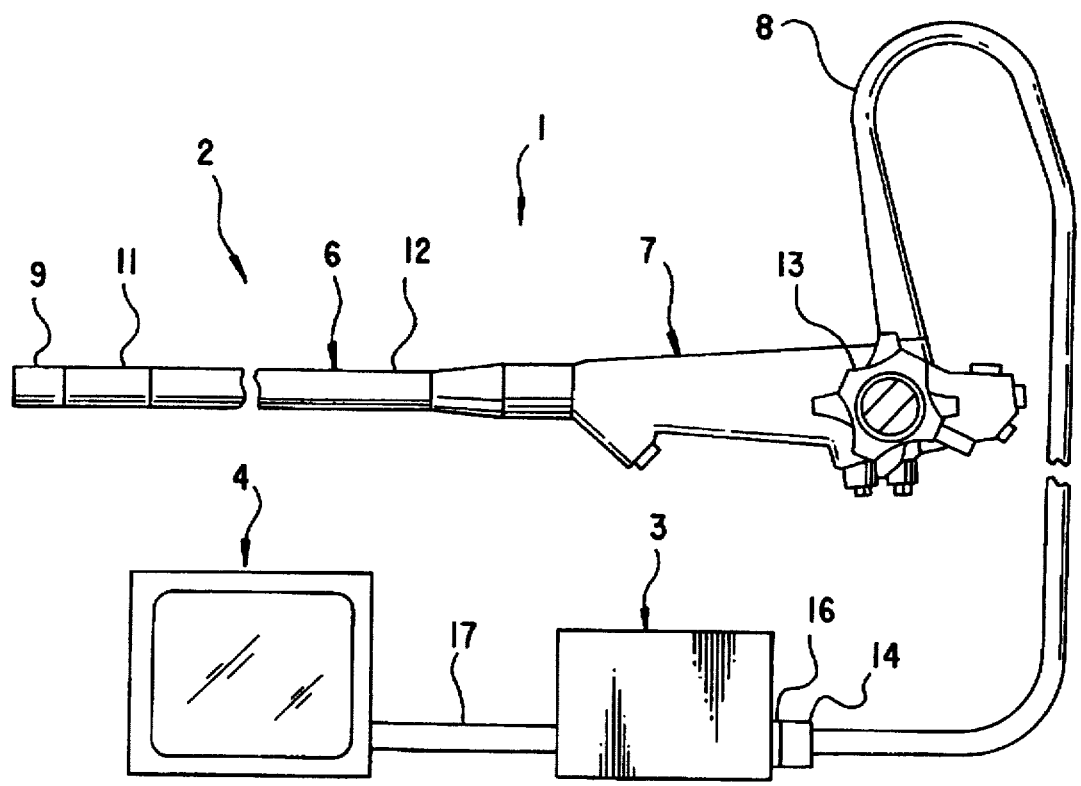

In FIG. 2, an endoscope apparatus 1 of this embodiment comprises an electronic endoscope 2, an endoscope image processing apparatus 3 having a light source part feeding an illuminating light to this endoscope 2 and a signal processing part processing an electric signal delivered from the endoscope 2 and a monitor 4 as a displaying means displaying on a picture a video signal output from this endoscope image processing apparatus 3.

The above mentioned endoscope 2 comprises elongate insertable part 6, a thick operating part connected to this insertable part on the rear end side carrying a universal cord 8 for a light guide and signals which extends from the side of this operating part 7.

A rigid tip part 9 is provided on the tip side of the above mentioned insertable part 6 and a curvable part 11 is provided on the rear side adjacent to this tip part 9. Further, a flexible soft part 12 is provided in the rear of this curvable part 11. The above mentioned curvable part 11 can be curved in the vertical and horizontal directions by operating a curving operation knob 13 provided on the above mentioned operating part 7.

A connector 14 for a light guide and signals is provided at the rear end of the above mentioned universal cord 8 and is connected to a connector receptacle 16 of the above mentioned image processing apparatus 3.

The above mentioned endoscope image processing apparatus 3 is connected with the above mentioned monitor 4 by a signal cable 17.

Figure 1:
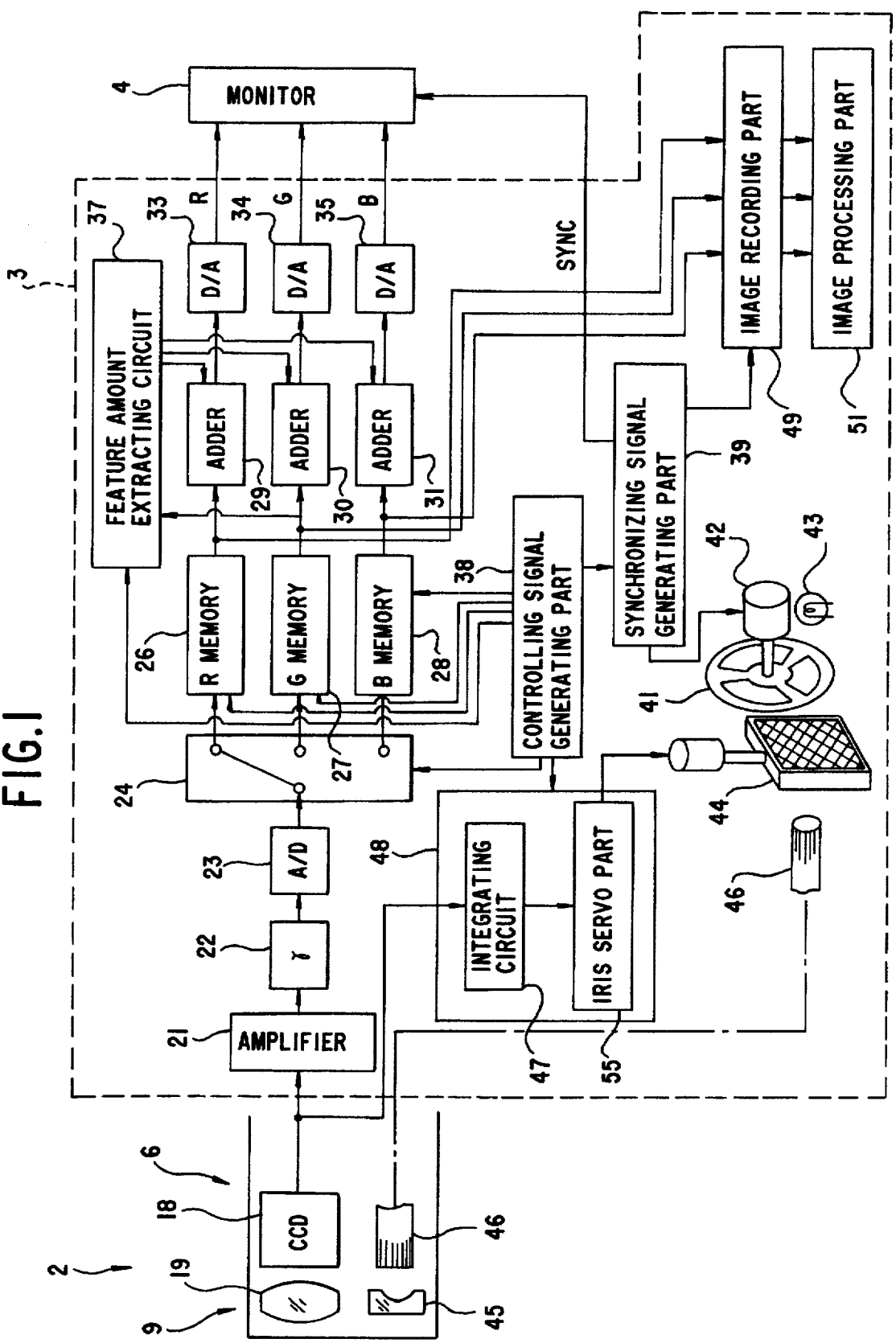
FIGS. 1 to 6 relate to the first embodiment of the present invention.

In FIG. 1, a solid state imaging device 18 (which shall be abbreviated as a CCD hereinafter) is provided in the tip part 9 and converts to an electric signal an optical image of a living body obtained through an objective lens system 19. The output signal from the CCD 18 is input into an amplifier 21 to be amplified to an electric signal in a predetermined range (for example, 0 to 1 volt). The amplifier 21 is connected to a switching switch 24 through a γ-correcting circuit 22 and A/D converter 23. Three outputs of the switching switch 24 are led respectively to an R memory 26, G memory 27 and B memory 28 to memorize color signals from the switching switch 24. The respective RGB memories 26, 27 and 28 are connected to D/A converters 33, 34 and 35 which analogize the respective RGB color signals and output them to the monitor 4.

By the way, the output of the G memory 27 is output not only to an adder 30 but also to a feature amount extracting circuit 37.

On the other hand, a control signal generating part 38 controlling into which of the memories 26, 27 and 28 the image signal is to be written and controlling the transfer timing at the time of transferring the image signal is provided and is connected to the switching switch 24, respective RGB memories 26, 27 and 28 and feature amount extracting circuit 37. The control signal generating part 38 is connected also to a synchronizing signal generating circuit 39 from which a synchronizing signal SYNC for the above mentioned RGB color signals is output to the monitor 4.

Also, the control signal generating part 38 is connected to a motor 42 driving a filter 41 forming a light source part which has a light source lamp 43 generating an illuminating light. The illuminating light emitted from this light source lamp 43 passes through the above mentioned RGB filter 41 and is sequentially separated into RGB color lights. These separated illuminating lights are radiated to the entrance end surface of a light guide 46 through a mesh filter 44. This light guide 46 leads to the tip part 9 of the endoscope 2 and the illuminating lights transmitted through the light guide 46 are radiated to a part to be inspected by a light distributing lens system 45.

The output electric signal from the above mentioned CCD 18 is input into an iris adjusting mechanism part 48 consisting of an integrating circuit 47 and iris servo part 55 and connected also with the above mentioned control signal generating part 38.

The above mentioned R, G and B memories are connected on the output side also to an image recording part 49 as an image recording means. This image recording part 49 is connected to the above mentioned synchronizing signal generating circuit 39 and an image processing part 51.

Figure 4:
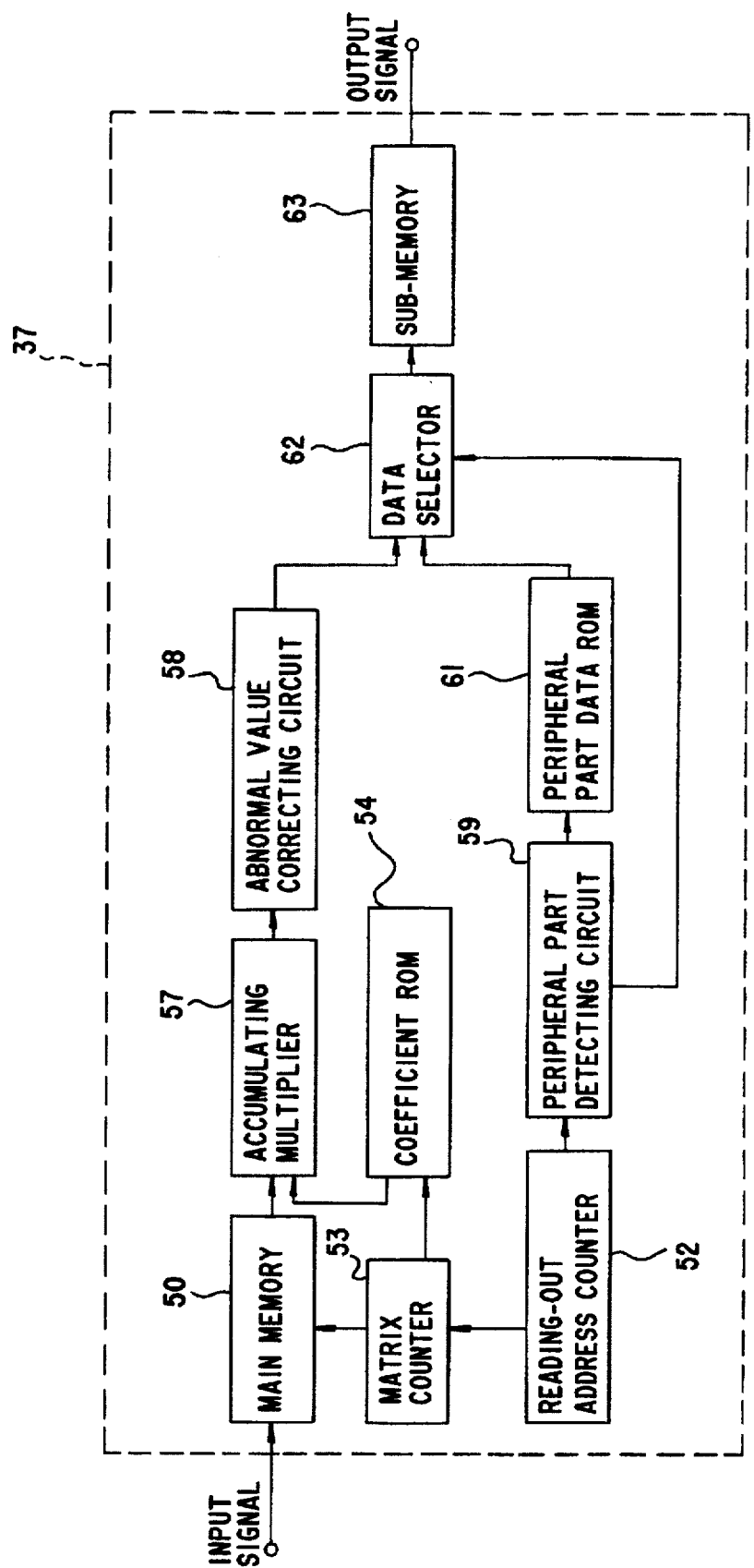

In FIG. 4, the video signal input into the feature amount extracting circuit 37 is memorized in a main memory 50 which is connected to a matrix counter 53 controlled by a reading-out address counter 52 which is a counter for reading out noted pixels on this main memory 50. This matrix counter 53 generates an address of a matrix of 9×9 with a noted pixel 56 as a center as shown in FIG. 3 in order to operate the noted pixels. The matrix counter 53 is connected with a coefficient ROM 54 memorizing the respective coefficients of the matrix in FIG. 3. This coefficient ROM 54 is connected to an accumulating multiplier 57 accumulating and multiplying respectively the pixel data in the range of 9×9 with the noted pixel 56 as a center read out of the above mentioned main memory 50 and the coefficients of the above mentioned coefficient ROM 54. The accumulating multiplier 57 is connected to an abnormal value correcting circuit 58 which will correct the value of this accumulating multiplier 57 in case the operation result is out of a predetermined dynamic range.

Also, a peripheral part detecting circuit 59 controlled by the reading-out address counter 52 is provided to detect the peripheral part of video data and is connected to a peripheral data ROM 61 generating video data of the peripheral part and a data selector 62 which switches the video data from the peripheral part data ROM 61 and the video data from the abnormal value correcting circuit 58 on the basis of the detecting signal of the above mentioned peripheral part detecting circuit 59. The video data selected by this data selector 62 are memorized by a sub-memory 63 connected to the above mentioned adders 29, 30 and 31.

Figure 5:
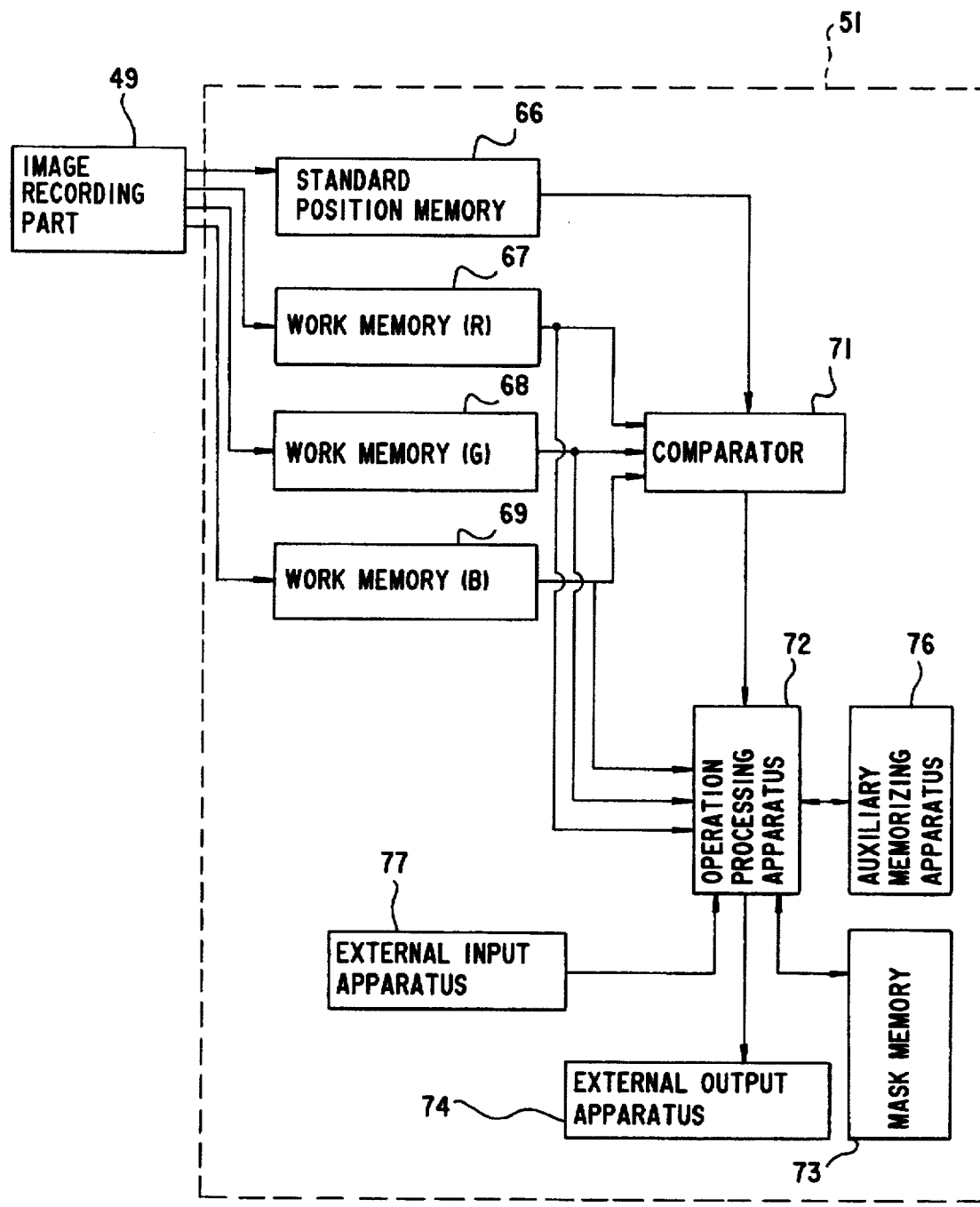

In FIG. 5, the above mentioned image processing part 51 has a standard position memory 66 memorizing an initial image which is the video data from the image recording part and is provided with a work memory (R) 67, work memory (G) 68 and work memory (B) 69 in addition to this standard position memory 66. The standard position memory 66 and the respective work memories 67, 68 and 69 are connected to a comparator 71 so that a comparison with the image memorized in the standard position memory 66 may be made.

The above mentioned comparator 71 is connected to an operation processing apparatus 72 which will make a valuing process to obtain a fluorescence information after the position displacement is corrected by a signal from the comparator 71. This operating processing apparatus 72 is connected with a mask memory 73, such external output apparatus 74 as a printer and monitor, such auxiliary memorizing apparatus 76 as a magnetic disc and such external input apparatus 77 as a mouse by which a noted part in the image is designated.

The operation of the endoscope image processing apparatus formed as mentioned above shall be explained.

The CCD 18 provided in the tip part 9 of the insertable part 6 inserted into a body cavity electrically converts an object image and outputs it as an image signal which is converted by the amplifier 21 to be of a voltage in a predetermined range, for example, of 0 to 1 volt in this embodiment. This image signal is input into the γ-correcting circuit 22, is converted to an image signal having a predetermined γ characteristic and is then digitalized by a quantumizing level (for example, 8 bits) in the A/D converter 13. Then, by a control signal from the control signal generating part 3 through the switching switch 24, the optical image entering the CCD 18 will be memorized in the R memory 26 in the case of the red (R) illumination, in the G memory 27 in the case of the green (G) illumination and in the B memory 28 in the case of the blue (B) illumination. The inputs and outputs of the respective memories 26, 27 and 28 are independent and can be made respectively by their own timings. The R, G and B color signals output from the respective memories 26, 27 and 28 are transferred respectively to the D/A converters 33, 34 and 35 through the adders 29, 30 and 31. The image signals from the D/A converters 33, 34 and 35 are output to the monitor 4 as RGB image signal outputs together with the synchronizing signal SYNC made in the synchronizing signal generating circuit 39 under the control by the control signal generating part 38 to display the object image on the monitor 4 picture. The signals on the respective memories 26, 27 and 28 of RGB are recorded in the image recording part 49 under the control by the synchronizing signal generating circuit 39 at predetermined intervals (for example, at 30 frames per second) with the lapse of time. The image recording part 49 is a large capacity recording medium such as, for example, a photodisc or magnetic disc.

On the other hand, from the control signal generating part 38, a motor controlling signal is transmitted to the RGB rotary filter 41. The motor 42 rotates and drives the RGB rotary filter 41 in conformity with the switching timing of the switching switch 24 by the control signal. The illuminating light from the light source lamp 43 is separated by the RGB rotary filter 41 into three color lights of red (R), green (G) and blue (B) which pass through the light guide 46 and are then led to the light guide 46. This illuminating system is a so-called RGB frame sequential color system.

Also, the signal from the CCD 18 is connected to an iris adjusting mechanism part 48. The integrating circuit 47 within the iris adjusting mechanism 48 integrates the RGB signals by the control signal from the control signal generating part 38 and transfers them as light amount values to an iris servo part 55 which controls the mesh filter 44 on the basis of the light amount value to adjust the light amount.

Here, the framing of the monitor 4 is made to be always in the same state to observe or record the variations with the lapse of time of the object image displayed in the monitor 4. That is to say, when the object image to be observed or recorded is displayed in the monitor 4, the control signal will be input into the feature amount extracting circuit 37 by a switch or the like not illustrated. By this control signal, the feature amount extracting circuit 37 extracts the outline component of the image data.

In FIG. 4, when this control signal is input, the feature amount extracting circuit 37 will memorize in the main memory 50 the G color signal from the G memory 26. When the address of the noted pixel 56 is designated by the reading-out address counter 52, the image data memorized in the main memory 50 will multiply this noted pixel 56 and its adjacent pixels by the respective coefficients of the Laplacean matrix shown in FIG. 3.

This operation shall be explained. The matrix counter 53 sequentially designates the addresses of the pixels in the square of 9×9 pixels with the noted pixel 56 as a center of the image data memorized in the main memory 50. The pixel data designated by the matrix counter 53 are read out of the main memory 50 and are input into the accumulating multiplier 57. The addresses designated by the matrix counter 53 simultaneously with them are input into the coefficient ROM 504 in which the respective coefficients shown in FIG. 3 are stored so that the coefficients corresponding to the input addresses may be read out and input into the accumulating multiplier 57. This accumulating multiplier 57 sequentially multiplies the pixel data of 9×9 with the noted pixel 56 as a center read out of the main memory by the coefficients corresponding to the pixel data read out of the coefficient ROM 54, accumulates and adds them and outputs the values to the abnormal value correcting circuit 58 which detects the values operated by the accumulating multiplier to see whether they are within the dynamic range in the case of displaying and will correct the values in case they are abnormal values outside the dynamic range so as to be values within the dynamic range.

On the other hand, in case the noted pixel 56 is in the peripheral part of the image, the pixel data on the periphery of the noted pixel 56 will be absent and therefore no correct operation will be made. Therefore, the peripheral part is detected in the peripheral part detecting circuit 59 by the address value of the reading-out address counter 52 and the peripheral data are read out of the peripheral part data ROM 61 and are input into the data selector 62. Here, the data selector 62 will select an output from the abnormal value correcting circuit 58 in case a correct operation is made for the noted pixel 56 but will select data from the peripheral part data ROM 61 and output them to the sub-memory 63 in case, because of the peripheral part, no correct operation is made.

When such operation as is mentioned above is made, the outline component of the image will be able to be extracted. The feature amount extracting circuit 37 outputs this outline component as a feature amount.

Figure 6:
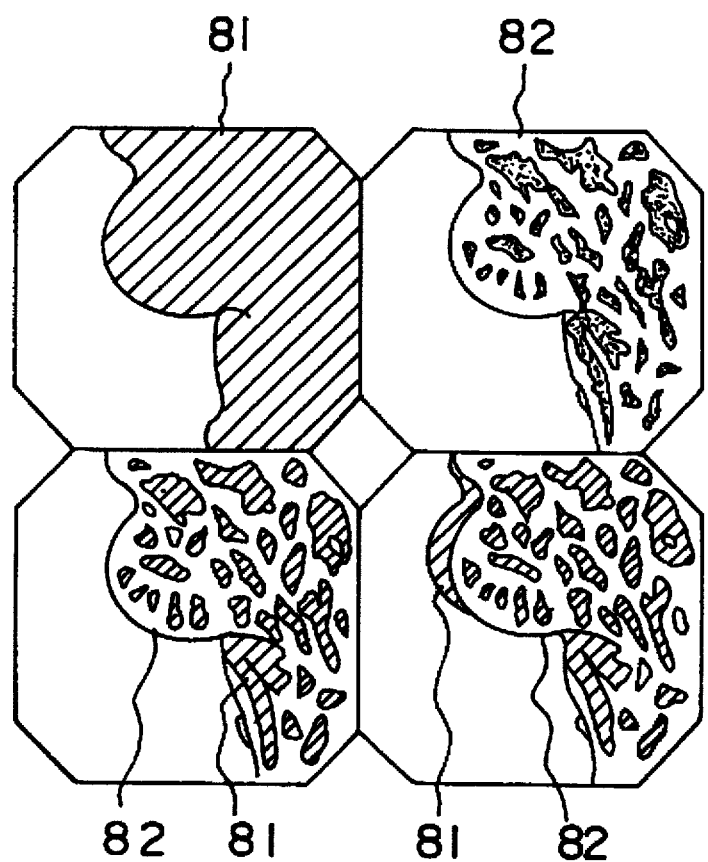

The image data memorized in the sub-memory 63 are output as a feature amount to the adders 29, 30 and 31 in which the feature amount is composed in the R, G and B color signals input from the respective memories 26, 27 and 28 and these composed signals are input into the monitor 4 and are displayed as shown below in FIG. 6. By the way, FIG. 6 is a view showing how to determine a position displacement. Here, in FIG. 6, the upper left view is an original showing an object image 81 memorized in the main memory 50, the upper right view shows an image 82 showing a feature amount, that is, an outline component extracted from the object image 81, the two lower views show the combinations of the image 82 showing the feature amount and the original object image 81, the lower left view is of the case where there is no position displacement and the lower right view is of the case that there is a position displacement. If the image in the monitor 4 has such position displacement as in the lower right view in FIG. 6, the framing should be adjusted by the curving operation or the like of the endoscope 2 until the image 82 showing the feature amount and the object image 81 overlap each other as in the lower left view in FIG. 6. By this compounded image display, it is possible to manually prevent the generation of a position displacement and to make uniform the imaging conditions of an object image by always using the same framing with the monitor 4.

The image thus manually coarsely adjusted in position is output to the image recording part 49 and is recorded. Further, these recorded video data are output to the image processing part 51. The image used to extract the feature amount among the video data is transferred to the standard position memory 66 and the subsequent images are transferred to the work memories 67, 68 and 69. In order to be Positioned more precisely than is coarsely Positioned on the monitor 4 as mentioned above, the video signal is trans The to a comparator 71.

The comparator 71 determines the differences between the picture on the standard position memory 66 and the images on the work memories 67, 68 and 69 and transfers the total sum of the absolute values to the operating processing apparatus 72. The difference determination in this case is made by displacing the images on the work memories 67, 68 and 69 by a predetermined size (for example, by 2, 4, 6, 8 or 19 pixels) in a predetermined direction (for example, in the vertical or horizontal direction or four directions). The operating processing apparatus 72 judges on the basis of the signal from the comparator 71 that, when the total sum value becomes minimum, the position displacement will be nil and records the direction and size at that time. Thereafter, in the case of the operation by images, the correction will be made on the basis of this direction and size.

From the external input apparatus 77, the noted part in the images is designated by such pointing device as a mouse. The operating processing apparatus 72, memorizes this region information into the memory 73 for a mask of 1 bit.

In the operating processing apparatus 72, at the time point when the above mentioned process ends, the valuing process will be made. For example, fluorescein which is one of a number of fluorescent substances is excited by a light of a short wavelength to issue a fluorescence. In the RGB frame sequential color system, only at the time of the illumination of B, a fluorescence will be issued. Therefore, by normalizing the image of R generating no fluorescence, only the fluorescence information can be obtained. In the operating processing apparatus 72, B or R is operated for the region designated by the mask memory 73 and the average value is output to such external output apparatus 74 as a printer or monitor or such auxiliary memorizing apparatus 76 as a magnetic disc. When such valuing process is sequentially made for the images on the image recording part 49, the variations with the lapse of time will be able to be objectively obtained as numerical values.

In this embodiment, as the object image can be photographed and recorded with always the same framing, the variations with the lapse of time of the object image part can be precisely known. When such fluorescent substance having a strong affinity with tumors as a hematoporphyrin derivative (HPD) is administered to the patient and the tumor is observed with an endoscope, the variations with the lapse of time of the intensity of the fluorescence and the time at which the fluorescence begins to issue can be known.

When, as in this embodiment, for at least one of a plurality of video signals forming images, any image is registered as an initial image and, has its feature amount determined and then displayed as composed with an ordinary video signal, the standard position will be made clear and the photographing conditions will be made uniform so that the image may be well recorded.

When the recorded image is further positioned at a high precision and then the variations with the lapse of time of the designated region are determined as numerical values, a detailed diagnosis information can be obtained from the variations with the lapse of time of the endoscope images. Thereby, the diagnosis based on the numerical value data is possible and it is easy to accumulate and analyze medically important information. By extracting a specific part of the video signal by combining the numerical data, the abnormal part and normal part can be discriminated and the difference between the abnormal parts can be made definite.

By the way, in this embodiment, the frame sequential type electronic endoscope has been described but the endoscope may be an electronic endoscope or may be an optical endoscope fitted with an externally fitted TV camera and having an image guide by optical fibers.

Also, only the G image has been used for the feature amount extraction but all the RGB images may be used and a colorful feature amount may be used. A point or line to be a standard of the position may be displayed in the monitor picture by using a pointing device.

As explained above, according to this embodiment, when the feature amount and a plurality of images varying time-serially are displayed, by investigating the variations with the lapse of time of moving pictures, detailed living body information can be obtained.

FIGS. 7 to 16 show the second embodiment of the present invention.

The schematic formation of the endoscope apparatus of this embodiment is the same as of the first embodiment shown in FIG. 4.

Figure 7:
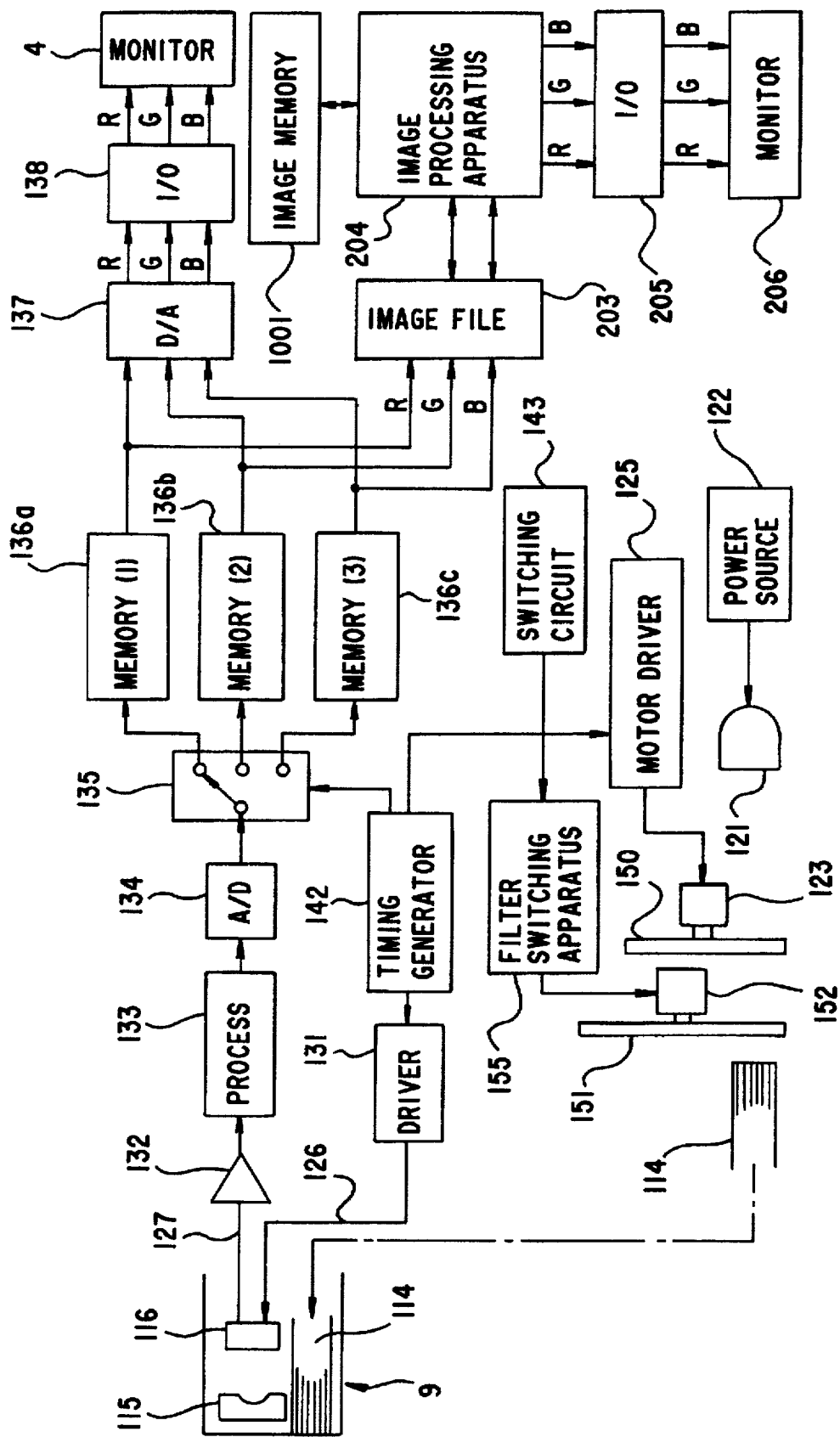
FIGS. 7 to 16 relate to the second embodiment of the present invention.

In this embodiment, as shown in FIG. 7, a light guide 114 transmitting an illuminating light is inserted through an insertable part 6 of an endoscope 2 and is arranged on the tip surface in a tip part 9 of the insertable part 6 so that the illuminating light may be emitted from this tip part 9- Also, the above mentioned light guide 114 is inserted on the entrance end side through a universal cord 8 and is connected to a connector 14. An objective lens system 115 is provided in the above mentioned tip part 9. A solid state imaging device 116 is arranged in the image forming position of this objective lens system 115 and has a sensitivity in a wide wavelength band ranging from an ultraviolet region to an infrared region including a visible region. Signal lines 126 and 127 are connected to the above mentioned solid state imaging device 116, are inserted through the above mentioned insertable part 6 and universal cord 8 and are connected to the above mentioned connector 14.

Figure 10:
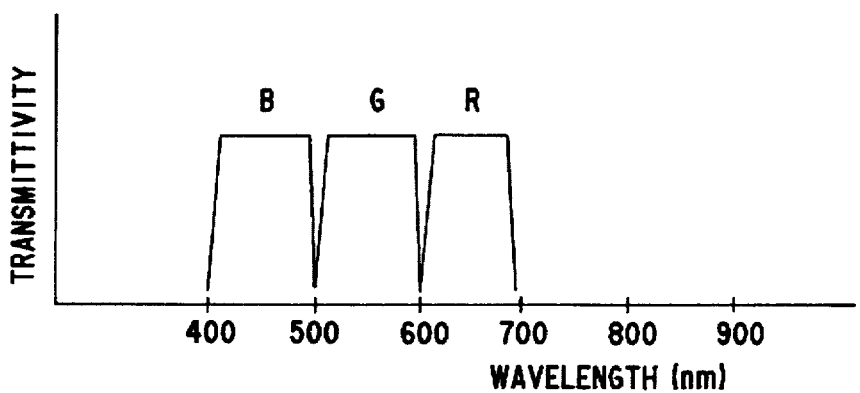

On the other hand, a lamp 121 issuing a light in a wide band ranging from ultraviolet rays to infrared rays is provided within an endoscope image processing apparatus (which shall be mentioned as the video processor hereinafter) 3 and may be a general xenon lamp or strobo-scope which issues not only a visible light but also ultra-violet rays and infrared rays in a large amount. This lamp 121 is fed with an electric power by a power source part 122. A rotary filter 150 rotated and driven by a motor 123 is arranged in front of the above mentioned lamp 121. Filters transmitting respectively the lights in the respective regions of red (R), green (G) and blue (B) for ordinary observation are arranged in the peripheral direction in this rotary filter 150. The transmittive characteristics of the respective filters of this rotary filter 150 are shown in FIG. 10.

Also, the above mentioned motor 123 is driven as controlled in the rotation by a motor driver 125.

Figure 8:
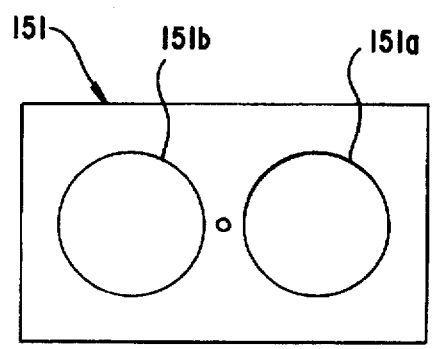
Figure 11:
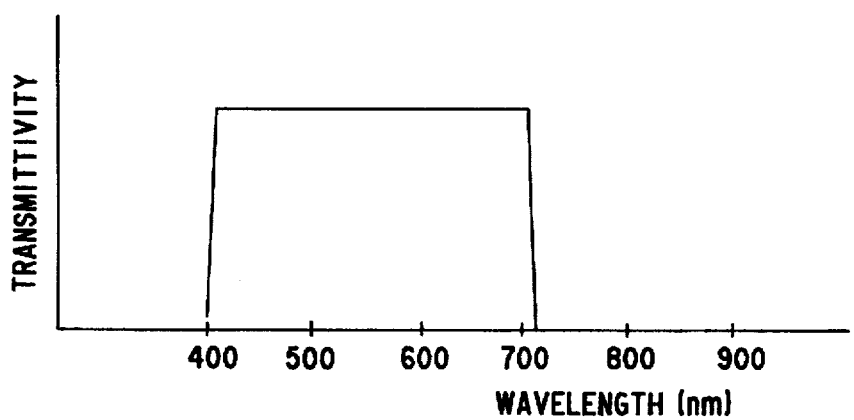

A wavelength limiting filter unit 151 is arranged in the illuminating light path between the above mentioned rotary filter 150 and light guide 114 entrance end. As shown in FIG. 8, this wavelength limiting filter unit 151 has a filter 151a transmitting only the visible light region as shown in FIG. 11 and a filter (which may be a hole) 151b transmitting all the lights issued by the lamp 121 or cutting the regions not required for the observation and for exciting a fluorescent agent. This wavelength limiting filter unit 151 is rotated by a motor 152 controlled in the rotation by a filter switching apparatus 155 which is controlled by a control signal from a switching circuit 143. When the observing wavelength is selected by the above mentioned switching circuit 143, the motor 152 will be rotated so that, of the respective filters 151a and 151b of the above mentioned wavelength limiting filter unit 151, the filter corresponding to the wavelength selected by the above mentioned switching circuit 143 may be interposed in the illuminating light path and the position of the above mentioned wavelength limiting filter unit 151 will be changed.

The light having passed through the above mentioned rotary filter 150 and time serially separated into the lights of the respective wavelength regions of R, G and B further passes through the selected filter of the above mentioned wavelength limiting filter 151, is emitted to the entrance end of the above mentioned light guide 114, is led to the tip part 9 through this light guide 114 and is emitted from this tip part 9 to illuminate the observed part.

The light returning from the observed part by this illuminating light is made to form an image on the solid state imaging device 116 by the objective lens system 115 and is photoelectrically converted. A driving pulse from a driver circuit 133 within the above mentioned video processor 3 is applied to this solid state imaging device 116 so that reading-out and transfer may be made by this driving pulse. The video signal read out of this solid state imaging device 116 is input into a pre-amplifier 132 provided within the above mentioned video processor 3 or electronic endoscope 2. The video signal amplified by this pre-amplifier 132 is input into a processing circuit 133, is subjected to such signal processing as the γ correction and white balancing and is converted to a digital signal by an A/D converter 34. This digital video signal is selectively memorized in three memories, memory (1) 136a, memory (2) 136b and memory (3) 136c corresponding to the respective colors, for example, of red (R), green (G) and blue (B) by a selecting circuit 135. The signals in the above mentioned memory (1) 136a, memory (2) 136b and memory (3) 136c are simultaneously read out, are converted to analogue signals by a D/A converter 137 and are input as R, G and B signals into the color monitor 4 through an input and output interface 138 so that the observed part may be color-displayed by this color monitor 4.

A timing generator 142 timing the entire system is provided within the above mentioned video processor 3 so that such respective circuits as the motor driver circuit 125, driver circuit 131 and selecting circuit 135 may be synchronized by this timing generator 142.

In this embodiment, the digital R, G and B signals output from the above mentioned memories (1 to 3) 136a to 136c are input and recorded in an image file 203 which has a function of being able to take in images intermittently at designated intervals and is connected with an image processing apparatus 204 controlling this image file 203 and making various processes described later. An image memory 1001 is connected to the above mentioned image processing apparatus 204. Also, a monitor 206 is connected to the above mentioned image processing apparatus 204 through an input and output interface 205 so that the images and operating process results required in the case of processing in the above mentioned image processing apparatus 204 may be displayed.

Figure 9:
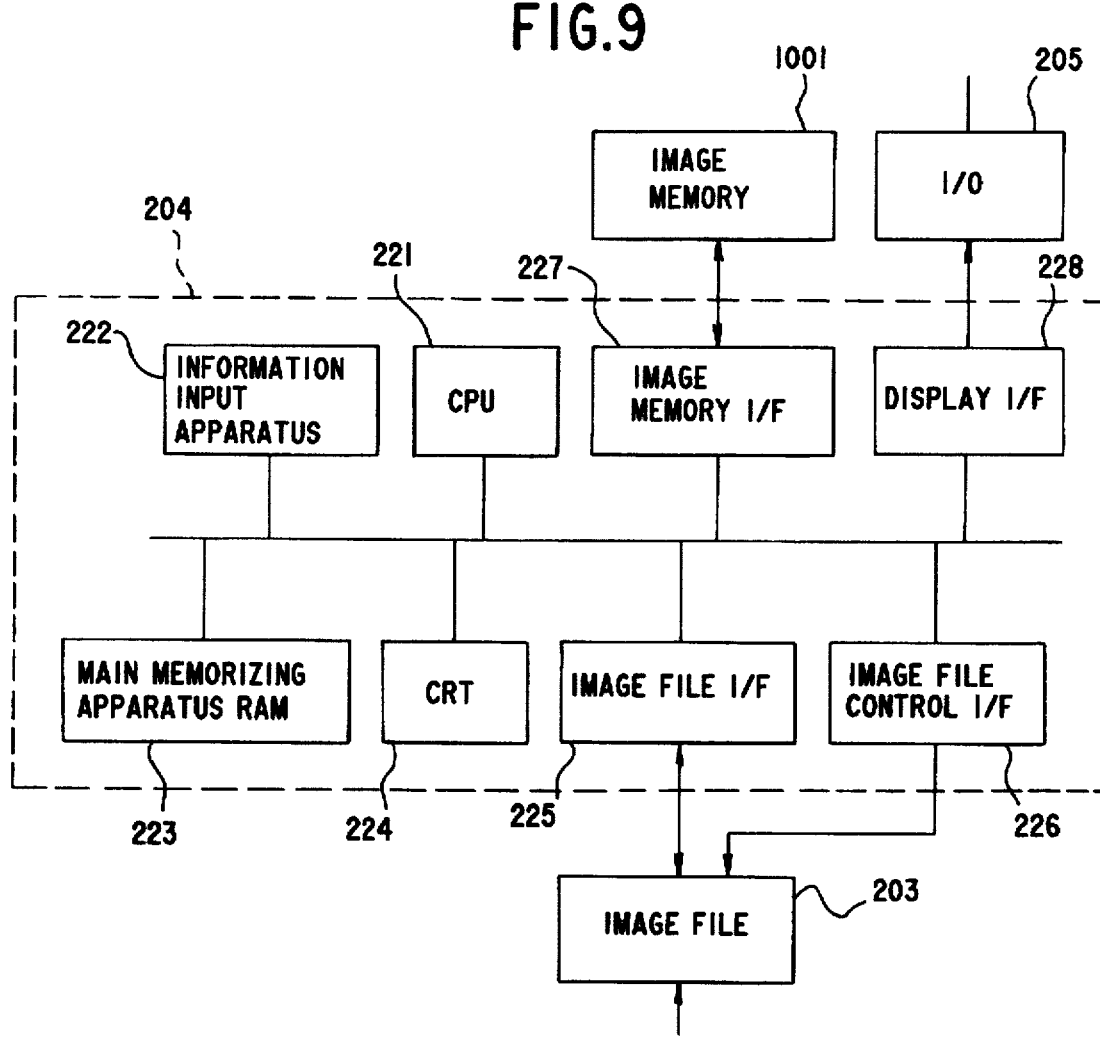

The above mentioned image processing apparatus 204 is formed as shown in FIG. 9.

That is to say, the image processing apparatus 204 comprises a CPU 221, an information inputting apparatus 222, a main memorizing apparatus 223 consisting of an RAM, a CRT 224, an image filing interface 225, an image filing controlling interface 226, an image memory interface 227 and a display interface 228 which are connected with one another through buses. The above mentioned information input apparatus 222 includes not only a keyboard but also such pointing devices as a mouse and digitizer. The image filing interface 225 and image filing controlling interface 226 are connected to the image file 203 so as to transmit and receive respectively image data and control signals. Also, the above mentioned memory interface 227 is connected to an image memory 1001 so as to transmit and receive image data. The above mentioned display interface 228 is connected to the input and output interface 205 so as to transmit image data input into the monitor 206.

In this embodiment, the time-serial images of the inspected object part obtained with the electronic endoscope 2, for example, by intravenously injecting a fluorescent agent into a living body, that is to say, a plurality of images different in the time of the same object part are recorded in the image file 203. The above mentioned image processing apparatus 204 detects a corresponding point to a standard image on the respective time-serial images recorded in the above mentioned image file 203, further corrects the light amount and calculates the variation amount (with the lapse of time) corresponding to the amount of the fluorescent agent of the same observed point.

Here, before explaining the operation and function of the above mentioned image processing apparatus 204, the corresponding point detecting method, light amount correcting method and variation amount calculating method used in this embodiment shall be explained.

First of all, the corresponding point detecting method shall be explained. In this embodiment, a template matching method utilizing a correlation is used. That is to say, a local region having an observing point P in the center is taken out of a reference image (which shall be mentioned as the first image hereinafter) and shall be called a template. This template is considered to contain the information of a local region having an observing point P in the center. Then, within the second image after the lapse of a predetermined time after the time of obtaining the above mentioned first image, a local region having the information most similar to the above mentioned template is sequentially sought. This operation is called a template matching.

As a means of evaluating the similarity of the local region within the second image to the template cut out of the first image, a normalized correlation is used in this embodiment. This shall be explained in the following. The template image shall be represented by T(L,M) and the local region within the second image shall be represented by B (L,M). (L,M) represents the size of the local region. The correlation coefficient C between the template image T and the local region B is determined by the following formula:

$$C = (1/LM) \sum_{m}^{M} \sum_{l}^{L} (T(l,m) - \bar{T})(B(l,m) - \bar{B}) \div (\sigma_T \sigma_B)^{1/2} \quad (1)$$

where $$\bar{T} = (1/LM) \sum_{m}^{M} \sum_{l}^{L} (T(l,m)),$$

-continued $$\bar{B} = (1/LM) \sum_{m}^{M} \sum_{l}^{L} (B(l,m)),$$

$$\sigma_T = (1/LM) \sum_{m}^{M} \sum_{l}^{L} (T(l,m) - \bar{T})^2 \text{ and}$$

$$\sigma_B = (1/LM) \sum_{m}^{M} \sum_{l}^{L} (B(l,m) - \bar{B})^2.$$

The larger the similarity between the template region T and local region B, the higher the value taken by this correlation coefficient C. Therefore, within the second image, this local region B is sequentially moved, the value of the correlation coefficient C in each position is determined and the center point of the local region in which this C shows the highest value is made the position of the observing point P in the second image.

The data for detecting the corresponding point shall be described in the following.

In the case of a frame sequential system electronic endoscope, when such fluorescent agent as, for example, fluorescein is used, as described later, the influence of the fluorescent agent will be detected as a variation of the B image. On the other hand, the variation of the R and G images by the fluorescent agent is comparatively slight. Therefore, in this embodiment, for the detection of the corresponding point between the images, the R and G images small in the variation are used.

The variations likely to occur between the time-serial images are considered to be not only the variation under the influence of the fluorescent agent but also the variation of the visual field by the movement of the endoscope tip, the variations of the visual field and shape by the motion of the living body and the variation of the reflecting state of the surface. In order to automatically detect the corresponding point by avoiding the influence of these variations as much as possible, the information inherent to the living body (the information hard to vary by the movement or the like of the endoscope tip) had better be utilized as much as possible as an information for detecting the corresponding point. From this viewpoint, it is considered to utilize G/R (or R/G) as original data to detect the corresponding point between the images. However, the values of the R and G data mentioned here are of the data after the influence of the gamma correction is removed. Also, in case the visual field fluctuation in the original time-serial image is not so large, the influence of the light amount variation will be considered to be small enough and the data of G or R may be used as they are. However, in such case, the R component in the ordinary endoscope image will be so little in the high frequency component that the precision of detecting the corresponding point will reduced. Therefore, to detect the corresponding point, the G image had better be used. In this embodiment, to detect the corresponding point, the G image is used but, in case a favorable correlation is obtained, the G/R value or the like may be used.

According to such method as is mentioned above, the corresponding point can be detected not only for the movement by the fluctuation of the visual field but also for the deformation of the image by the rotation, the motion of the living body and the like, if slight.

In order to investigate the fluctuations of the data at the time of obtaining the first image at the observing point P and at the time of obtaining the second image, the respective values of the RGB at the observing point P in the second image determined by the above mentioned method may be compared with the respective values of the RGB at the observing point in the first image, for example, as follows.

The respective values of the RGB at the observing point P in the first image shall be represented by ($r_1$, $g_1$ and $b_1$) and the respective values of the RGB at the observing point P in the second image shall be represented by ($r_2$, $g_2$ and $b_2$). As the variation by the fluorescent agent will not substantially appear, by using the value, for example, of G, the light amount (luminance) is corrected as follows:

$$r_2' = kr_2 \quad (2)$$

$$g_2' = kg_2 \quad (3)$$

$$b_2' = kb_2 \quad (4)$$

$k = g_1/g_2$.

The values ($r_2'$, $g_2'$ and $b_2'$) may be made data of the observing point at the time of obtaining the second image.

When the position of the observing point P in a plurality of time-serial images is determined by designating the observing point p, the variation by the fluorescent agent of the spectral reflection factor at the observing point P will be able to be presumed. Also, an observing region is set in the first image and the corresponding point in the second image is determined by the above mentioned method for the respective points within the observing region. By substituting the RGB data values at that point (or the data values after the correction of the light amount) in the same coordinate positions as of the first image, what data the respective points within the observing region of the first image show in the second image can be shown by the image.

Also, from the time-serial data at the same observing point obtained by the corresponding point detection, by the following calculation, only the variation part by the fluorescent agent can be extracted. As the variation by the fluorescence is observed mostly in the B image, the B data are used in this calculation. The data at the time point of starting the intravenous injection of the fluorescent agent shall be represented by Po and the data (after the light amount correction) after t seconds after the start of the intravenous injection shall be represented by Pn. By the following calculation, the value showing the amount of the fluorescent agent having flowed into the mucous membrane surface layer is obtained:

$$fn = \log_{10}(Pn) - \log_{10}(Po) \quad (5)$$

By the way, the significance of taking the logarithm is to convert the amount to a linear amount against the variation of the concentration of the fluorescent agent from the variation of the luminance.

Further, by determining this value for the respective points within the observing region, only the variation by the fluorescent agent can be imaged.

Figure 14:
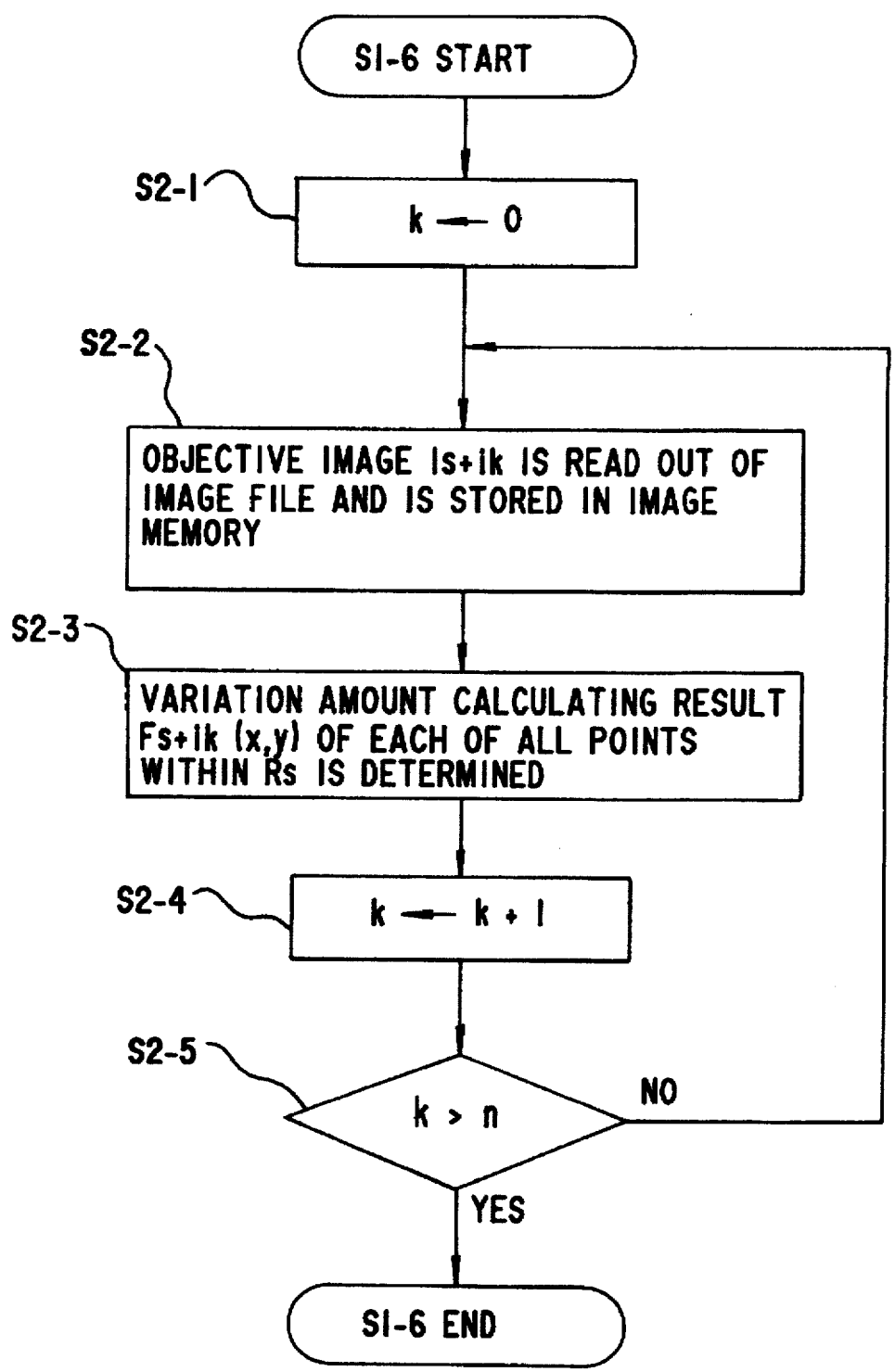
Figure 15:
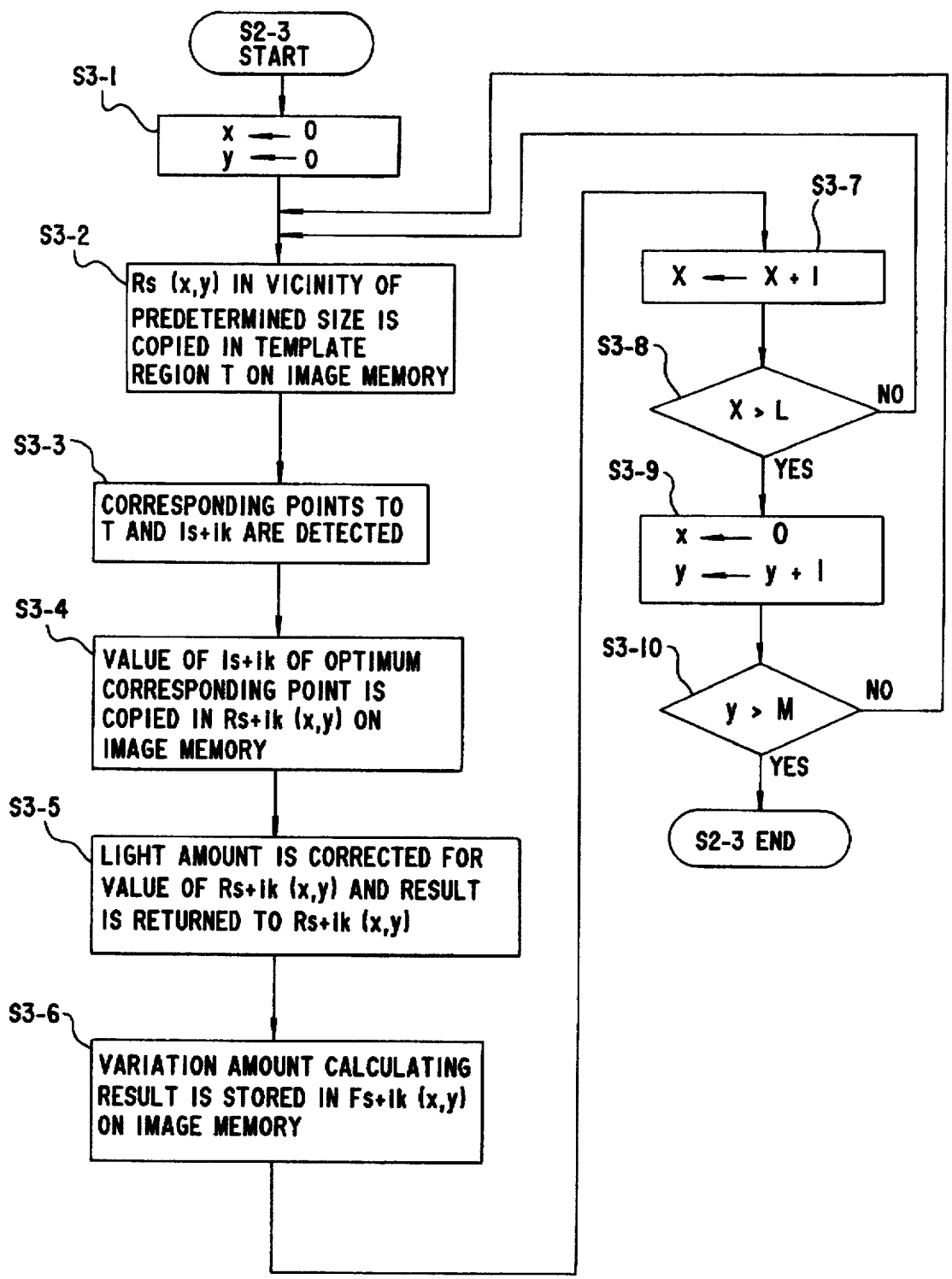

The operation and function of the image processing apparatus 204 shall be explained in the following with reference to FIGS. 13 to 15.

Figure 13:
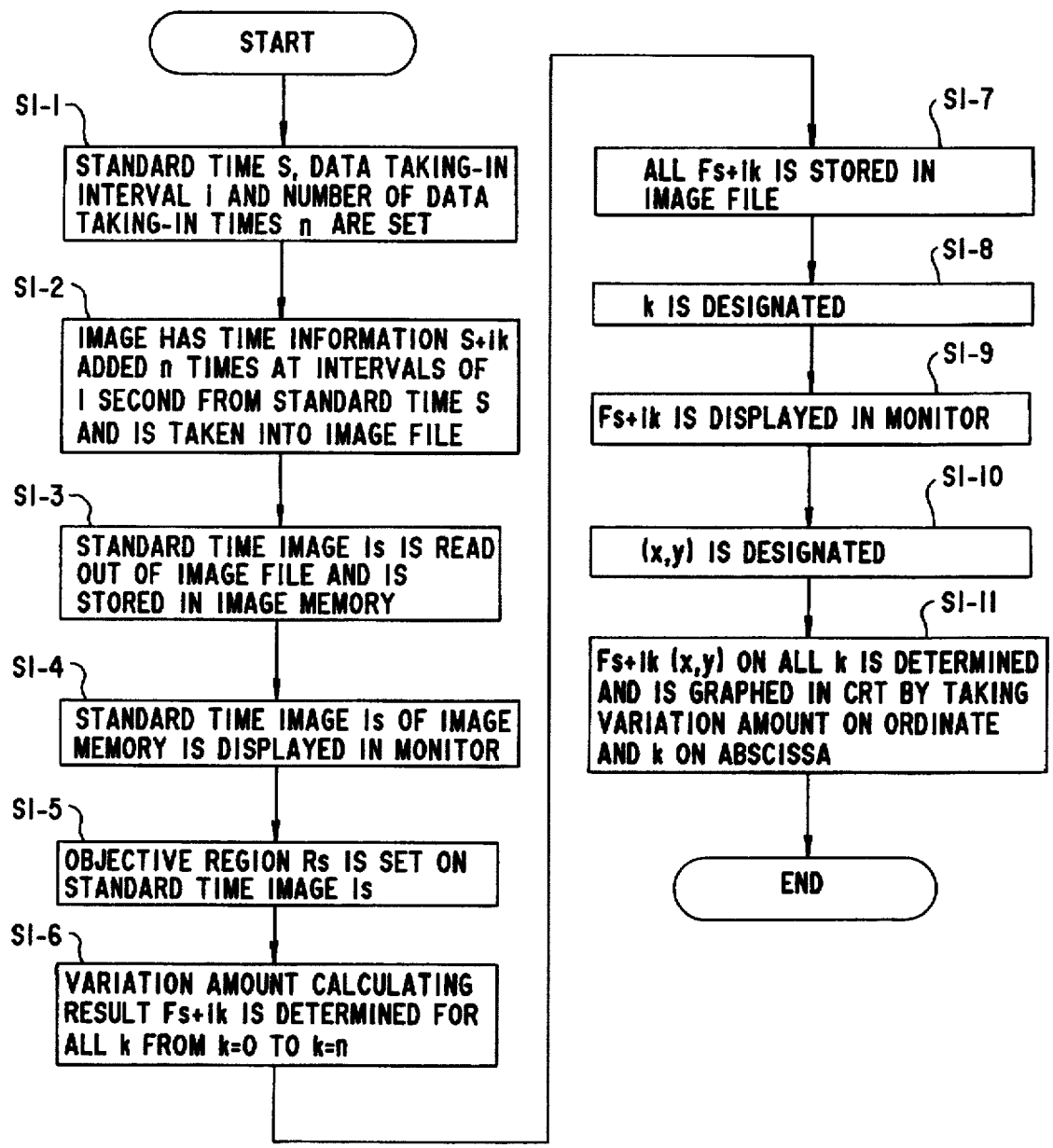

As shown in FIG. 13, when the operation is started, first, in the step S1-1 (which shall be mentioned as "S1-1" by omitting the word "step" hereinafter), the standard time s, data taking-in interval i and number n of data taking-in times are set by the information inputting apparatus 222.

Then, in S1-2, by the control of the image processing apparatus 204, the image has time information s+ik (wherein $0 \leq k \leq n$) added n times at the intervals of one second from the standard time s and is taken into the image file.

Then, in S1-3, the standard time image Is is read out of the image file 203 and is stored in the image memory 1001.

Then, in S1-4, the standard time image Is of the image memory 1001 is displayed in the monitor 206.

Then, in S1-5, by the information inputting apparatus 222, the objective region Rs is set on the standard time image Is. By the way, the image point within R shall be Rs (x, y). (x, y) represents the coordinate of the point.

Then, in S1-6, the variation amount calculating result Fs+ik is determined for all k from k=0 to k=n. By the way, this S1-6 is such sub-routine as is shown in FIG. 14.

Then, in S1-7, all Fs+ik is stored in the image file 203.

Then, in S1-8, k is designated by the information inputting apparatus 222.

Then, in S1-9, Fs+ik is displayed in the monitor 206. The variation amount image at any time is displayed.

Then, in S1-10, (x, y) is designated by the information inputting apparatus 222.

Then, in S1-11, Fs+ik (x, y) on all k is determined and is graphed in the CRT 224 by taking the variation amount on the ordinate and k on the abscissa.

The above mentioned sub-routine S1-6 to determine the variation amount calculating result Fs+ik shall be explained in the following by using FIG. 14.

When this sub-routine starts, first, in S2-1, 0 is substituted in k.

Then, in S2-2, the objective image Is+ik is read out of the image file 203 and is stored in the image memory 1001.

Then, in S2-3, the variation amount calculating result Fs+ik (x, y) of each of all the points (all (x, y)) within Rs is determined. By the way, this S2-3 is such sub-routine as is shown in FIG. 15.

Then, in S2-4, k+1 is substituted in k.

Then, in S2-5, k>n is judged, in the case of YES, the process ends and, in the case of NO, the process returns to the above mentioned S2-2. Thus, the variation amount calculating result Fs+ik is determined for all k.

The above mentioned sub-routine S2-3 to determine the variation amount calculating result Fs+ik (x, y) for all the points shall be explained in the following by using FIG. 15.

When this sub-routine starts, first, in S3-1, 0 is substituted respectively in x and y.

Then, in S3-2, Rs (x, y) in the vicinity of a predetermined size is copied in the template region T on the image memory 1001.

Then, in S3-3, the corresponding points to the template region T and objective image Is+ik are detected. In this corresponding point detection, the template region T is made T (L, M), the local region within the objective image Is+ik is made B (L, M), the local region B is sequentially moved within the objective image Is+ik, the value of the correlation coefficient C in each position is determined on the basis of the above mentioned formula (1) and the center point of the local region B in which this C shows the highest value is made the position of the optimum corresponding point in the objective image Is+ik.

Then, in S3-4, the value of Is+ik of the optimum corresponding point is copied in Rs+ik (x, y) on the image memory 1001.

Then, in S3-5, the light amount is corrected for the value of Rs+ik (x, y) and the result is returned to Rs+ik (x, y). In the above mentioned light amount correction, the respective values of the RGB of Rs (x, y) are made ($r_1$, g, and $b_1$), the respective values of the RGB of Rs+ik (x, y) are made ($r_2$, $g_2$ and $b_2$) and the values ($r_2'$, $g_2'$ and $b_2'$) after the correction are determined on the basis of the above mentioned formulae (2), (3) and (4).

Then, in S3-6, the variation amount calculating result is stored in Fs+ik (x, y) on the image memory 1001. By the way, in the variation amount calculation, fn=Fs+ik (x, y), Pn=Rs+ik (x,y) and Po=Rs (x, y) are made in the above mentioned formula (5) which is then carried out.

Then, in S3-7, x+1 is substituted in x.

Then, in S3-8, x>L is judged, in the case of YES, the process proceeds to S3-9 and, in the case of NO, the process returns to S3-2.

In the above mentioned S3-9, 0 is substituted in x and x+1 is substituted in y.

Then, in S3-10, y>M is judged, in the case of YES, the process ends and, in the case of NO, the process returns to the above mentioned S3-2.

Thus, the variation amount calculating results Fs+ik (x, y) are determined for all (x, y). Also, the variation amount calculating results Fs+ik (x, y) for all (x, y) are stored in Fs+ik (x, y) on the image memory 1001 and further, in S1-7, Fs+ik is stored in the image file 203 so that the image stored in the image file 203 may be modified so that the same object between the time-serial images may be in the same position on the image.

Figure 16:
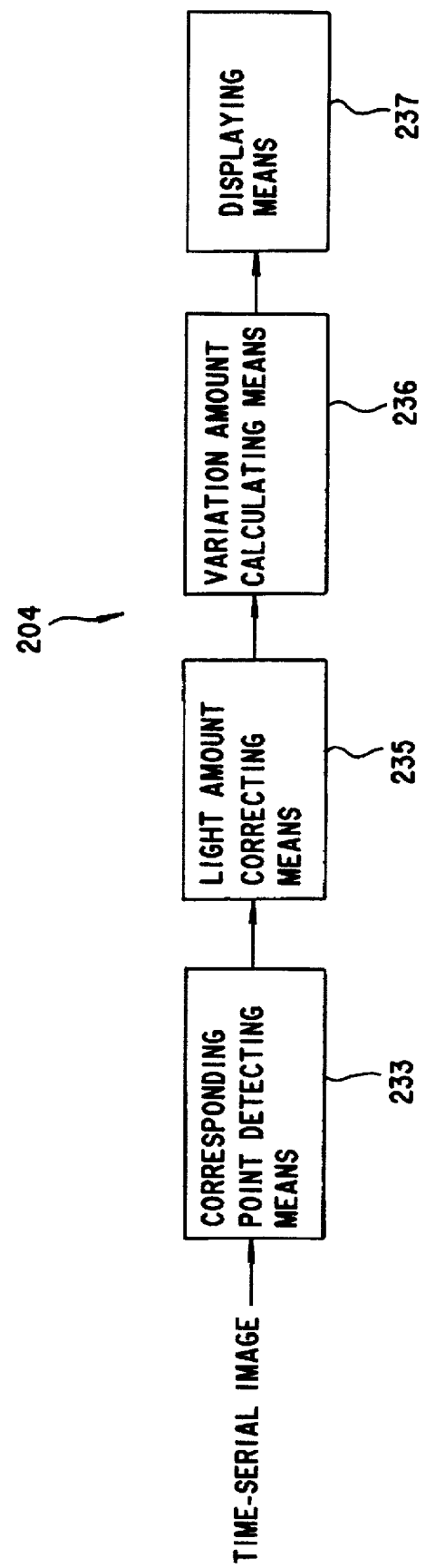

Such function of the image processing apparatus 204 as is in the above is shown by a block diagram in FIG. 16. That is to say, the image processing apparatus 204 comprises a corresponding point detecting means 233 for detecting a corresponding point of a template region to be a standard of the position and an objective image (time-serial image), a light amount correcting means 235 for correcting the light amount for the value of the corresponding point detected by this corresponding point detecting means, a variation amount calculating means 236 for calculating the variation amount from the value after the correction by this light amount correcting means 235 and a displaying means 237 for displaying the variation amount calculated by this variation amount calculating means 236. The above mentioned corresponding point detecting means 233 corresponds mostly to S3-3 in FIG. 15, the above mentioned light amount correcting means 235 corresponds mostly to S3-5, the above mentioned variation amount calculating means 236 corresponds mostly to S3-6 and the above mentioned displaying means 237 corresponds mostly to S1-9 and S1-11 in FIG. 13.

The operation of this embodiment shall be explained in the following.

In case the wavelength is limited as shown in FIG. 11 by the filter 151a of the wavelength limiting filter unit 151, the light emitting wavelength of the illuminating lamp 121 will be sequentially limited by the rotary filter 150 and will be color-separated into the lights of the respective wavelengths of R, G and B as shown in FIG. 10 and these lights will be time-serially radiated to a mucous membrane or the like of a living body. Color images of an ordinary visible light band are obtained by these lights.

Figure 12:
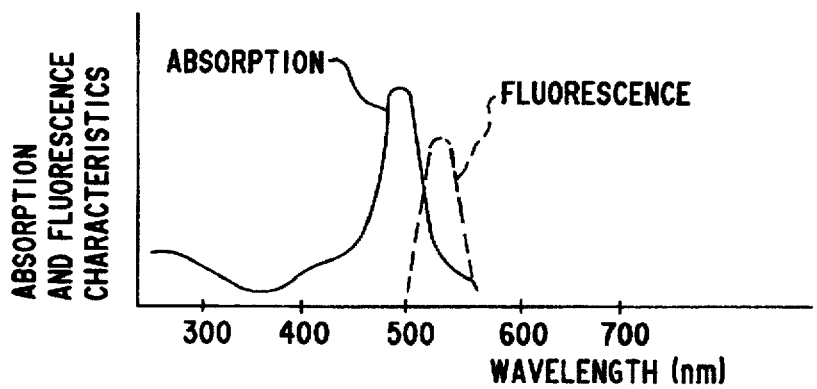

Now, when a fluorescent agent called fluorescein and having such absorption and fluorescence characteristics as are shown in FIG. 12 is intravenously injected into a living body membrane while being observed, the fluorescein concentration in the blood will vary with the variation with the lapse of time. This variation depends on the variation of the blood flow and the amount of the blood.

Here, as shown in FIG. 12, the above mentioned fluorescein has an absorption characteristic substantially coinciding with the wavelength region of B and issues a fluorescence of the wavelength region of G by absorbing this light. Therefore, in case the lights of the respective wavelength regions of R, G and B are time-serially transmitted by the rotary filter 150, at the time of the illumination by R and G, the fluorescence will be weaker than at the time of the illumination by B. That is to say, at the time of the B illumination, if the concentration of fluorescein in the mucous membrane is high, this mucous membrane will issue a fluorescence and at the time of processing the signal, at the time of the timing of B, a fluorescence will be issued. Therefore, irrespective of the wavelength of the fluorescence, it will be processed as a variation of the B image. That is to say, the B component in the color image will be increased by the fluorescence. Therefore, the concentration distribution and the variation with the lapse of time of fluorescein can be observed by the variation of the tone.

By the way, in this embodiment, in observing a fluorescence, it is not always necessary to switch the wavelength limiting filter unit 151 to the filter 151b side. Also, the wavelength limiting filter unit 151 is not always necessary.

In this embodiment, the RGB images are recorded as time-serial images in the image file 203. Such processes as the corresponding point detection, light amount correction and variation amount calculation are made as described above by the image processing apparatus 204 and, as a result, an image of the variation amount at any time and a graph of the variation amount at a designated point at all times are displayed.

Thus, according to this embodiment, as the same part of each of the time-serial images obtained by the electronic endoscope 2 is recognized and the image data of this same part are output, even with the endoscope image in which the position of the same part is not fixed, the variations with the lapse of time of the fluorescence amount in the same part can be observed and measured.

Also, as not only the corresponding point is detected but also the light amount is corrected, the influence of the difference of the brightness can be eliminated.

Therefore, according to this embodiment, the variations with the lapse of time of the information by a fluorescence or, for example, the time variations of the distribution of a fluorescent agent on the mucous membrane after it is intravenously injected can be more accurately observed and measured.

When the variations with the lapse of time of the mucous membrane after the intravenous injection of the fluorescent agent are thus observed or measured to catch the blood movement on the mucous membrane of the living body, the capacity of observing and diagnosing the affected part will improve.

Also, according to this embodiment, even if the fluorescence issued by the fluorescent agent is not in the visible light region, the information by the fluorescence will be able to be observed as the variation of the tone of the image.

By the way, the fluorescent agent may be adriamycin, hematoporphyrin or pheophorbide a. When the frame sequential light including the light of the absorbed wavelength band of the fluorescent agent to be used is radiated to the inspected part, the part will be able to be observed as a variation of the tone of the fluorescence.

The present invention can be applied generally not only to the case of determining the variations with the lapse of time of a fluorescent agent but also to the case of determining the variations with the lapse of time of the spectral reflection factor or the like of the same part.

Also, the image may be processed as hardware.

This embodiment can be applied not only to an electronic endoscope having a solid state imaging device in the tip part of the insertable part but also to the eyepiece part of such endoscope with which a naked eye observation is possible as a fiber-scope or to an endoscope to which a television camera can be connected in exchange for the above mentioned eyepiece part.

As explained above, according to this embodiment, there are such effects that, as the same part of each of time-serial images is recognized and the image data of this same part are output, the image data of the same part of the time-serial images obtained by the endoscope can be obtained and the variations with the lapse of time of the identical part can be observed.

FIGS. 17 to 23 show the third embodiment of the present invention.

Figure 17:
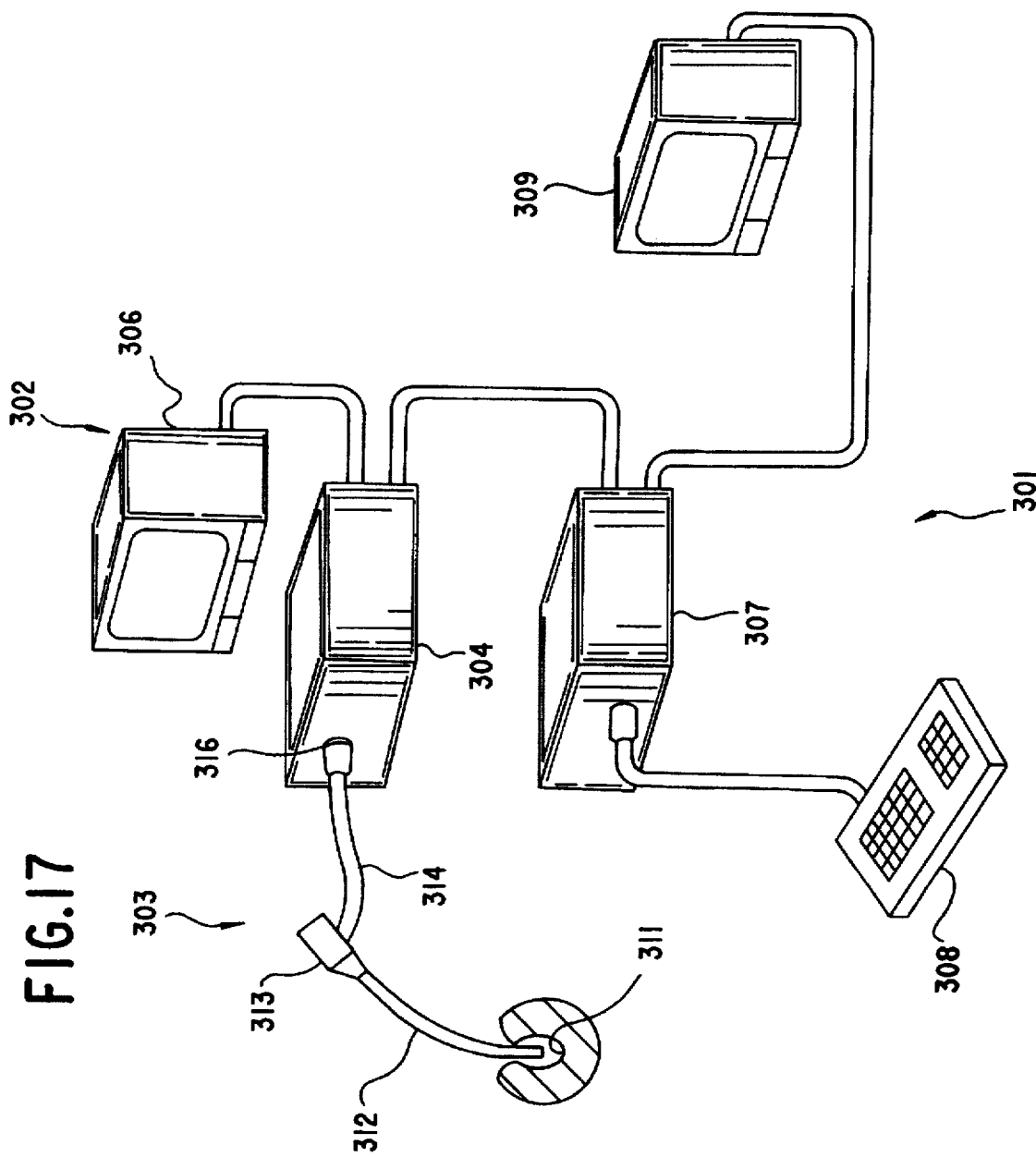

In FIG. 17, an image recording, seeking and displaying apparatus 301 is connected to an endoscope apparatus 302 so that an endoscope image may be recorded and sought.

The above mentioned endoscope apparatus 302 comprises an electronic endoscope 303, an image inputting apparatus 304 connected to this electronic endoscope 303 and a first monitor 306 receiving an image signal output from this image inputting apparatus 304 and displaying an image. The image inputting apparatus 304 is connected to a recording and seeking apparatus 307 as a control means forming the image recording, seeking and displaying apparatus 301. The image recording, seeking and displaying apparatus 301 comprises the above mentioned recording and seeking apparatus 307, a second monitor 309 as a displaying means and a keyboard 308.

The above mentioned recording and seeking apparatus 307 is connected with the above mentioned keyboard 308 as an input means so that various commands and data may be input. The recording and seeking apparatus 307 is connected to the above mentioned second monitor 309 in which the sought image is displayed.

The above mentioned electronic endoscope 303 has an insertable part 312 which is flexible, is formed to be elongate and is insertable into an observed part 311, an operating part 313 connected to this insertable part 312 at the rear end and a universal cord 314 extended out of the side of this operating part 313.

The above mentioned universal cord 314 is provided at the rear end with a connector 316 connected to a light source part 317 of the image inputting apparatus 304 feeding an illuminating light to the endoscope 303.

Figure 19:
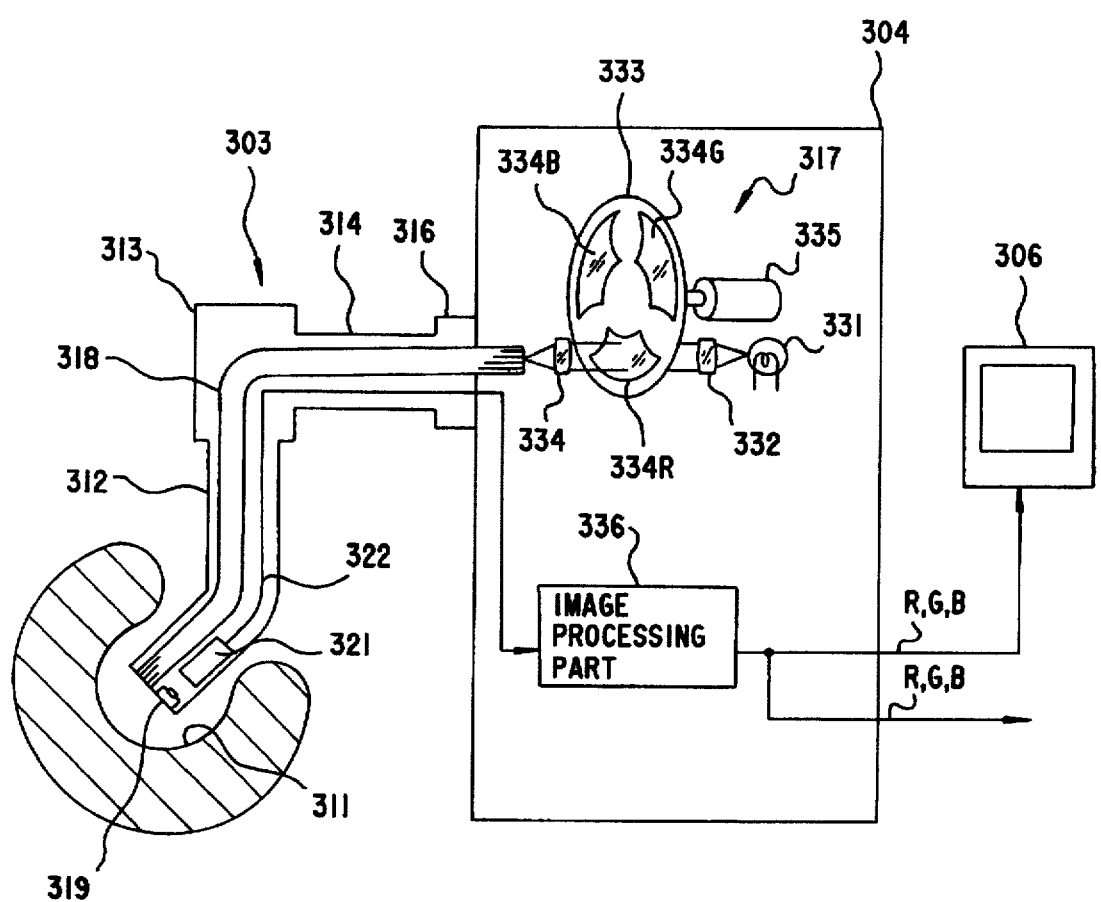

In FIG. 19, a light guide 318 formed of a fiber bundle emitting to the observed part 311 the illuminating light fed from the light source part 317 is provided on the exit end surface in the tip part of the insertable part 312 of the above mentioned electronic endoscope 303. This light guide 318 is connected to the light source part 317 through the insertable part 312, operating part 313 and universal cord 314 so as to be fed with the illuminating light.

An objective lens 319 is further provided in the tip part of the above mentioned insertable part 312 and a CCD 321 as a solid state imaging device has the imaging surface positioned in the image forming position of this objective lens 319. A signal line 322 through which an electric signal obtained as a result of photoelectrically converting the object image formed on the imaging surface and a driving clock driving this CCD 321 are transmitted is connected to this CCD. This signal line 322 leads to the connector 316 through the insertable part 312 and universal cord 314.

A light source lamp 331 is provided in the above mentioned light source part 317. A collimator lens 332 making the illuminating light beams of the light source lamp 331 parallel beams, a rotary filter 333 and a condenser lens 334 condensing and radiating the illuminating light onto the entrance end surface of the light guide 318 are provided from the light source lamp 331 side in the light path connecting this light source lamp 331 and the entrance end surface of the above mentioned light guide 318.

The above mentioned rotary filter 333 is disc-like and is provided in the peripheral direction with color transmitting filters 334R, 334G and 334B transmitting respective colors, for example, of red (R), green (G) and blue (B) upon which the illuminating light beams made parallel beams by the above mentioned collimator lens 332 are to be incident. This rotary filter 333 is rotated and driven by a motor 335 to time-serially feed to the light guide 318 the respective color lights of red, green and blue.

When the above mentioned connector 316 is connected to the image inputting apparatus 304, the signal line 322 will be connected to an image processing part 336 which applies a driving clock to the CCD 321 to drive it, converts to RGB video signals the electric signals delivered from the CCD 321, outputs them and controls the image signal level and the balance of the R and B signals. The RGB video signals output from this image processing part 336 are output to the first monitor 306 and recording and seeking apparatus 307 and the endoscope image is displayed in the first monitor 306.

Figure 18:
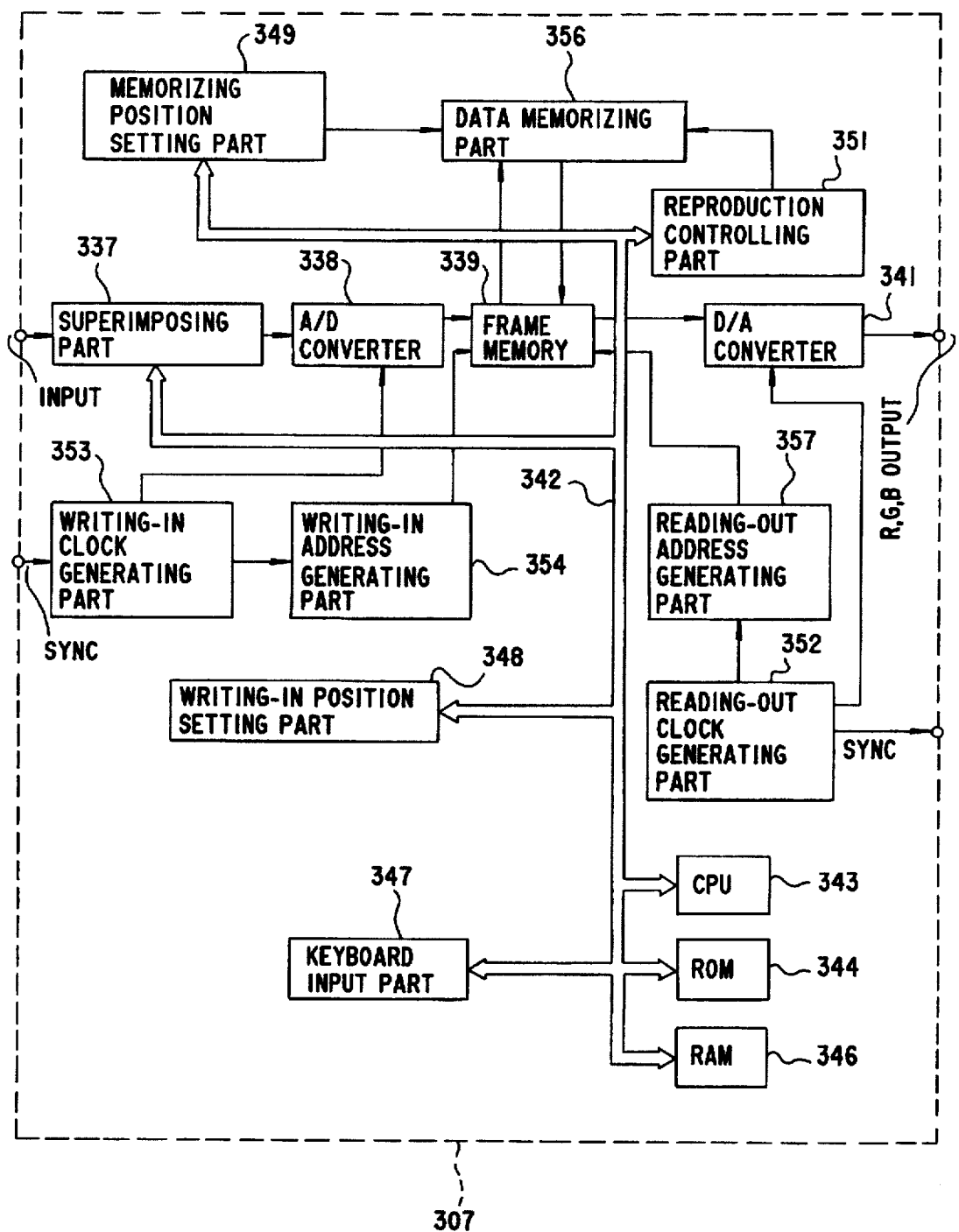

The recording and seeking apparatus 307 is formed as shown in FIG. 18.

In FIG. 18, the RGB video signals are input into a superimposing part 337, are digital-converted in an A/D converter 338 and are written into a frame memory 339. The video signals read out of the frame memory 339 are analogized by a D/A converting part 341 and are output to the second monitor 309 from the RGB output end.

Also, within the recording and searching apparatus 307, by a control bus 342, data and control signals can be input and output among a CPU 343, ROM 344, RAM 346, keyboard input part 347, writing-in position setting part 348, the above mentioned superimposing part 337, memorizing position setting part 349 and reproduction controlling part 351.

On the other hand, a synchronizing signal together with RGB video signals are input into the writing-in clock generating part 353 of the recording and seeking apparatus 307. This writing-in clock generating part 353 outputs a timing signal to the above mentioned A/D converting part 338 and writing-in address generating part 354. A control signal from the above mentioned writing-in position setting part 348 is input into the writing-in address generating part 354 and a writing-in address is generated by this control signal and is output to the above mentioned frame memory 339.

The above mentioned memorizing position setting part 349 directs a data memorizing part 356 by the control signal from the above mentioned CPU 343 to take in the video data written into the frame memory 339. The data memorizing part 356 is reproduced and controlled from the above mentioned reproducing control part 351 and again writes video data into the frame memory 339 by the control signal from the reproducing control part 351.

The recording and seeking apparatus 307 is provided with a reading-out clock generating part 352 which generates a timing signal and outputs it to the above mentioned D/A converting part 341 and a reading-out address generating part 357. This reading-out address generating part 357 generates a reading-out address, outputs it to the above mentioned frame memory 339 from which video data are output. Also, the reading-out clock generating part 352 generates a synchronizing signal and outputs it to the second monitor 309 from the output end.

The above mentioned keyboard input part 347 is connected to the above mentioned keyboard 308 so that a control signal and data may be delivered to the CPU 343.

The above mentioned ROM 344 stores such programs as of recording and seeking and processes them by the control signal input from the keyboard 308.

The operation of the CPU 343 shall be explained in the following by using FIGS. 20 to 23. By the way, the operation of the CPU is shown on the right side in the flow chart.

Figure 20:
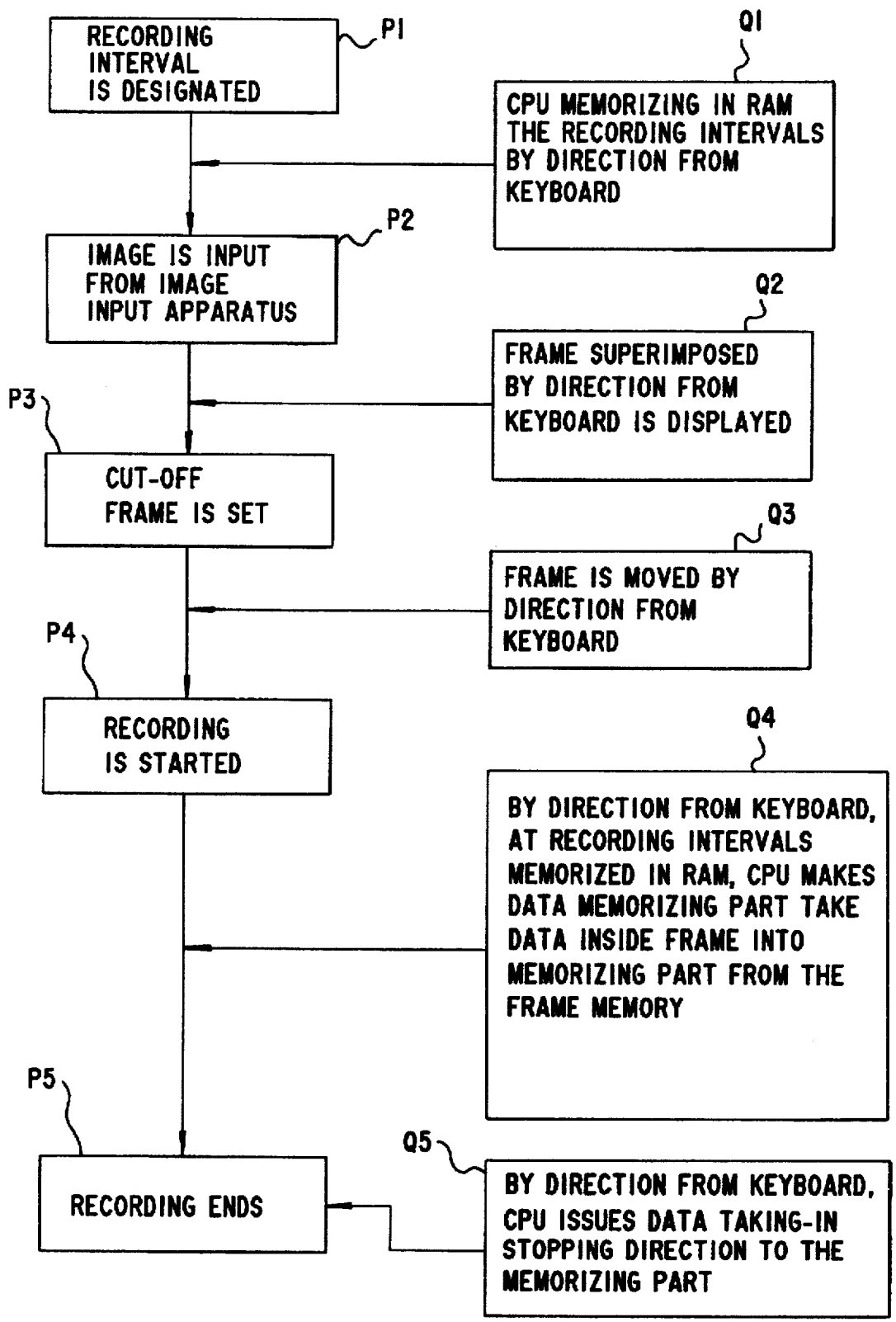

In FIG. 20, the recording operation shall be explained.

In the step P1 (the word "step" shall be omitted so as to read merely "P1" hereinafter), the recording interval is input from the keyboard 308 and is designated. In Q1, this designated recording interval is memorized in the RAM 346 by the CPU 343.

Figure 23A:
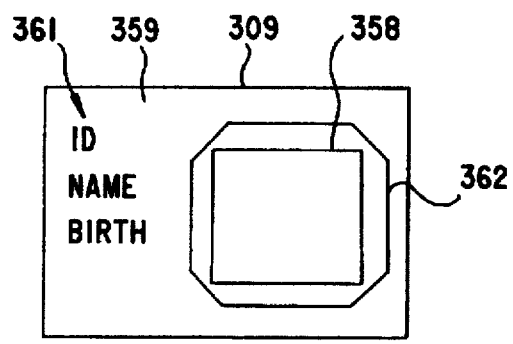
FIG. 23(A) is an explanatory view showing a picture for setting a cut-out frame.
Figure 23B:
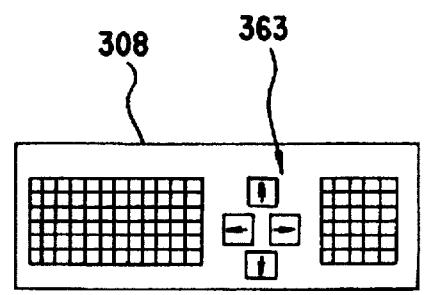
FIG. 23(B) is an explanatory view showing a keyboard for setting a cut-out frame.

Then, in P2, the image is input from the image inputting apparatus 4, the cut-out frame 358 is superimposed on the input video data in the superimposing part 337 by the direction from the keyboard 308 in Q2 and the image shown in FIG. 23(A) is displayed in the second monitor 309. In this monitor 309, the ID data 361 of the patient is displayed on the left side in the picture 359 and the endoscope image 362 superimposed with the cut-out frame 358 is displayed on the right side.

Then, in P3, the cut-out frame 358 is set. That is to say, in Q3, the cut-out frame 358 is moved and set so as to enclose the image wanted to be recorded with the cut-out frame 358 by using the cursor moving key 363 of the keyboard 308 shown in FIG. 23(B).

Then, in P4, when the recording start is directed by the keyboard 308, by the direction from the keyboard 308, the CPU 343 will make the data memorizing part 356 take in the video data inside the cut-out frame 358 from the frame memory 339 according to the recording interval memorized in the RAM 346.

Then, in P, when the recording end is directed by the keyboard 308, in Q5, by the direction from the keyboard 308, the CPU 343 will output a direction to stop taking in the video data to the data memorizing part 356 which will stop taking in the video data.

Figure 21:
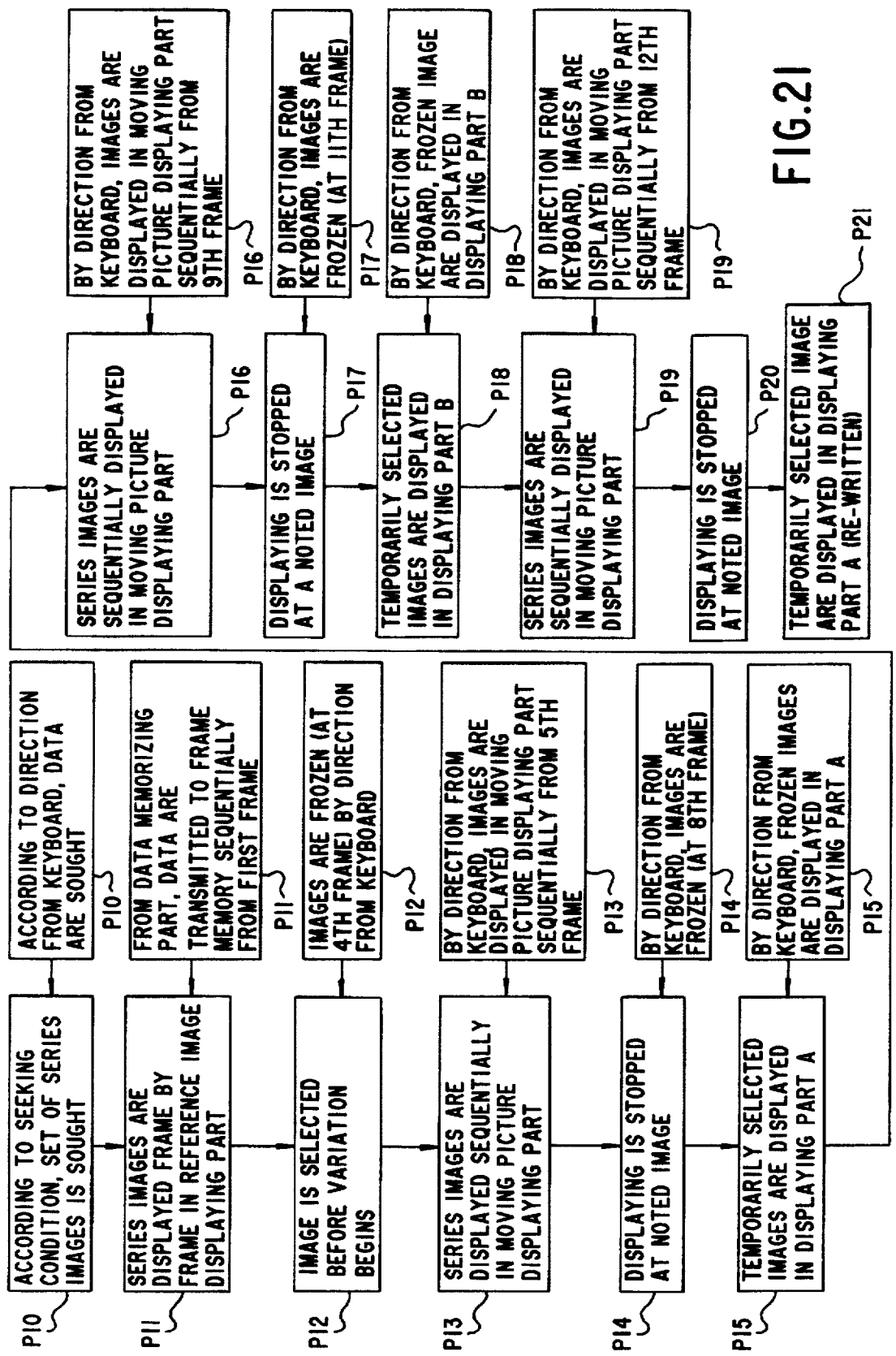

As mentioned above, the images having the recording interval as mentioned above are sequentially recorded in the data memorizing part 356. The thus recorded video data are sought as shown in FIG. 21. By the way, in this diagram, the right side shows the operation of the CPU.

In FIG. 21, in P10, when the seeking condition is input from the keyboard 308, the CPU will seek a set of a series of images.

Figure 22:
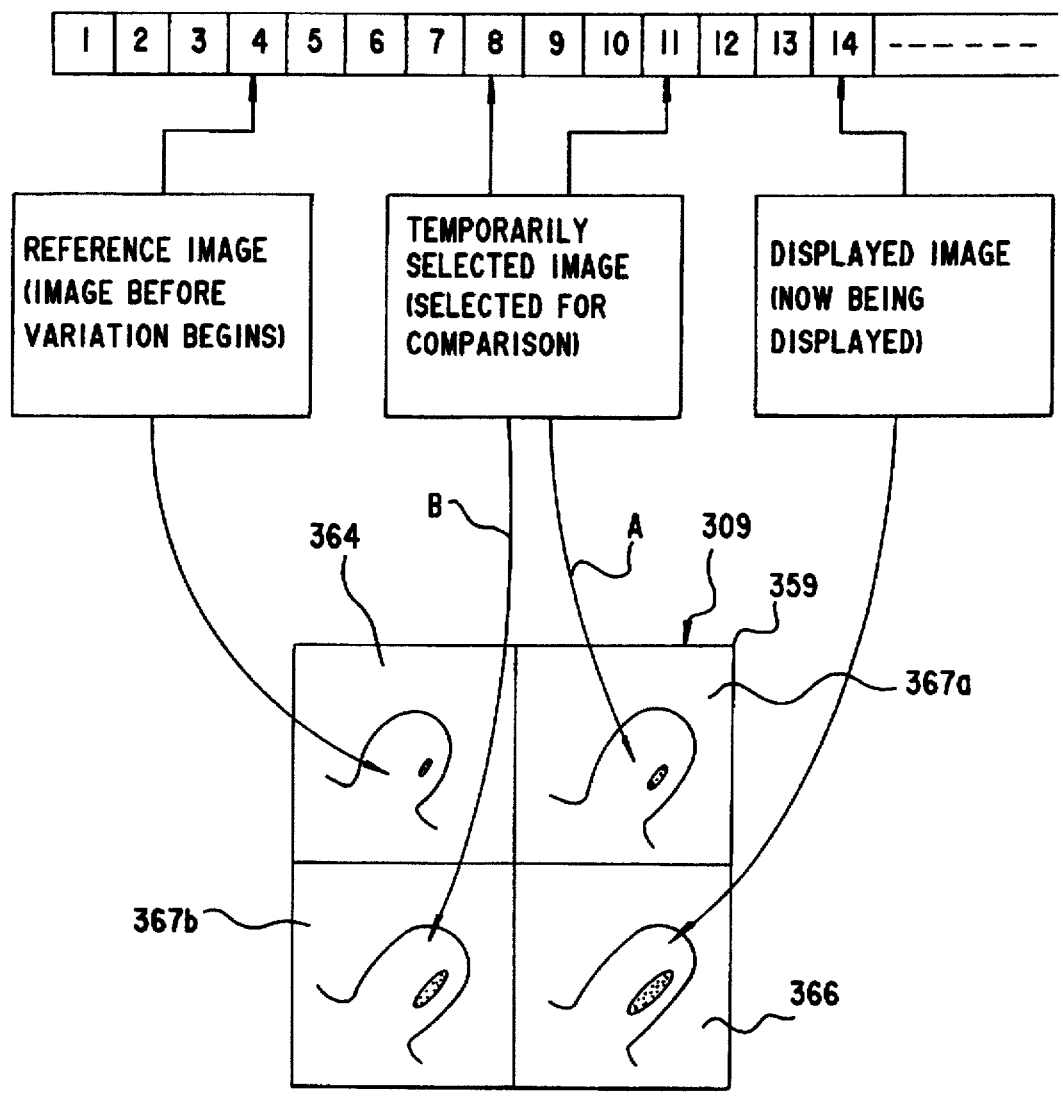

Then, in P11, the image data sought from the data memorizing part 356 are output frame by frame to the frame memory 339 and are sequentially displayed frame by frame in the reference image displaying part 364 provided as four-divided on the picture 359 of the second monitor 309 shown in FIG. 22.

Then, in P12, the image, for example, before the start of the variation as displayed in the reference image displaying part 364 by the direction from the keyboard 308, that is, the image of the fourth frame in the example in FIG. 22 is frozen.

Then, in p13, by the direction from the keyboard 308, the images are displayed sequentially from the 5th frame in the moving picture displaying part 366.

Then, in P14, by the direction from the keyboard 308, the noted image is frozen, that is, for example, at the 8th frame.

Then, in P15, by the direction from the keyboard 308, the frozen image of the 8th frame is moved to the temporarily selected image displaying part (A) 367 and is displayed.

Then, in P16, by the direction from the keyboard 308, the images from the 9th frame are sequentially displayed in the moving picture displaying part 366.

Then, in P 17, by the direction from the keyboard 308, the noted image is frozen, for example, at the 11th frame.

Then, in P18, by the direction from the keyboard 308, the frozen image of the 11th frame is moved to the temporarily selected image displaying part (B) 367b and is displayed.

Then, in P 19, by the direction from the keyboard 308, the images are displayed sequentially from the 12th frame in the moving picture displaying part 366.

Then, in P20, by the direction from the keyboard 308, the images are frozen at the noted image.

In P21, the frozen image is moved to the temporarily selected image displaying part (A) 367a and is displayed. That is to say, the image displayed in P15 is re-written. The same operations as in and after P16 are made thereafter.

The operation of this embodiment shall be explained in the following.

The illuminating light emitted from the light source part 317 of the image inputting apparatus 304 is color-separated by the rotary filter 333 into the respective colors of red (R), green (G) and blue (B) which are radiated to the observed part 311 through the light guide 311. The reflected light from the observed part 311 is made to form an image on the imaging surface of the CCD 321 by the objective lens 319, is photoelectrically converted and is input into the image processing part 336. In the image processing part 336, for example, RGB video signals are produced and are output to the first monitor 306 and recording and seeking apparatus 307.

In the case of recording the image, the RGB video signals are input into the superimposing part 337, are superimposed with the cut-out frame 358, are digitalized in the A/D converting part 338 in which a timing signal is input from the writing-in clock generating part 353 and are written into the frame memory 339. The written-in video data are simultaneously read out of the frame memory 339, are analogized in the D/A converting part 341 in which a timing signal from the reading-out clock generating part 352 is input and are output to the second monitor 309.

The endoscope image 362 superimposed with the cut-out frame 358 as shown in FIG. 23 is displayed on the picture 359 of the second monitor 309.

Then, the operations from P1 to P5 are made and the image within the cut-out frame 358 is recorded at the recording intervals.

In the case of seeking, a seeking condition is input from the keyboard 308 and the CPU 343 seeks a set of a series of images and outputs the series of images from the data memorizing part 356. The writing-in position setting part 348 four-divides the address of the frame memory 339 and allots to the divided addresses the reference image displaying part 364, temporarily selected image displaying parts 367a and 367b and moving picture displaying part 364. The writing-in address generating part 354 generates an address corresponding to the reference image displaying part 364 and writes onto the frame memory 339 image data which are read out and are displayed in the reference image displaying part 364 of the second monitor 309 through the D/A converting part 341.

Thereafter, the video data are written sequentially from the second frame onto the frame memory 339 corresponding to the reference image displaying part 364 and are displayed in the reference image displaying part 364. When the image in the fourth frame among the displayed images is selected from the keyboard 308, the writing onto the frame memory 339 will be inhibited and the image in the fourth frame will be frozen.

Further, when the direction from the keyboard 308 is input into the CPU 343, the CPU 343 will output a control signal to the writing-in position setting part 348 which will make the writing-in address generating part 354 output an address on the frame memory 339 corresponding to the moving picture displaying part 366. The video data output by this address from the data memorizing part are written in, are simultaneously read out and are output to the second monitor 309 through the D/A converting part 341. The still image in the fourth frame in the reference image displaying part 364 and the image from the fifth frame in the moving picture displaying part 366 are sequentially displayed on the picture 359 of the second monitor 309.

When the 8th frame is selected from the keyboard 308, the CPU 343 will output a control signal to the writing-in position setting part 348 which will make the writing-in address generating part 345 output an address on the frame memory 339 corresponding to the temporarily selected image displaying part (A) 367a and the image in the 8th frame is written by this address onto the frame memory 339. The written-in video data are read out and are displayed on the picture 359 of the second monitor 309, the image in the 4th frame is displayed in the reference image displaying part 364 and the image in the 8th frame is displayed in the temporarily selected image displaying part (A) 367a.

Thereafter, in the same manner, the image in the 11th frame is displayed in the temporarily selected image displaying part (B) 367b. When the image is further selected, the selected image will be displayed in the temporarily selected image displaying part (A) 367a.

In this embodiment, as the picture 359 of the second monitor 309 is four-divided to form the reference image displaying part 364, temporarily selected image displaying parts 367a and 367b and moving picture displaying part 366, the image displayed in the moving picture displaying part 366 and the images in the other displaying parts 364, 367a and 367b can be simultaneously compared, therefore the image can be easily selected and the respective images can be easily compared.

Further, in case an affected part varying with time is recorded as in this embodiment, any images will be able to be selected out and compared and therefore the variations with the lapse of time of the affected part will be able to be definitely known.

By the way, in this embodiment, the picture 359 of the second monitor 309 is displayed as four-divided but the division number is not limited to this and may be, for example, nine divisions.

Also, a memorizing part memorizing a plurality of images coinciding with the seeking condition may be provided so that the image may be repeatedly called out of this memorizing part and, for example, the image not selected at the first time may be selected at the second time.

Figure 24:
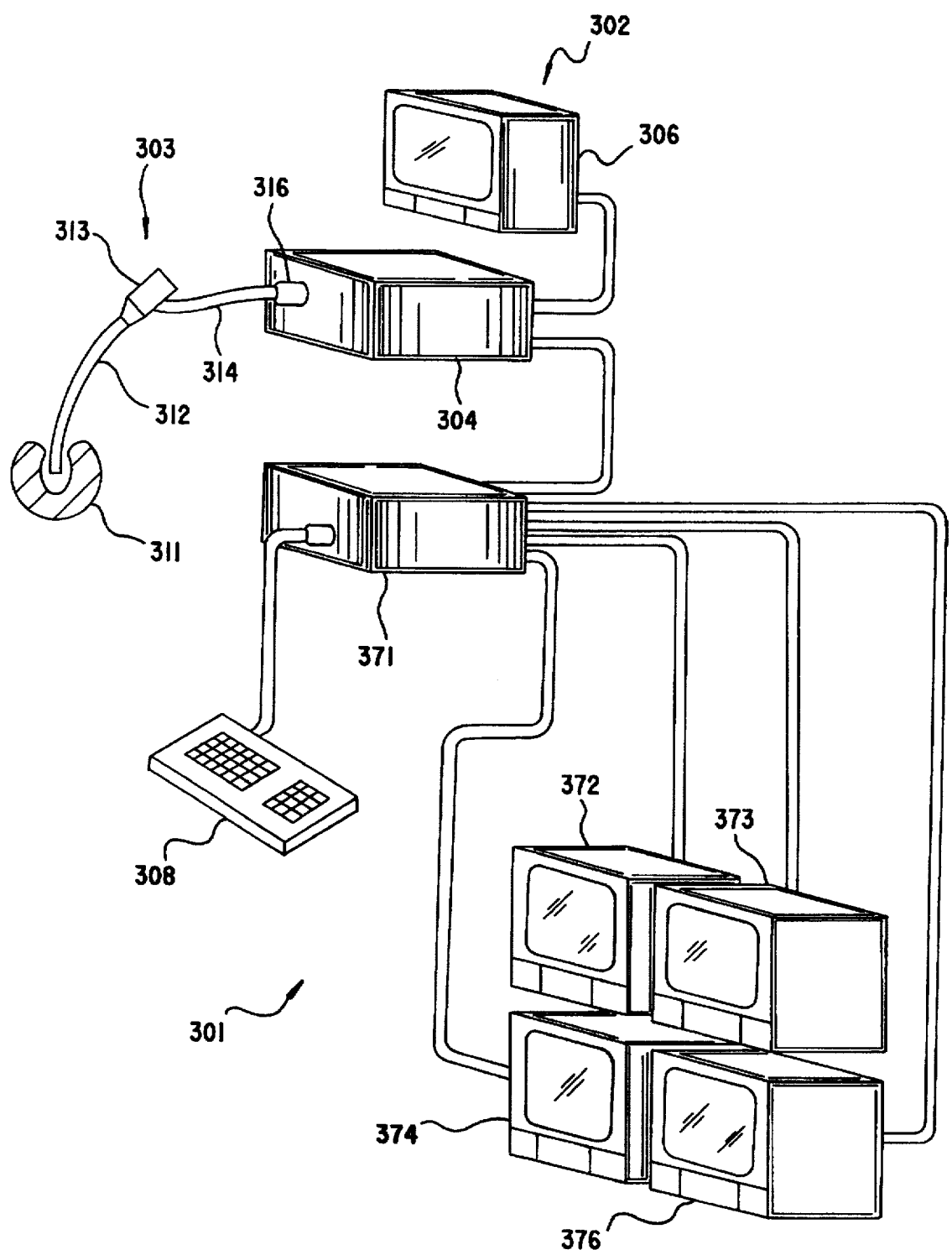
FIGS. 24 and 25 relate to the fourth embodiment of the present invention.
Figure 25:
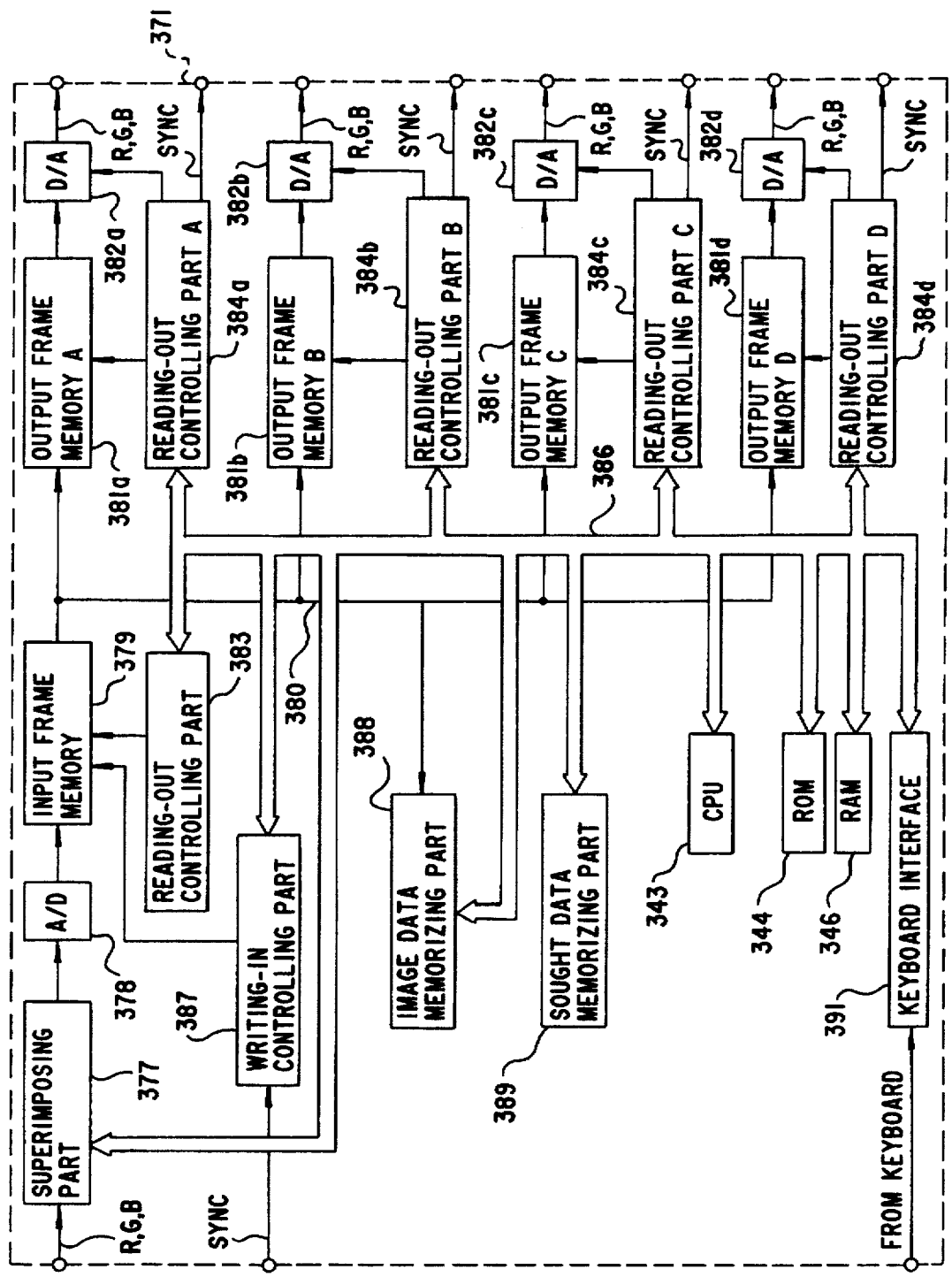

FIGS. 24 and 25 show the fourth embodiment of the present invention.

In this embodiment, the same endoscope apparatus 302 as in the third embodiment is used and therefore shall not be explained.

In FIG. 24, a recording and seeking apparatus 371 is connected with a second monitor 372, third monitor 373, fourth monitor 374 and fifth monitor 376.

The recording and seeking apparatus 371 is formed as in FIG. 25.

RGB video signals output from an image inputting apparatus 304 are input into a superimposing part 377 superimposing a cut-out frame 358. The superimposing part 377 is connected to an A/D converting part 378 so that the digitalized video data may be written into an input frame memory 379. The input frame memory 379 is connected with output frame memories 381a, 381b, 381c and 381d through a video data bus 380 so that video data may be input and output among them. D/A converting parts 382a, 382b, 382c and 382d are connected respectively to the respective output frame memories 381a, 381b, 381c and 381d so that the video data may be analogized and may be output respectively to the second monitor 372, third monitor 373, fourth monitor 374 and fifth monitor 376.

A reading-out controlling part 383 is connected to the above mentioned input frame memory 379. Reading-out controlling parts 384a, 384b, 384c and 384d are connected respectively to the output frame memories 381a, 381b, 381c and 381d and are also connected respectively to D/A converting parts 382a, 382b, 382c and 382d so that a timing signal may be output and a synchronizing signal may be generated and output to the respective monitors 372, 373, 374 and 376.

The control bus 386 is connected to the above mentioned reading-out controlling parts 383, 384a, 384b, 384c and 384d and is further connected to a writing-in controlling part 387, image data memorizing part 388, sought data memorizing part 389, CPU 343, ROM 344, RAM 346 and keyboard interface 391 so that data and control signals may be input and output.

The operation of this embodiment shall be explained in the following.

In the case of recording images, the RGB video signals input from the image inputting apparatus 304 are input into the superimposing part 377, are superimposed with the cut-out frame 358, are digitalized in the A/D converting part 378 and are written into the input frame memory 379. These video data are read out, are written into the output frame memory 381, are further read out, are analogized in the D/A converting part 382a and are output to the second monitor 372. The endoscope image 362 superimposed with the cut-out frame 358 shown in FIG. 23(A) is displayed in the second monitor 372.

The same as in the third embodiment, the recording interval is input from the keyboard 308 and then the cut-out frame 358 is moved from the keyboard 308 to place the image to be recorded in the cut-out frame 358. By the direction from the keyboard 308, the CPU 343 makes the image data memorizing part 388 take in the video data within the cut-out frame 358 of the input frame memory 309 so that a series of time-serial images having the recording intervals may be sequentially memorized in the image data memorizing part 388.

In the case of seeking the memorized image, the seeking condition is input from the keyboard 308. From this seeking condition, the CPU 343 seeks a set of a series of images from among the images memorized in the image data memorizing part 388. The sought series of images are transferred to and memorized in the sought data memorizing part 389.

The CPU 343 outputs the memorized images to the output frame memory 381a through the video data bus 380 from the first frame. The output frame memory 381a analogizes the written-in image data in the D/A converting part 382a and outputs them to the monitor 372.

In the second monitor 372, the endoscope images memorized sequentially from the first frame are displayed.

While observing the second monitor 372, the image, for example, before the variation begins is selected by operating the keyboard 308. When the selection is made, the CPU 343 will inhibit the image data from being written into the output frame memory 381 and the images already written in, that is, the selected images will be repeatedly output so that the displayed image in the second monitor 372 may be made a still image.

Then, by the direction from the keyboard, the CPU 343 begins to write the images into the output frame memory 381d sequentially from the image recorded next the image displayed in the second monitor 372. The written-in image data are analogized in the D/A converting part 382d and are output and displayed in the fifth monitor 376.

While observing this fifth monitor 376, the noted image is selected from the keyboard 308. By the direction of the keyboard 308, the CPU inhibits the output frame memory 381d from writing in the image data and the images already written in, that is, the selected images are repeatedly output so that the displayed image in the fifth monitor 376 may be made a still image. Further, the CPU 343 writes into the output frame memory 381b the same image as is displayed in the fifth monitor 376 and outputs this image repeatedly to the third monitor 373 in which the still image of the noted image is displayed.

By the direction of the keyboard 308, the CPU 343 displays sequentially in the fifth monitor 376 the images recorded next the image displayed in the third monitor 373.

While observing the fifth monitor 376, further the noted image is selected by operating the keyboard 308. When the selection is made, the CPU 343 will display in the fifth monitor 376 as a still image the image selected simultaneously with the above mentioned image and will display the same image in the fourth monitor 374.

In the case of further selecting the image, the selected image will be displayed in the third monitor 373 and then the same operation will be repeated.

According to this embodiment, the same effect as in the third embodiment can be obtained.

By the way, in this embodiment, the image is displayed and selected in the fifth monitor 376 and the selected image is displayed as a still image in the second to fourth monitors 372, 373 and 374 but the selection and the still image display may be made in the same monitor.

In the above mentioned respective embodiments, the image is cut out of the cut-out frame and is memorized but may be memorized without being cut off and may be cut off at the time of being reproduced.

Also, by using an analogue memorizing apparatus, the output of the analogue memorizing apparatus may be displayed in the moving picture displaying part and the frozen image may be displayed in the other part.

Further, the third and fourth embodiments are not limited to the electronic endoscope but may be applied to an image taking-in apparatus fitted to an optical endoscope externally fitted with a TV camera to obtain the same effect.

As explained above, according to the third and fourth embodiments, the displaying means is provided with a reference image displaying picture, temporarily selected image displaying picture after seeking and moving picture displaying picture so that, while observing the reference image displaying picture, the moving picture may be observed and therefore, in the case of seeking and displaying a series of images, the images memorized as separated in time from each other can be easily observed and compared with each other.

FIGS. 26 to 29 show the fifth embodiment of the present invention.

Figure 26:
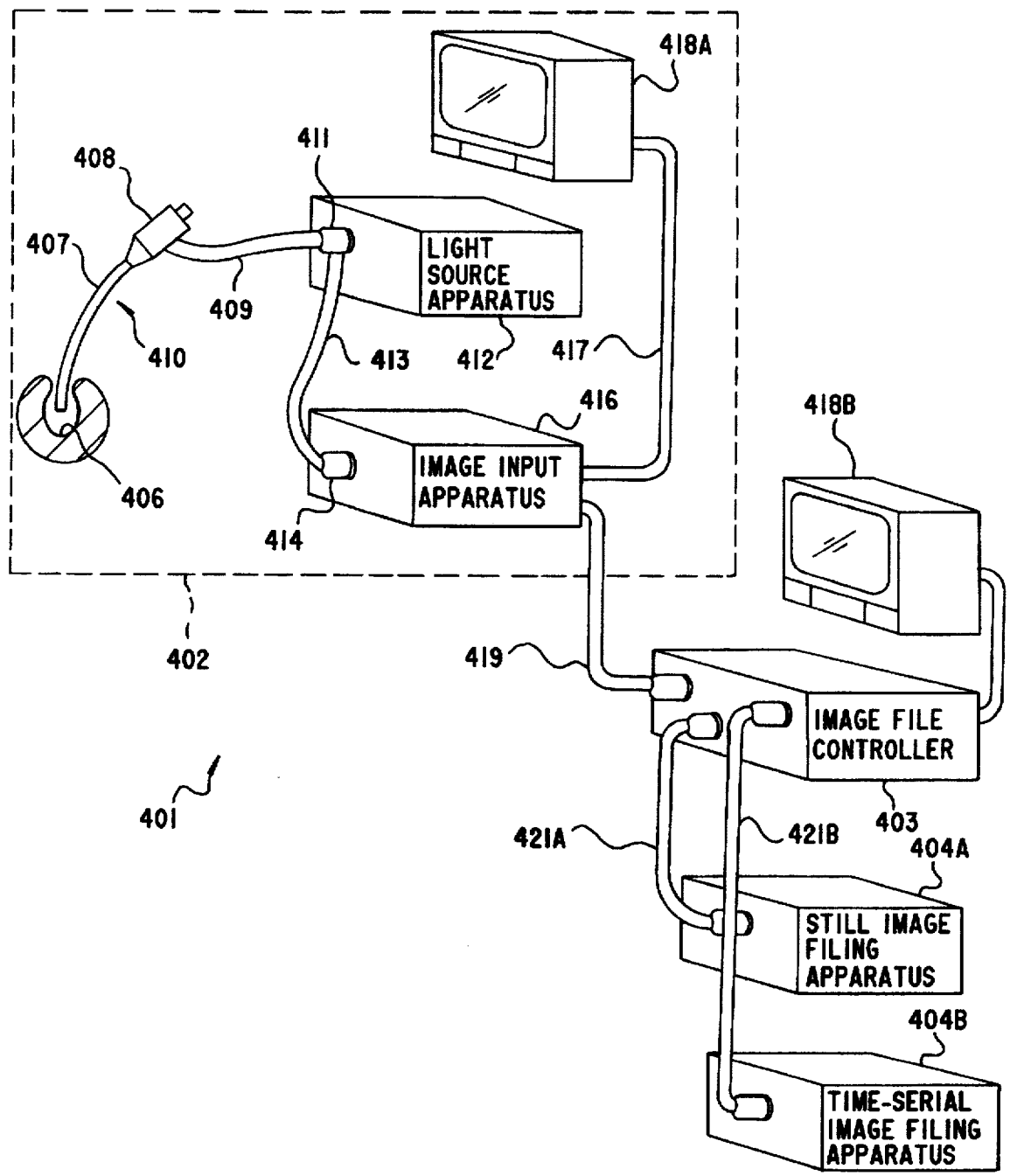
FIGS. 26 to 29 relate to the fifth embodiment of the present invention.

In FIG. 26, an image filing system 401 comprises an endoscope apparatus 401 as an image signal generating part, an image file controller 402 as a control part and a still image filing apparatus 404A and time-serial image filing apparatus 404B as image recording parts.

The above mentioned endoscope apparatus 402 has an electronic scope 410 having an insertable part 407 which is flexible, formed to be elongate and insertable into an observed part 406, an operating part 408 connected to this insertable part 407 at the rear end, and a universal cable 409 extended out of the side of this operating part 408.

A connector 411 is provided at the rear end of the above mentioned universal cable 409 and is connected to a light source apparatus 412 feeding an illuminating light to the electronic scope 410. A signal cable 413 is extended out of the side of this connector 411 and is provided at the rear end with a connector 414 connected to an image inputting apparatus 416 wherein an image signal obtained by the electronic scope 410 is processed to produce a video signal, for example, of three primary colors of R, G and B so that an endoscope image may be displayed by a TV monitor 418a through a cable 417.

The video signal produced in the above mentioned image inputting apparatus 416 is delivered also to the above mentioned image file controller 403 through a cable 419.

The above mentioned image file controller 403 is connected to the above mentioned still image filing apparatus 404A through a cable 421A and is connected also to the above mentioned time-serial image filing apparatus 404B through a cable 412B.

Figure 28:
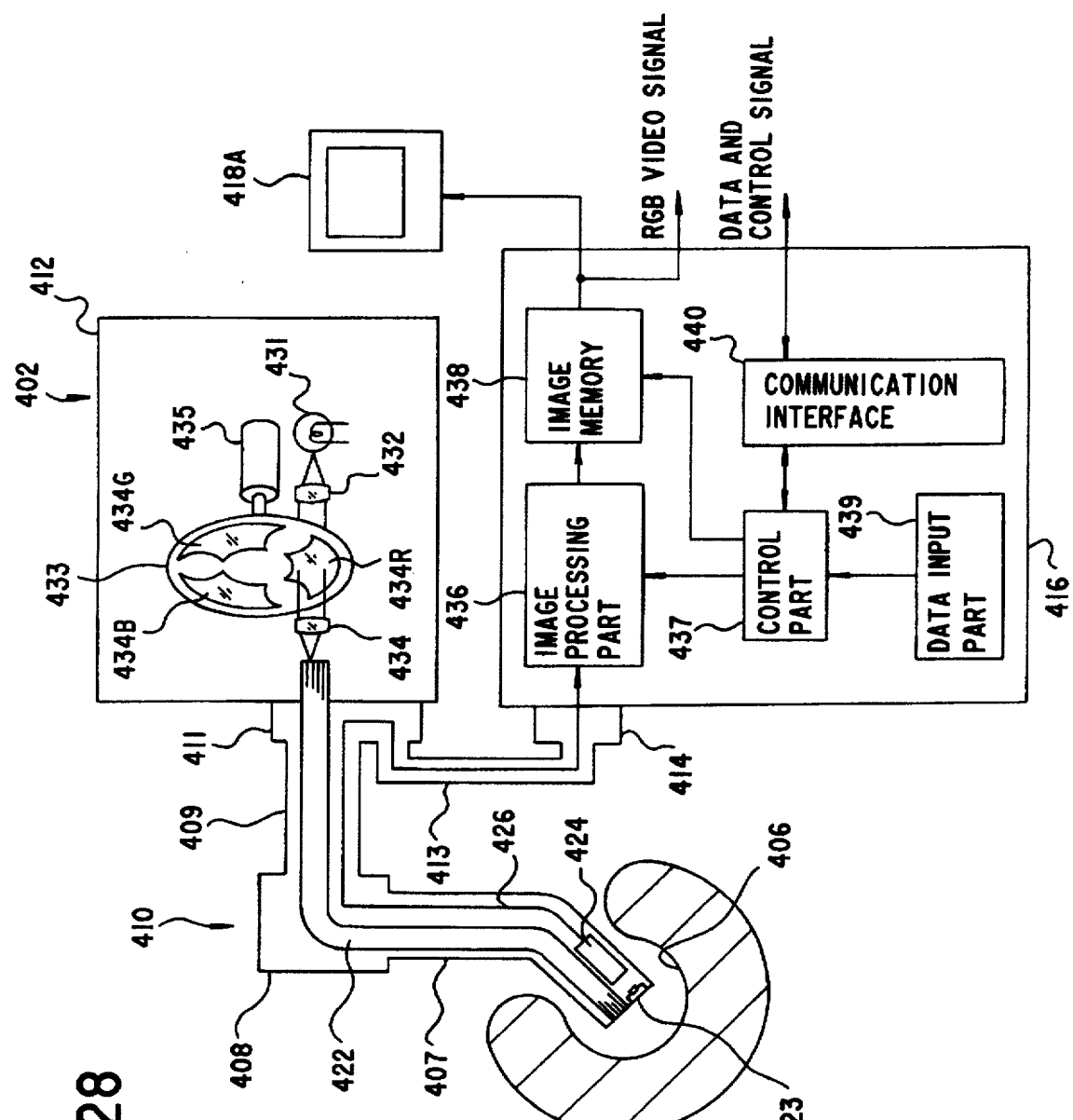

The above mentioned endoscope apparatus 402 shall be explained with reference to FIG. 28.

A light guide 422 formed of a fiber bundle emitting to the observed part 406 the illuminating light fed from the light source apparatus 412 is provided on the exit end surface in the tip part of the insertable part 407 of the above mentioned electronic scope 410. When this light guide 422 is inserted through the insertable part 407, operating part 408 and universal cable 409 and has the connector 411 connected to the light source apparatus 412, the illuminating light will be fed to this entrance end surface.

Further, an objective lens 423 is provided in the tip part of the above mentioned insertable part 407. The imaging surface of a CCD 424 as a solid state imaging device is positioned in the image forming position of this objective lens 423. Signal lines 426 (shown by one line) transmitting a driving clock driving this CCD 424 and an electric signal having photoelectrically converted the object image formed on the imaging surface are connected to this CCD 424, lead to the connector 411 through the insertable part 407, operating part 408 and universal cable 409 and are further extended to the connector 414 through the signal cable 413 from the connector 411.

A light source lamp 431 is provided in the above mentioned light source apparatus 412. A collimator lens 432 making the illuminating light of the light source lamp 431 parallel beams, a rotary filter 433 and a condenser lens 434 condensing and radiating the illuminating light to the entrance end surface of the light guide 422 are provided in the light path connecting the light source lamp 431 and the entrance end surface of the above mentioned light guide 422.

The above mentioned rotary filter 433 is disc-like and is provided in the peripheral direction with color transmitting filters 434R, 434G and 434B transmitting the respective color lights, for example, of red (R), green (G) and blue (B) so that the illuminating light made into parallel beams by the above mentioned collimator lens 432 may enter these respective color transmitting filters 434R, 434G and 434B. This rotary filter 433 is rotated and driven by a motor 435 to feed the respective color lights of red, green and blue time-serially to the light guide 422.

When the above mentioned connector 414 is connected to the image inputting apparatus 416, the CCD 424 will be electrically connected through the signal lines 426 with an image processing part 436 provided within an image inputting apparatus 416. This image processing part 436 drives the CCD 424 by applying a driving clock and converts the electric signal delivered from this CCD 424 to RGB video signals which are output. Also, it controls the image signal level and the white balance and the like of the R, G and B signals. Further, it superimposes on the RGB video signals the patient data and error message transmitted from a later described control part 437. The output of the image processing part 436 is delivered to an image memory 438 which either passes as they are the input RGB video signals in response to the control signal from the control part 437 or temporarily keeps them and repeatedly outputs them as a still picture. The output of the image memory 438 is branched and one branch is output to the TV monitor 418 and displays on the picture the image of the observed part 406. The other branch is delivered to the above mentioned image file controller 403.

The above mentioned control part 437 is connected to a data inputting part 439 and communication interface 440, for example, of a keyboard. By the operation by the user from the data inputting part 439, such patient data as the patient's name and date of birth to be superimposed on the RGB video signals and such control signal as of the image record (release) are input and the patient data are delivered to the image processing part 436 and are superimposed on the RGB video signals as mentioned above. The control signal is delivered to the image memory 438 and communication interface 440 as mentioned above. This communication interface 440 inputs and outputs the data and control signals with the outside by the control from the control part 437 by an interface means of a serial transmission by the standard, for example, of RS-232 and also inputs and outputs the data and control signals in the image file controller 403.

The above mentioned RGB signals, data and control signals are delivered to the image file controller 403 through the above mentioned cable 419.

The above mentioned image file controller 403 shall be explained with reference to FIG. 27.

The RGB video signals from the above mentioned image inputting apparatus 416 are input into a video signal distributing part 441 provided in the image file controller 403. The data and control signals are input and output in a first serial port (communication interface) 442 of the RS-232 standard.

The video signals are divided into two systems by the above mentioned video signal distributing part 441. The RGB video signals of one system are delivered to the above mentioned time-serial image filing apparatus 404B. The RGB video signals of the other system are delivered to an image memory 451.

The RGB video signals of still images are delivered to the above mentioned still image filing apparatus 404A from the above mentioned image memory 451.

On the other hand, the first serial port 442 can input and output the data and control signals through a bus line 443 among the CPU 444, memory part 445, hard disc controlling part 446, second serial port 447, third serial port 448 and video signal switching part 449. The CPU 444 stores in a hard disc 450 through the hard disc controlling part 446 the patient data input from the image inputting apparatus 416. Also, the CPU 444 transmits starting and stopping signals to the second serial port 447 by the control signal input into the first serial port 442.

By the control signal input into the first serial port 442, a releasing signal is transmitted to the third serial port 448.

The information transmitted to these second and third serial ports 447 and 448 is memorized in the memory part 445 and will be stored together with the patient data in the above mentioned hard disc 450 when the control signal of one inspection end is input into the first serial port 442.

Further, when a seeking direction from the image inputting apparatus 416 is input into the first serial port 442, with reference to the data of the hard disc 450, the CPU 444 will transmit a seeking control signal to the second serial port 447 or third serial port 448 and will also transmit a control signal to the video signal switching part 449. By this control signal, the video signal switching part 449 selects the RGB video signals from the above mentioned still image filing apparatus 404A or time-serial image filing apparatus 404B and outputs them to the TV monitor 418B.

The above mentioned second serial port 447 inputs and outputs such control signals relating to the time-serial image filing apparatus 404B as the starting and stopping signals. Also, the above mentioned third serial port 448 inputs and outputs such control signal relating to the still image filing apparatus 404A as the releasing signal.

By the way, the time-serial image filing apparatus 404B can be formed of a VTR and other apparatus.

The operation of the image filing system 401 formed as mentioned above shall be explained.

The image filing controller 403 is connected with the image inputting apparatus 416 from which the RGB video signals are input into the video signal distributing part 441.

On the other hand, in the endoscope apparatus 402, prior to recording images, the user selects the ID input mode from the data inputting part 439 and inputs such patient data as the patient's name and date of birth. When the ID input mode is selected, the control part 437 will superimpose the patient data on the RGB video signals and will input the patient data into the communication interface 440. These patient data are transmitted to the first serial port 442 from the communication interface 440. The CPU 444 transmits a signal representing that the communication is possible to the communication interface 440 from the first serial port 442 and also stores the designated patient data in the hard disc 450 through the hard disc controlling part 446.

The above mentioned signal representing that the communication is possible is transmitted to the control part 437 from the communication interface 440 and the control part 437 displays that the recording is possible on the picture, for example, of the TV monitor 418A. The user sees this and inputs the releasing signal into the above mentioned still image filing apparatus 404 from the data inputting part 439 or the recording starting or stopping signal into the above mentioned time-serial image filing apparatus 404B.

The control part 437 transmits the releasing signal and recording starting and stopping signals from the communication interface 440 to the first serial port 442. The CPU 444 senses the releasing signal and recording starting and stopping signals transmitted to this first serial port 442 and transmits the releasing signal to the still image filing apparatus 404A from the third serial port 448 and the recording starting or stopping signal to the time-serial image filing apparatus 404B from the second serial port 447.

The information relating to such records as of the first address and number of sheets recorded in the still image filing apparatus 404A and the first address and ending address recorded in the time-serial image filing apparatus 404B is memorized temporarily in the memory part 445. When the recording in the still image filing apparatus 404A and time-serial image filing apparatus 404B ends, the recording end signal will be delivered to the control part 437 through the second serial port 447 or third serial port 448, first serial port 442 and communication interface 440 and the control part 437 will display the recording end on the picture, for example, of the TV monitor 418A.

When the above mentioned operation is repeated and the end of one inspection is input into the data input part 439, the inspection end signal will be input into the first serial port 442 through the control part 437 and communication interface 440 and the CPU 444 will store the data relating to the temporarily memorized image together with the patient data in the hard disc 450 through the hard disc controlling part 446.

When the image seeking and seeking data are input from the data input part 439, the seeking direction signal and seeking data will be input into the first serial port 442 through the control part 437 and communication interface 440. By the direction signal and seeking data, with reference to the data stored in the hard disc 450 through the hard disc controlling part 446, the CPU 444 gives the seeking direction to the time-serial image filing apparatus 404B or still image filing apparatus 404A connected respectively through the second serial port 447 or third serial port 448.

At the same time, the CPU 444 makes the video signal switching part 449 have the signal output from the still image filing apparatus 404A or time-serial image filing apparatus from which the sought image is output. This output image signal is displayed in the TV monitor 418B.

In this fifth embodiment, when the information data relating to the still image and time-serial images are commonly controlled within the hard disc 450, the desired image will be able to be easily sought.

Figure 29:
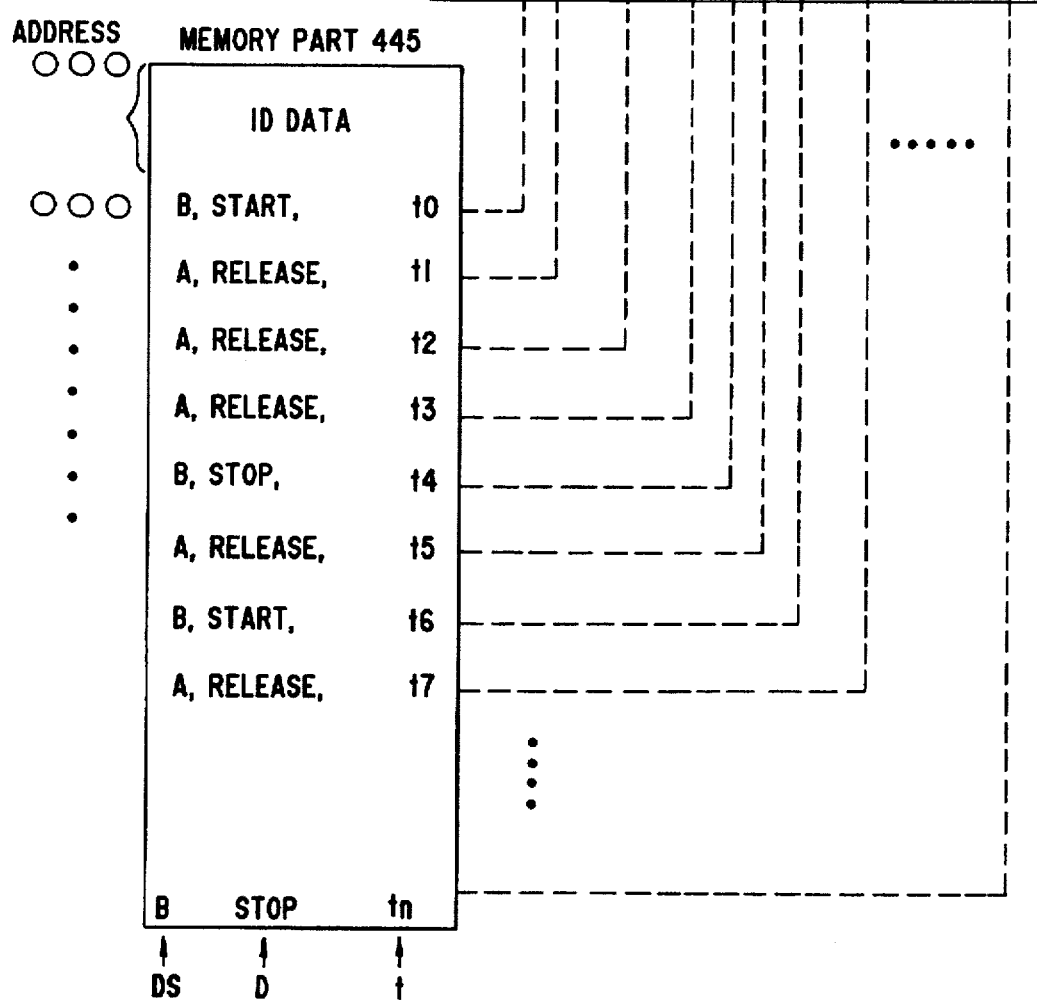
Figure 30:
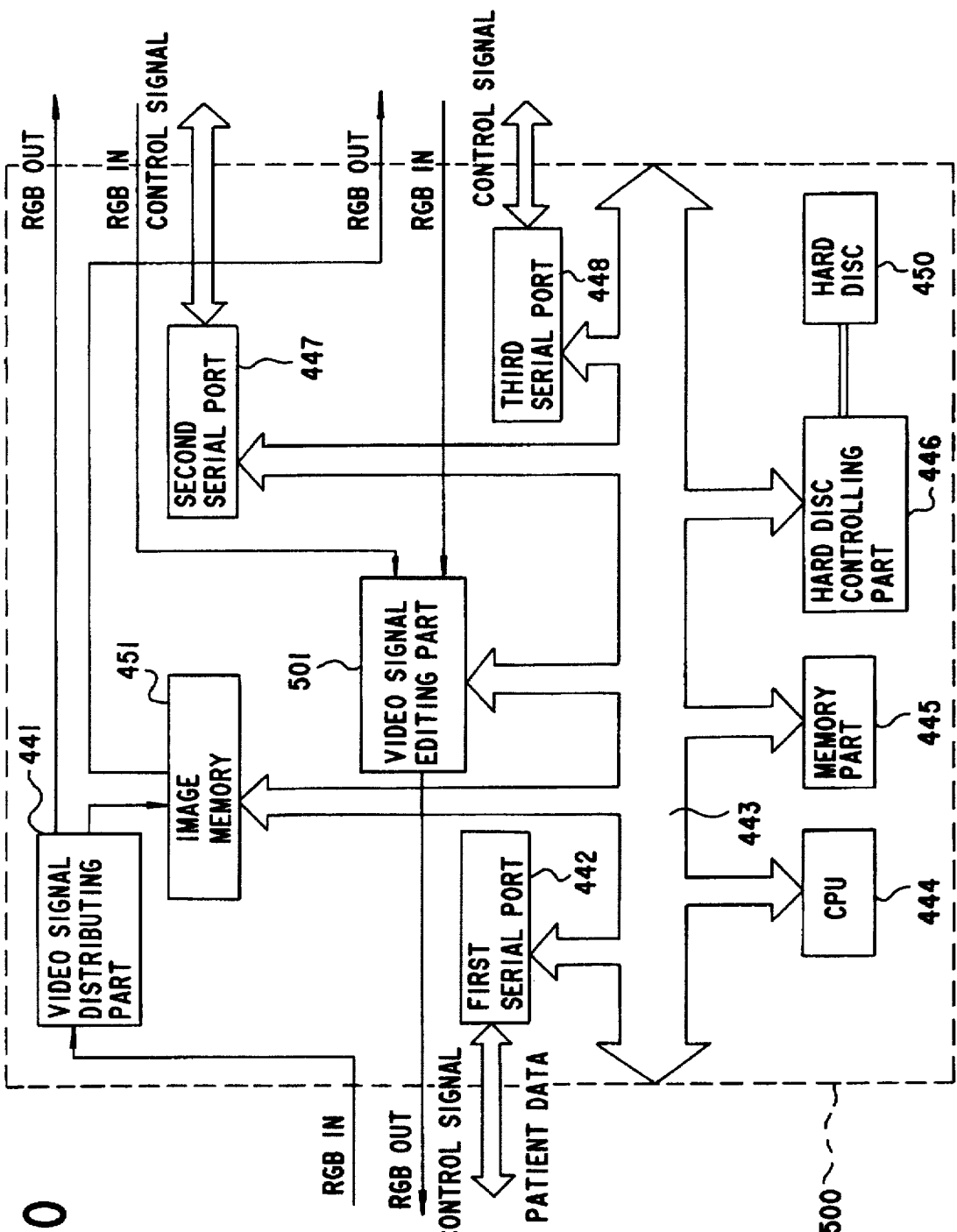
FIGS. 30 to 34 relate to the sixth embodiment of the present invention.

The releasing operation of the above mentioned still image and the start or stop of the time-serial images are memorized temporarily in the memory part 445, for example, as in FIG. 29.

If the time-serial image recording is started and stopped and the still image is released as shown in FIGS. 29(a) and (b), for example, for a patient, in the memory part 445, the discriminating data DS of whether the still image (A) or time-serial image (B), the data D of the recording start/release/recording stop and the elapsing time t are stored, for example, in the address order in the memory region next the memory region in which the ID data are stored.

That is to say, when the CPU 444 receives the recording starting signal, releasing signal and the like through the first serial port 442, the control signal will be transmitted to the corresponding time-serial image filing apparatus 404B and 404A and the signal data will be stored in the memory part 445.

When the inspection of one inspection part ends, these data will be edited and stored within the hard disc 450. By this editing, in this patient, the address and the like of the recording start and end of the time-serial data recorded in the time-serial image filing apparatus 404B are recorded within the hard disc 450. (By the way, those shown in FIG. 29 may be memorized without being edited.)

Also, the first address recorded in the still image filing apparatus 404A, number of still images, time-serial image addresses for the respective still images and the like are recorded within the above mentioned hard disc 450. (When the still image is released while the time-serial image is being recorded, the serial number of the released still image may be memorized and the time-serial image and still image may be made to correspond to each other.)

Therefore, after the inspection, in the case of seeking the image relating to the patient, for example, in case the image is sought on the still images and the noted still image is wanted to be further investigated on the time-serial images, if such direction is given, the time-serial image at the time of releasing the still image will be able to be instantly sought and displayed.

Therefore, according to this fifth embodiment, as the time-serial image file and still image file are controlled in common so as to correspond to each other in detail, the desired image can be easily sought. (On the other hand, when the images are not recorded as related, even if the image is sought on the still images and is then investigated on the corresponding time-serial images, as there is no correspondence, it will be troublesome to seek the wanted time-serial image.)

On the image file to be sought, as the information data controlled in common in the hard disc 450 can be displayed in the TV monitor 414B, the total features of the recorded still images and time-serial images can be known from the displayed data. (On the other hand, when no correspondence is made, even if the corresponding time-serial image can be sought by taking time, the recorded amount of the time-serial image may not be recorded to be sufficient for the seeking. Therefore, time may be spent in vain.)

Also, in this fifth embodiment, as the images for one inspection are recorded by two recording apparatuses, even if the recording medium recorded by either recording apparatus becomes unable to reproduce the record (for example, by loss or breakage), the image of the inspection or most of the image will be able to be reproduced.

As the recording apparatuses are plural, if the recording medium in which the images are recorded is taken to other places, the same inspection will be able to be sought in a plurality of places.

By the way, in this embodiment, two recording apparatuses are used but three or more recording apparatus may be used.

When the time-serial image is to be reproduced, data of a stop watch may displayed.

Also, at the time of reproducing the time-serial image, stop watch data may be recorded.

By the way, in the above mentioned fifth embodiment, both images are controlled as corresponding to each other in detail but may be controlled as corresponding more roughly.

For example, the recording start of the time-serial data in one inspection, ending address, number of the still images and respective releasing times may be only recorded.

FIGS. 30 to 34 show the sixth embodiment of the present invention.

The system of this sixth embodiment is formed of an image file controller 500 of a formation different from that of the image file controller 403 in the system 401 shown in FIG. 26.

Figure 27:
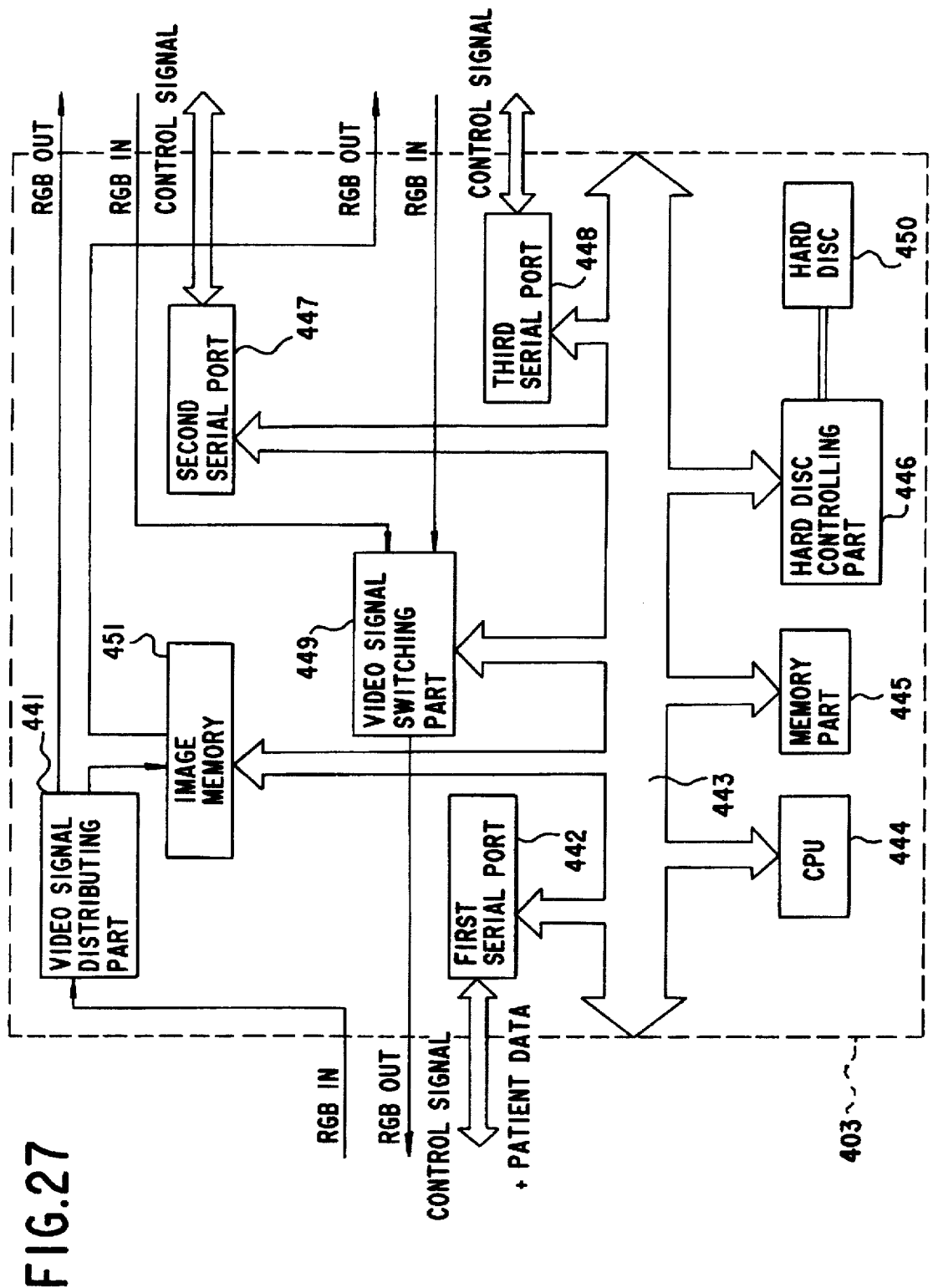

In this image file controller 500, a video signal editing part 501 is used instead of the video signal switching part 449 in the file controller 403 shown in FIG. 27.

RGB video signals are input into this video signal editing part 501 from the still image filing apparatus 404A and time-serial image filing apparatus 404B and are output to the TV monitor 418B from this video signal editing part 501.

Figure 31:
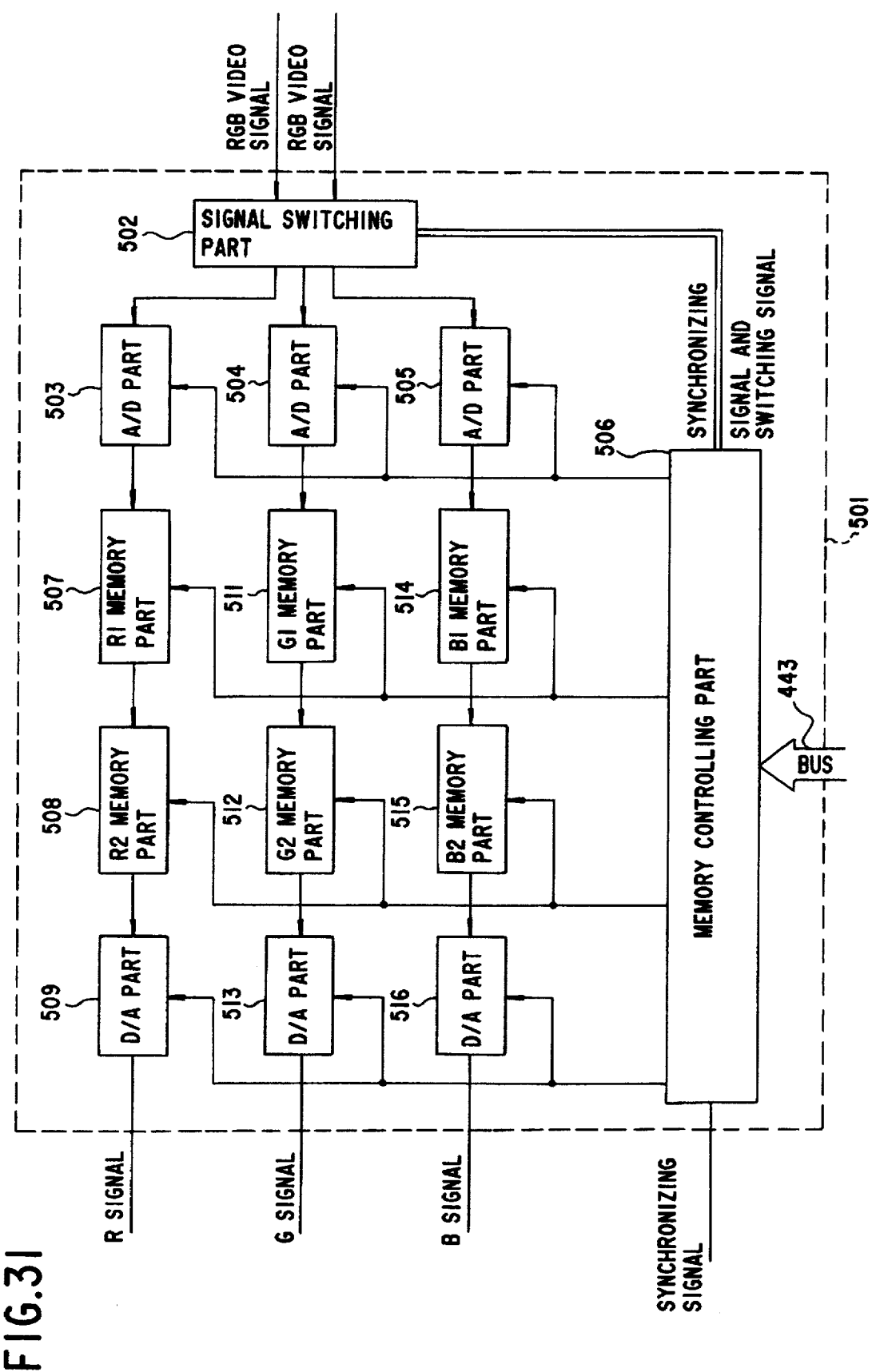

The formation of the video signal editing part 501 shall be explained in the following with reference to FIG. 31.

RGB video signals are input into a signal switching part 502 from the still image filing apparatus 404A and time-serial image filing apparatus 404B. The signal switching part 502 selects one system from two systems of video signals and outputs RGB video signals respectively to A/D parts 503, 504 and 505 and a synchronizing signal to a memory controlling part 506.

The data digitalized by the A/D part 503 are input into an R1 memory part 507. The digital data held by the R1 memory 507 are input into an R2 memory part 508. The digital data held by the R2 memory 508 are input into a D/A part 509. The R video signal analogized by the D/A part 509 is output as an R signal to the TV monitor 418B.

The data digitalized by the A/D part 504 are input into a G1 memory part 511. The digital data held by the G1 memory 511 are input into a G2 memory part 512. The digital data held by the G2 memory 512 are input into a D/A part 513. The G video signal analogized by the D/A part 513 is output as a G signal to the TV monitor 418B.

The data digitalized by the A/D part 505 are input into a B1 memory part 514. The digital data held by the B1 memory 514 are input into a B2 memory part 515. The digital data held by the B2 memory 515 are input into a D/A part 516. The B video signal analogized by the D/A part 516 are output as a B signal to the TV monitor 418B.

The memory controlling part 506 outputs clock signals synchronized with the above mentioned synchronizing signal respectively to the A/D parts 503, 504 and 505 and D/A parts 509, 513 and 516.

Also, the memory controlling part 506 outputs a synchronizing signal to the TV monitor 418B.

The direction from the CPU 444 is input into the memory controlling part 506 through the bus line 443.

By the above mentioned direction, the memory controlling part 506 outputs writing-in and reading-out signals respectively to the memory parts 507, 508, 511, 512, 514 and 515.

Also, by the above mentioned direction, a switching signal is output to the signal switching part 502.

The other formations are the same as in the above mentioned fifth embodiment and the operation shall be explained in the following.

At the time of recording, when a releasing signal is input from the data input part 439, the releasing signal will be transmitted to the CPU 444 through the control part 437, communication interface 440 and first serial port 442.

The CPU 444 memorizes in the memory part 445 the information of the time-serial image to which the timing of each releasing signal corresponds in the time-serial image filing apparatus 404B.

This is repeated for each releasing signal.

Then, the case of seeking a recorded image shall be explained in the following.

When the user seeks a time-serial image, the displaying interval time data of the time-serial image will be input from the data input part 439 of the image inputting apparatus 416. The above mentioned data are memorized in the memory part 445 by the CPU 444 through the control part 437, communication interface 440 and first serial port 442.

When the seeking is started, by the direction of the CPU 444, the memory controlling part 506 will output to the signal switching part 502 a signal to select the RGB signals from the still image filing apparatus 404A and the signal switching part 502 will select the RGB video signals from the still image filing apparatus 404A.

The RGB video signals sought from the still image filing apparatus 404A by such conditions as the patient data are digitalized respectively by the A/D parts 503, 504 and 505 and are held by the respective memory parts 507, 511 and 514.

The held digital data are thinned to be, for example, ⅓ in both horizontal and vertical directions and are held in predetermined positions in the respective memory parts 508, 512 and 515.

The next images are sought from the still image filing apparatus by such conditions as the patient data and are held in predetermined positions in the respective memory parts 508, 512 and 515 by the above mentioned operations.

Figure 32:
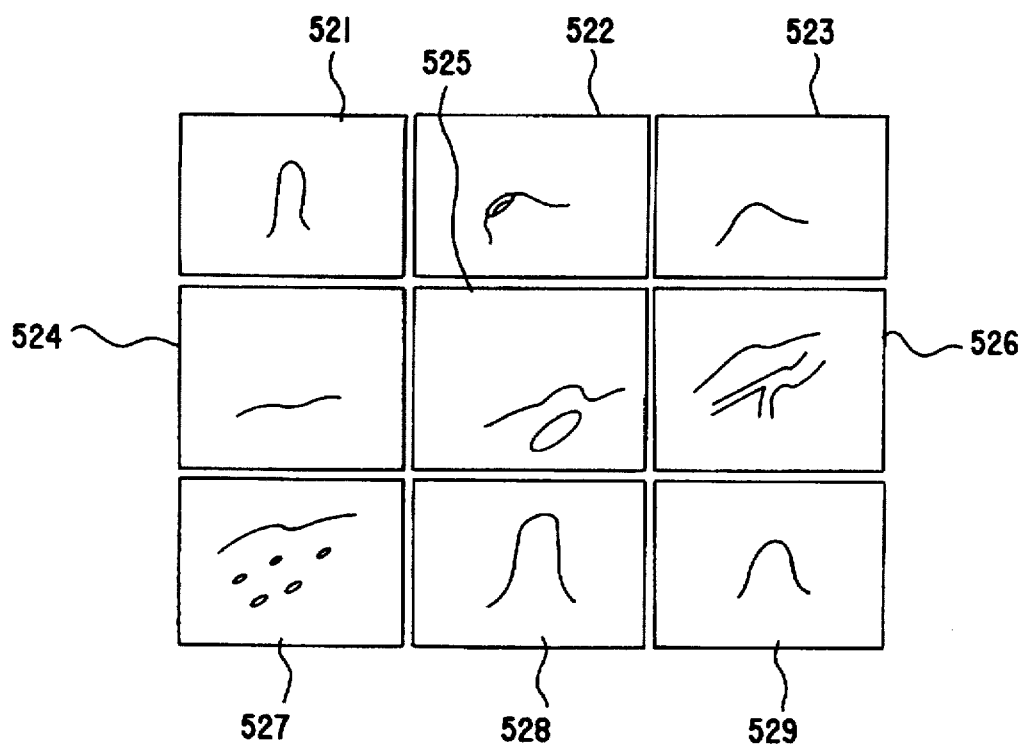

The above operations are repeated and the still image data, for example, of 9 frames are stored in the memory parts 508, 512 and 515 and are displayed in the TV monitor 418B so that still images 521, 522, ... and 529 of 9 frames may be simultaneously multi-displayed as shown in FIG. 32.

Then, the user selects either of the images 521 to 529 displayed in the TV monitor 418B and inputs data from the data inputting part 439 of the image inputting apparatus 416. When the above mentioned data are sensed by the CPU 444 through the control part 437, communication interface 440 and first serial port 442, the CPU 444 will transmit a reproducing signal to the time-serial image filing apparatus 408 through the second serial port 447 at the recording time intervals memorized in the hard disc 450 and the address corresponding to the still image through the bus line 443.

Also, through the bus line 443 and memory controlling part 506, the CPU 444 makes the signal switching part 502 select RGB video signals from the time-serial image filing apparatus 404B.

The CPU 444 transmits a freezing signal to the memory controlling part 506 at the above mentioned input displaying time intervals. The memory controlling part 506 makes the respective memory parts 507, 511 and 514 hold the RGB video signals input continuously from the time-serial image filing apparatus 408B by the above mentioned freezing signal from the CPU 444. The held digital data are held in predetermined positions in the respective memory parts 508, 512 and 515 by the thinning process the same as at the time of multi-image displaying the above mentioned still image. Where the nine frames have been processed, the operation is interrupted. The images obtained as in the above are displayed in the TV monitor 418B as in FIG. 33. Corresponding to the still image 521 is the image 531 which is time-serially displayed at the input displaying time intervals with 532, 533, ... and 539. Here, when the next image 539 is wanted to be seen, the corresponding image may be called out of the time-serial image filing apparatus 404B by the above mentioned means and the image in the position, for example, of 531 may be re-written. Also, when the image before 531 is wanted to be seen, the same may be made.

When the displaying interval time is to be processed from the respective memory parts 507, 511 and 514 to the respective memory parts 508, 512 and 515, it may be superimposed.

Also, the image corresponding to the still image may be placed in the position, for example, of the image 535 and may be controlled to compare the images before and after it.

The multi-image display may not be in nine divisions and the number of the respective divided frames may be changed when the still image and time-serial images are to be displayed.

Figure 34:
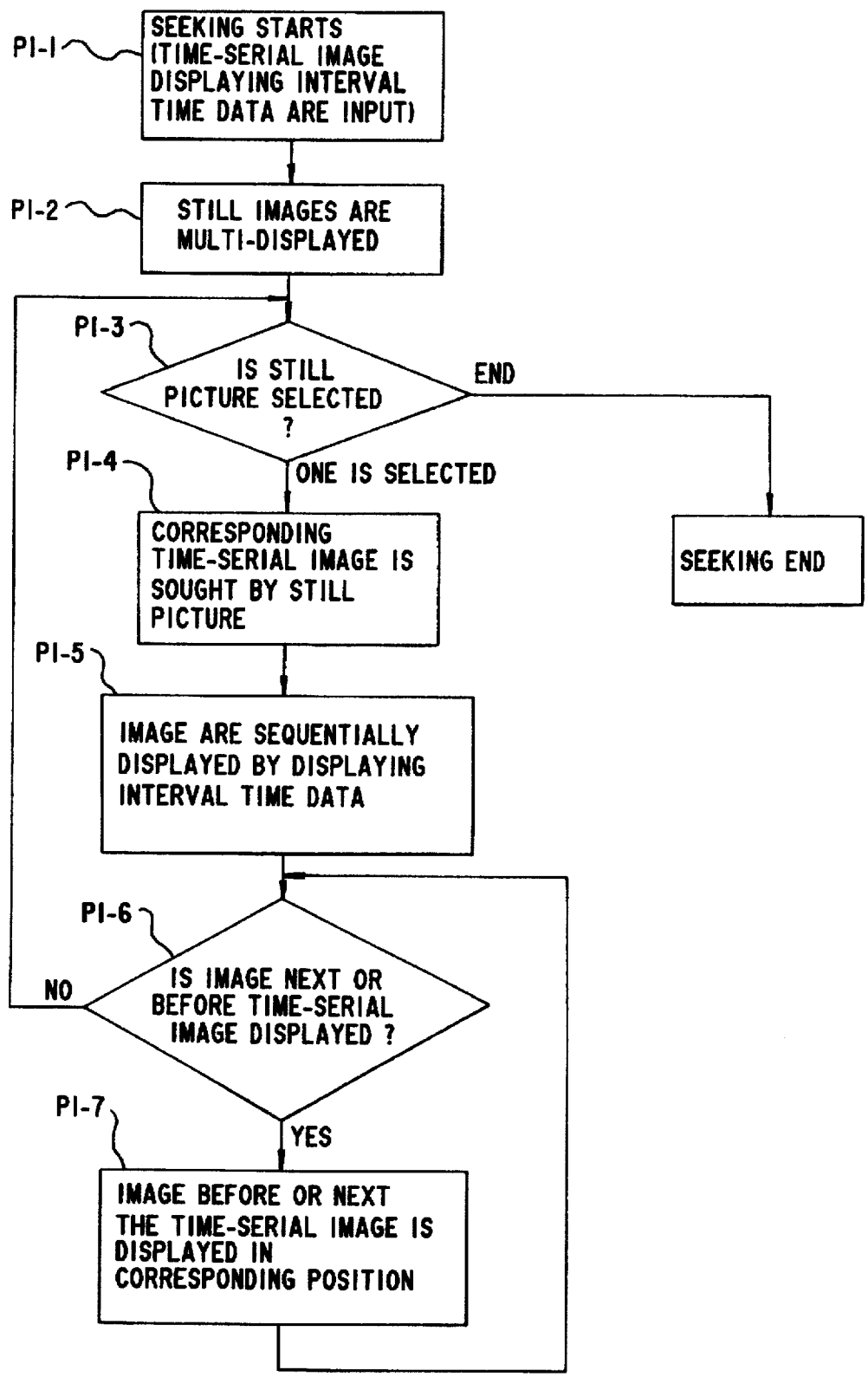
Figure 35:
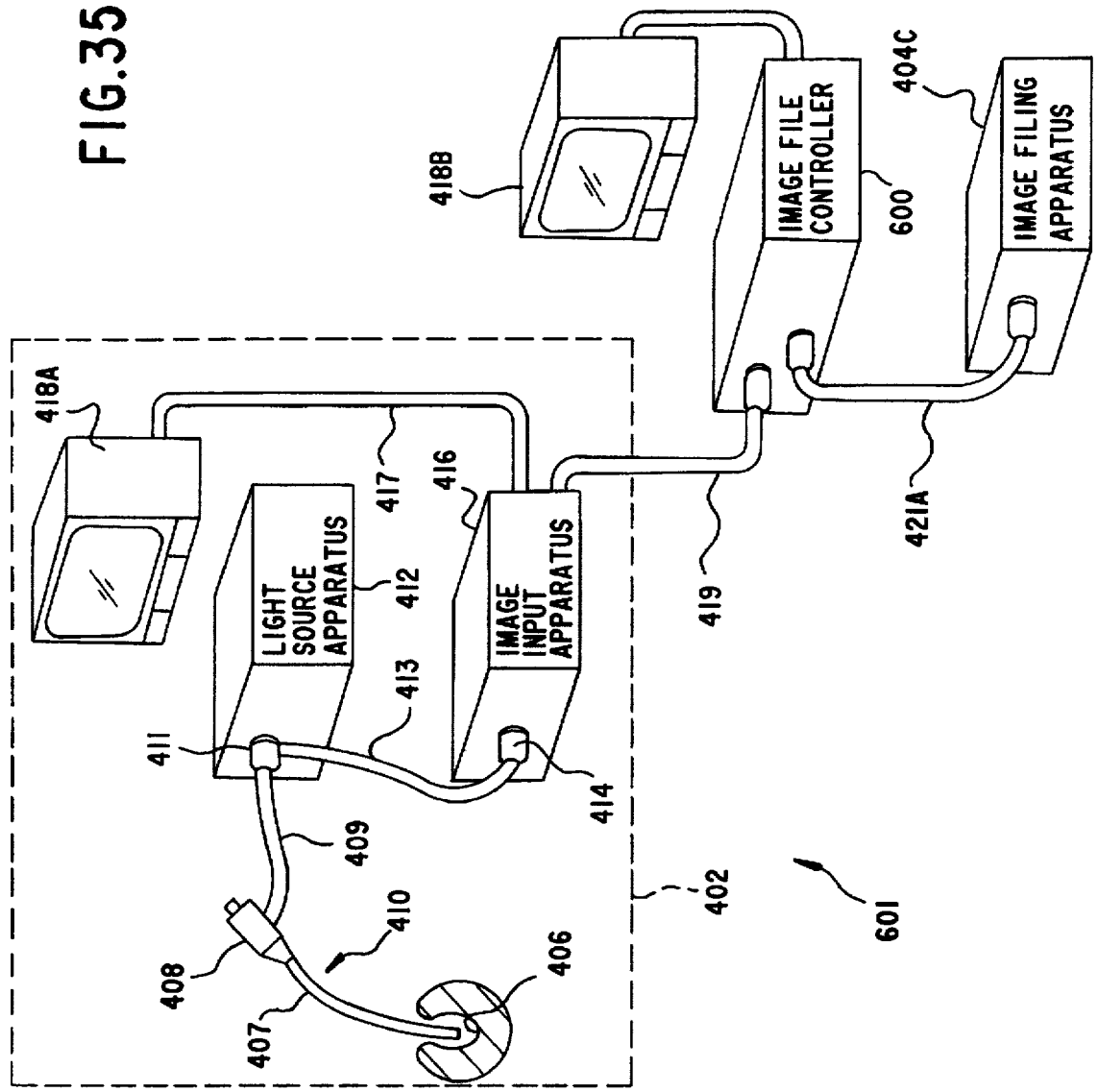
FIGS. 35 to 38 relate to the seventh embodiment of the present invention.

This operation is shown by the flow chart in FIG. 34.

That is to say, first, in the step Pi-1 (which shall be mentioned merely as "P1-1" by omitting the word "step" hereinafter), when the time-serial image displaying interval time data are input, in P1-2, the thinned still image data will be sequentially stored in the multi-displaying memories 508, 512 and 515 in FIG. 31 and, when the still picture data for nine frames have been compressed and stored, such still picture for nine frames as is shown in FIG. 32 will be displayed in the TV monitor 418B. By the way, when the sequentially compressed still image data are transferred to the memories 508, 512 and 515 and the image data of the memories 508, 512 and 514 are read out, the images 521, 522, ... will be sequentially displayed (by the way, the nine frames may be transferred and then displayed).

Figure 33:
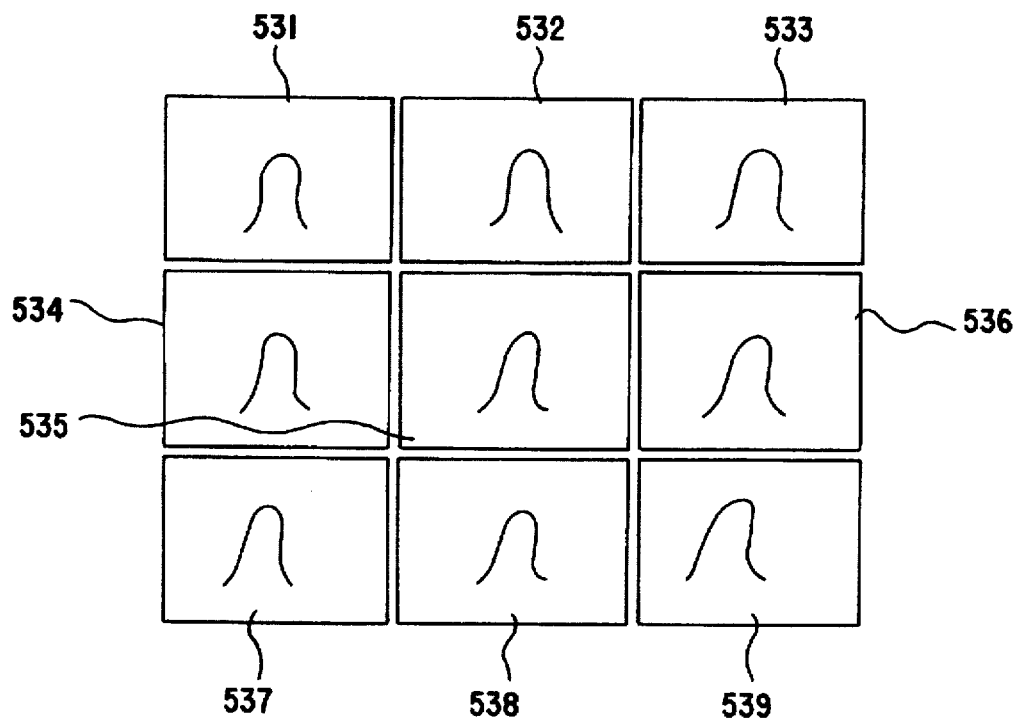

Then, after the multi-displaying, in P1-3, when the data selecting either of the displayed still pictures are input, in P1-4, the time-serial images corresponding to the selected still picture will be sought and, in P1-5, will be displayed sequentially as shown in FIG. 33 according to the above mentioned displaying interval time data.

After the time-serial images are displayed as shown in FIG. 33, in P1-6, when the data displaying the next image or front image are input, in P1-7, they will be judged and the next image or front image will be displayed in the corresponding position and the process will return to the above mentioned P1-6. For example, in FIG. 33, when the data displaying the image next the image 539 are input, the image 539 will be displayed in the position of the image 538 and the image 538 will be displayed in the position of the image 537 with the displaying position shifted (or the image 539 and those following it may be sequentially displayed in the position of the image 531).

If the desired image is thus sought, in the above mentioned P1-6, when the data not desiring the front image or next image to be displayed are input, the process will return to P1-3 and to FIG. 32 and therefore, in this P1-3, if the ending data are input, the seeking will be able to be ended.

By the way, in sixth embodiment or the fifth embodiment, the images are processed with RGB signals but may be processed with an NTSC composite signal or Y/C separated signal FIGS. 35 to 38 show the seventh embodiment of the present invention.

Figure 36:
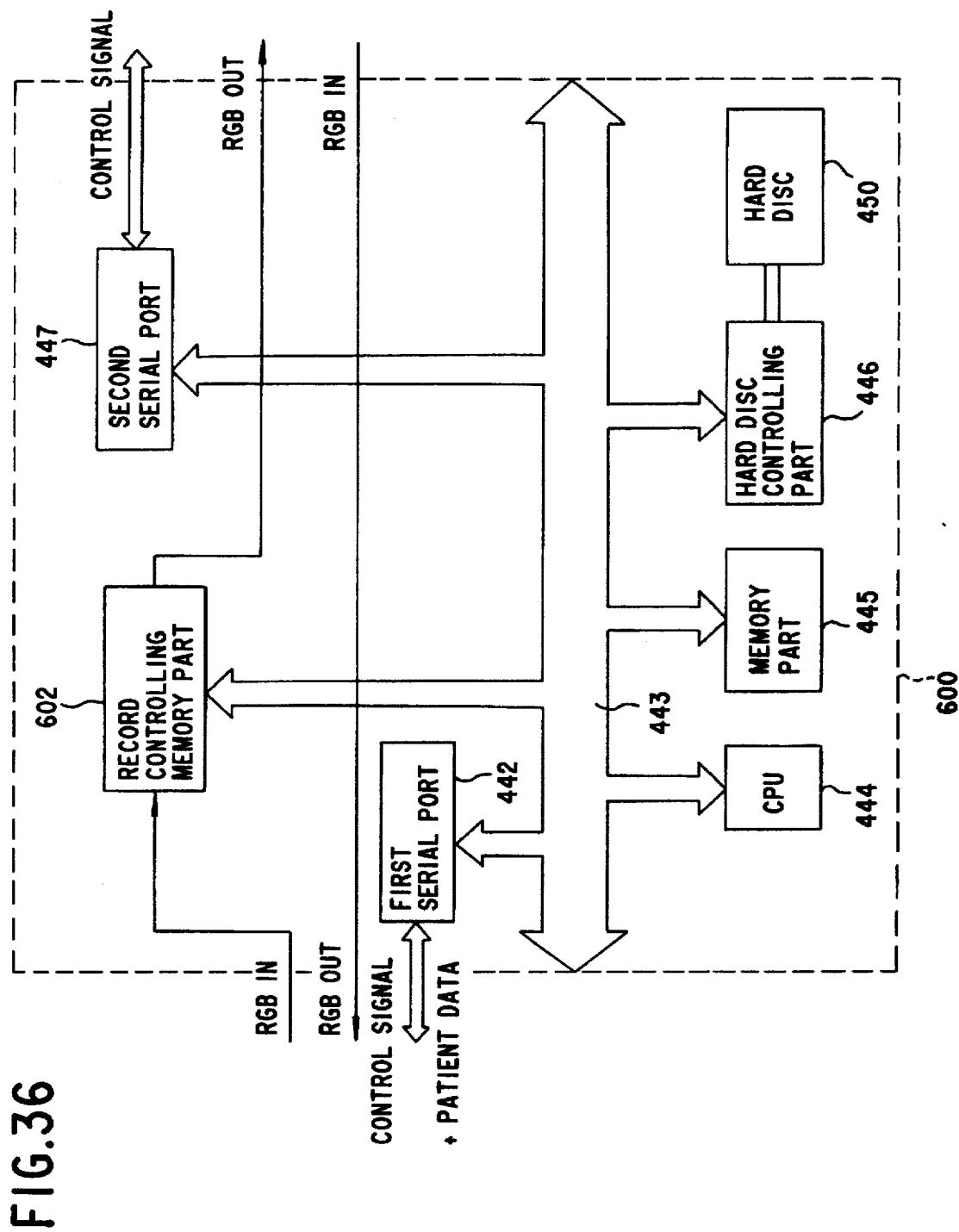

A system 601 of this seventh embodiment uses an image filing apparatus 404C provided with both functions of the still image filing apparatus 404A and time-serial image filing apparatus 404B in the fifth embodiment. This image filing apparatus 404C is controlled by an image file controller 600. The function of the above mentioned image file controller 600 is shown in FIG. 36. Whereas the image file controller 403 in FIG. 27 is connected with two image filing apparatus 404A and 404B, this image file controller 600 is connected with one image filing apparatus 404C, has therefore no video signal switching part 449 in the image file controller 403 in FIG. 27 and outputs RGB video signals to an image inputting apparatus 416 from the image filing apparatus 404C. Also, it has no video signal distributing part 441 in FIG. 27 and outputs the RGB video signals output from the image inputting apparatus 416 to the image filing apparatus 404C through a recording controlling memory part 602.

Further, it has no third serial port 448.

Figure 37:
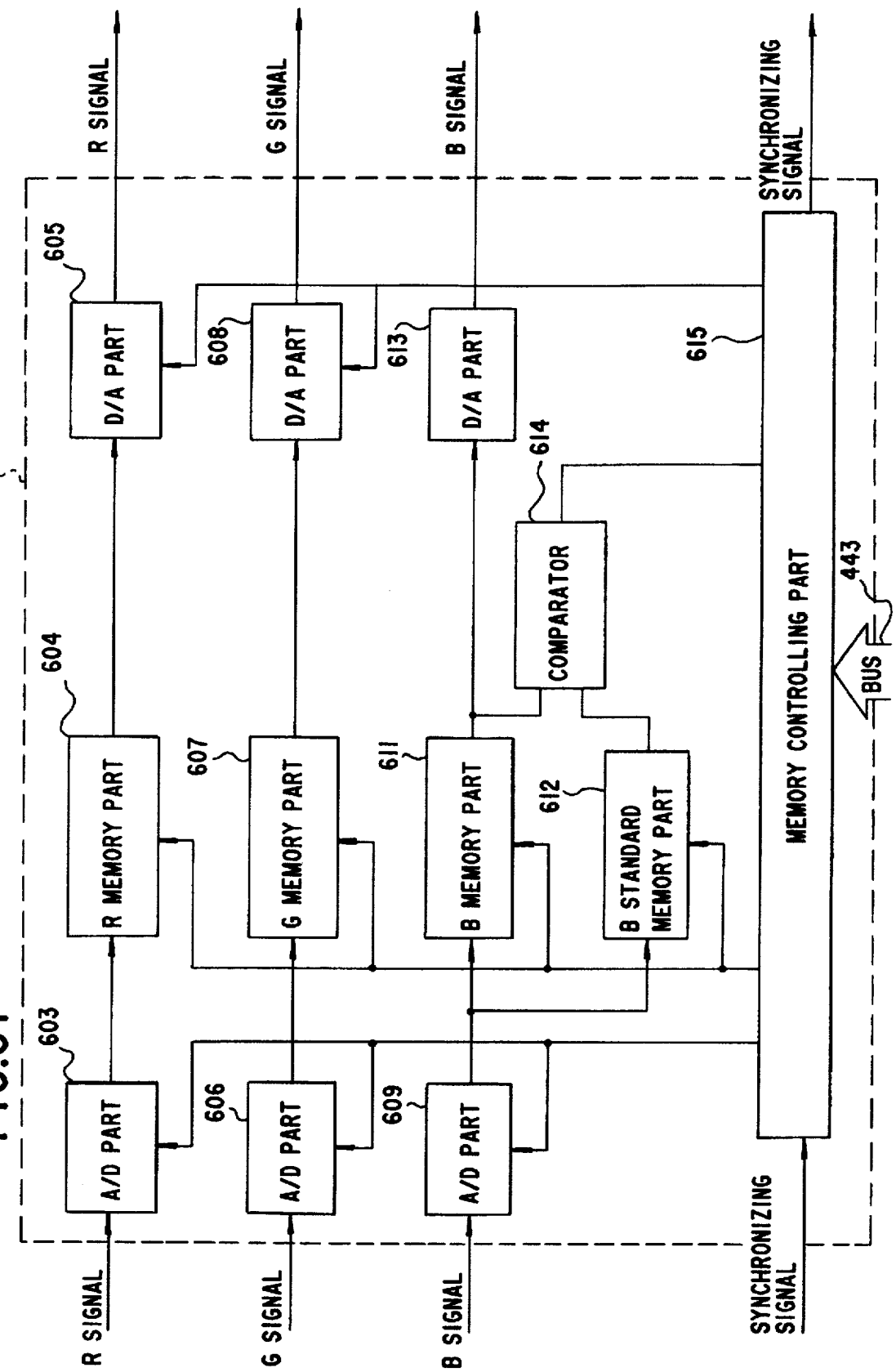

Now, the formation of the above mentioned recording controlling memory part 602 shall be explained in the following with reference to FIG. 37.

An R video signal from the image inputting apparatus 416 is input into the A/D part 603. The signal digitalized by the A/D part 603 is input into the R memory part 604. The digital data held by the R memory part 604 are input into the D/A part 605. The R video signal analogized by the D/A part 605 is delivered to the image filing apparatus 404C.

A G video signal from the image inputting apparatus 416 is input into an A/D part 606. The signal digitalized by the A/D part 606 is input into a G memory part 607. The digital data held by the G memory part 607 are input into the D/A part 608. The G video signal analogized by the D/A part 608 is delivered to the image filing apparatus 404C.

A B video signal from the image inputting apparatus 416 is input into an A/D part 609. The signal digitalized by the A/D part 609 is input into a B memory part 611 and B standard memory part 612. The digital data held by the B memory part 611 are input into a D/A part 613 and comparator 614. The video signal analogized by the D/A part 613 is delivered to the image filing apparatus 404C. The digital data held by the B standard memory part 612 are input into a comparator 614. The comparator 614 outputs to the memory controlling part 615 the result of comparing the input image data of the two systems.

The synchronizing signal from the image inputting apparatus 416 is input into the memory controlling part 615 which outputs a clock signal to the respective A/D parts 603, 606 and 609, also outputs a writing-in and reading-out controlling signal respectively to the memory parts 604, 607, 611 and 612 and outputs a clock signal to the respective D/A parts 605, 608 and 613.

The memory controlling part 615 outputs a synchronizing signal to the image filing apparatus 404C.

The above mentioned recording controlling memory part 602 is used to record in the image filing apparatus 404C the RGB video signals input from the image inputting apparatus 416 by changing the recording conditions or the like when they fit to the preset conditions.

The operation of this embodiment shall be explained in the following.

In recording the time-serial images, the user inputs the data of the conditions of the comparator 614 and recording intervals for them from the data inputting part 439 of the image inputting apparatus 416. The above mentioned data are memorized in the memory part 445 by the CPU 444 through the control part 437, communication interface 440 and first serial port 442.

Then, the user inputs a recording starting signal from the data inputting part 439 of the image inputting apparatus 416. When the above mentioned starting signal is sensed by the CPU through the control part 437, communication interface 440 and first serial port 442, the CPU 444 will transmit through the bus line 443 a freezing signal to the memory controlling part 615 at the initial recording intervals memorized in the memory part 445 and will transmit a releasing signal to the serial image filing apparatus 404C through the second port 447.

As synchronized with the synchronizing signal by the above mentioned freezing signal, the memory controlling part 615 freezes images in the R memory part 604, G memory part 607 and B memory part 611.

At this time, only the blue component of the first image is memorized in the B standard memory part 612.

The comparator 614 transmits the data of the difference of the average values of the respective image data of the B standard memory part 616 and the sequentially re-written B memory part 611 to the CPU 444 through the memory controlling part 615.

When the data of the above mentioned difference are compared with the set data memorized in the memory part 445 and become large, the CPU 444 will transmit a freezing signal to the memory controlling part 615 at the second recording interval memorized in the memory part 445 and will also transmit a releasing signal to the image filing apparatus 404 through the second serial port 447.

When the data of the above mentioned difference become smaller, the initial recording interval will return.

The state of the recording interval is once kept in the memory part 445 and is recorded in the hard disc 450 through the hard disc controlling part 446 by the recording stopping signal from the data inputting part 439 of the image inputting apparatus 416.

Figure 38:
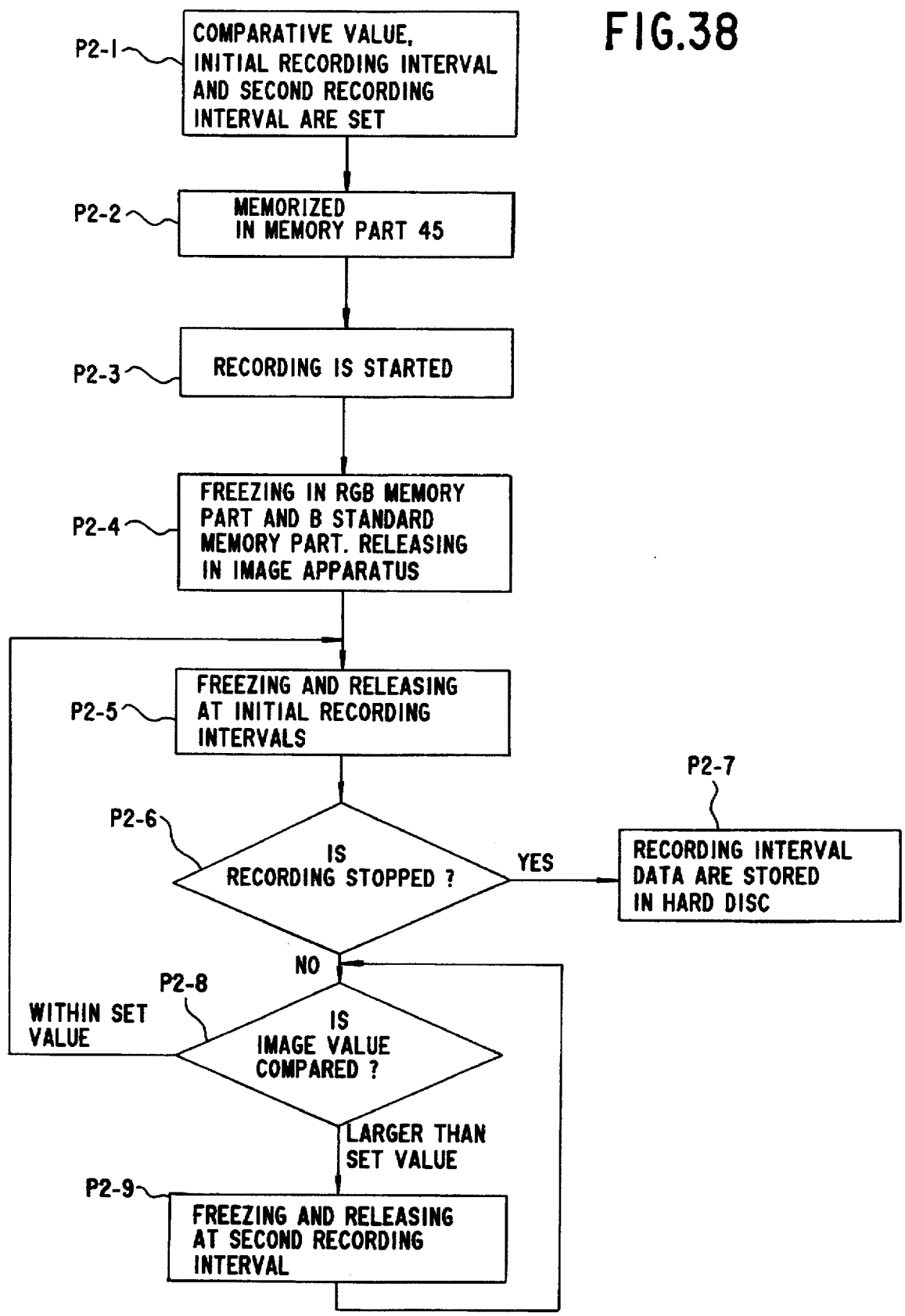

The process at the time of this recording is shown in FIG. 38.

In the case of recording, in P2-1, the user inputs the data of setting the conditions of the standard level of the comparator 615, the data of setting the initial recording interval (such recording interval as, for example, of recording 10 sheets per second) and the data of setting the second recording interval (such recording interval as, for example, 20 sheets per second) in the case of fitting to the above mentioned conditions.

In P2-2, the above mentioned setting data are memorized temporarily in the memory part 445. Then, in P2-3, when a recording starting signal is input, in P2-4, the R, G and B memory parts 604, 607 and 611 and B standard memory part 612 will be frozen and the image filing apparatus 404 will be released. Then, in P2-5, at the initial time interval, the next images are frozen and released. Then, in P2-6, whether a recording stopping signal has been input or not is judged, in the case of NO, in P2-8, the difference of the B image components of the frozen and released images from the data within the B standard memory part 612 will be calculated and, if this difference is within the set value, the process will return to P2-5 and, at the initial time interval, the next images will be repeatedly frozen and released.

On the other hand, in case a difference larger than the set value is detected by the above mentioned comparator 614, in P2-9, the freezing and releasing will be made at the second recording interval and the process will return to P2-8.

When the difference becomes smaller than the set value again, the recording will be made again at the initial time interval.

By the way, in P2-6, when the recording stopping signal is input, in P2-7, the data temporarily memorized in the memory part 445 will be stored in the hard disc 450.

By the way, it is in the case of intravenously injecting a fluorescent agent called fluorescein as explained, for example, in the second embodiment that the variation of the B image component is traced. In such case, the variation of the B image component will correspond to the fluorescence amount. Therefore, according to this embodiment, when the fluorescence amount becomes larger, the recording will be able to be made at a shorter recording interval.

At the time of reproducing the moving picture after the recording, a reproducing signal will be transmitted to the image filing apparatus 404 through the second serial port 447 by the data of the recording intervals recorded in the hard disc 450.

The recorded images are sequentially displayed by the TV monitor 418. In this case, the images can be continuously displayed at the time intervals of the recorded data or frames can be fed.

The recording intervals may be set in two or three steps such as taking the intervals of one second for 10 seconds from the recording start and 0.5 second after 10 seconds.

Also, the data to be compared may be set to be of two or more values and the recording may be made at two or more recording intervals in response to these conditions.

According to this seventh embodiment, with one image filing apparatus 404C, the still image and time-serial image can be recorded and commonly controlled.

Also, as the image to be noted can be recorded under a different recording condition, the part to be noted can be investigated in detail by the recorded image.

By the way, in the above mentioned seventh embodiment, the comparison is made with the B image but may be made with the R or G image or others or with a plurality of images of a combination of them.

Also, the comparison or the like may be made in such partial region as the central part of the image so that, in case the part to be noted has later reached a part easy to investigate, the recording interval may be varied (shortened) to make the recording.

By the way, for example, the endoscope apparatus 402 may be formed not only of the electronic scope 410 but also of a fiber-scope fitted in the eyepiece part with a TV camera.

Also, in the case of only seeking, for the endoscope apparatus 402, the electronic scope 410 or the like may not be used but only the image inputting apparatus 416 may be used.

As described above, according to the fifth to seventh embodiments, as the recorded image controlling means for commonly controlling the still image and time-serial image is provided, the still image or time-serial image can be easily sought.

FIGS. 39 to 51 show the eighth embodiment of the present invention.

Figure 39:
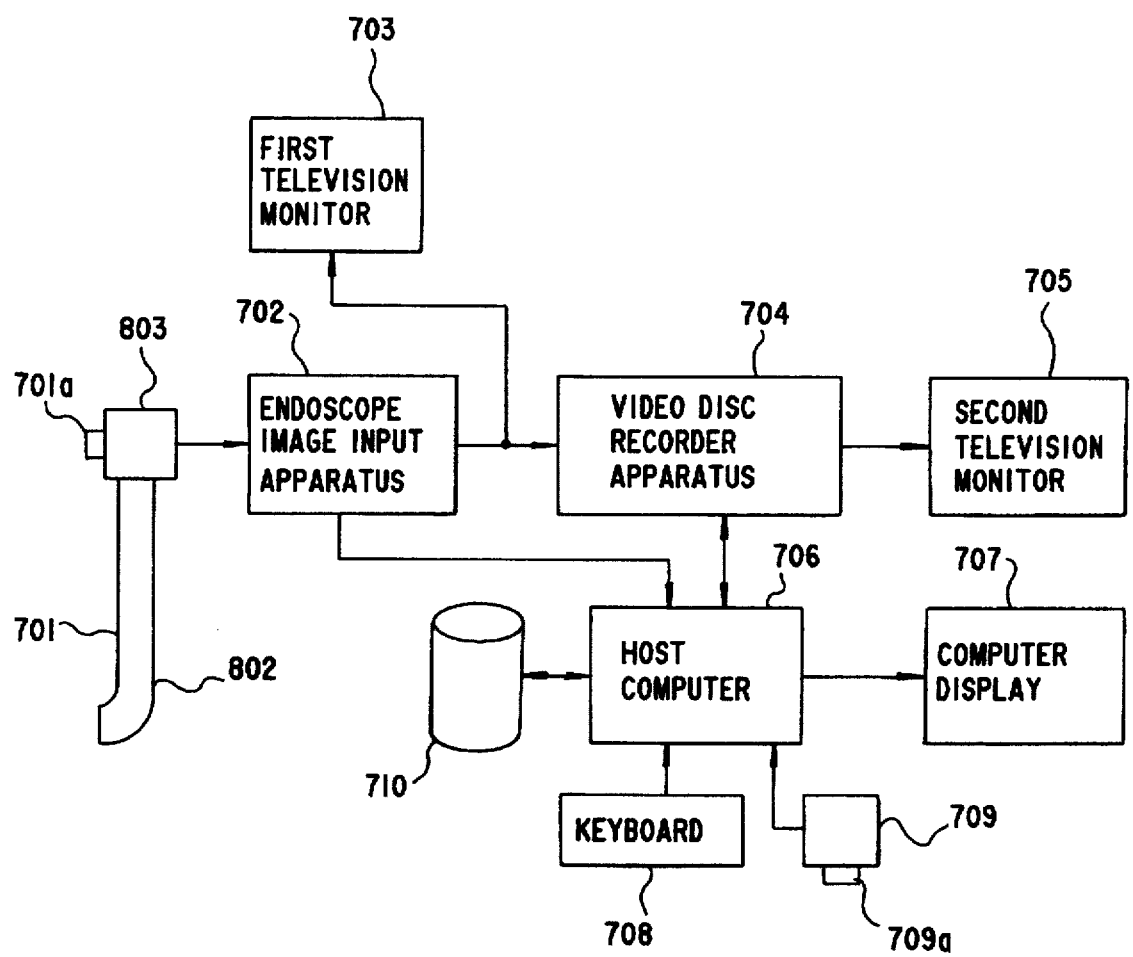

As shown in FIG. 39, an endoscope image recording and reproducing system is provided with an electronic scope apparatus 701 as an endoscope image outputting means. This electronic scope apparatus 701 is connected to an endoscope image inputting apparatus 702 which is connected to a first television monitor 703, video disc recorder apparatus 704 and host computer 706. The above mentioned video disc recorder apparatus 704 is connected to a second television monitor 705 and the above mentioned host computer 706 which is connected further with a computer display 707, keyboard 708, mouse 709 and hard disc 710.

The above mentioned electronic endoscope apparatus 701 has an elongate insertable part 802 and a thick operating part 803 connected to this insertable part 802 at the rear end. The above mentioned insertable part 802 is provided in the tip part with an illuminating window and observing window. A light distributing lens not illustrated is provided inside the above mentioned illuminating window and a light guide not illustrated is connected to this light distributing lens at the rear end. This light guide is to be connected at the base end to a light source apparatus not illustrated. Also, an objective lens system not illustrated is provided inside the above mentioned observing window. Such solid state imaging device as a CCD is arranged in the image forming position of this objective lens system. The image signal imaged by this solid state imaging device is input into the above mentioned endoscope image inputting apparatus 702. The above mentioned operating part 803 is provided with a releasing switch 701a directing the release to be on/off so that, whenever this releasing switch 701a is once pushed, a release on/off signal may be transmitted to the above mentioned endoscope image inputting apparatus 702.

In the above mentioned endoscope image inputting apparatus 702, the image imaged by the above mentioned electronic scope apparatus 701 is processed to be a video signal which is output, the release on/off signal transmitted from the above mentioned electronic scope apparatus 701 is relayed and transmitted to the host computer 706 and the ID (identification) code of the patient to be inspected is input and is transmitted to the host computer 706.

In the above mentioned first television monitor 703, the video signal output from the above mentioned endoscope image inputting apparatus 702 is input and is displayed as an image.

Also, in the above mentioned video disc recorder apparatus 704, the video signal output from the above mentioned endoscope image inputting apparatus 702 is input, is recorded in a photodisc and is reproduced and output so that the moving image and still image may be recorded, the image recorded as a moving image may be reproduced as a moving image and the image recorded as a moving image or still image may be reproduced as a still image. The operation of this video disc recorder apparatus 704 is controlled by a command transmitted from the host computer 706. A table of these commands is shown in FIG. 49. Nine commands and their operations are as follows:

1. Set the recording mode

The reproduction of the image is stopped and the head is moved to the top of a vacant track of the disc to enable the recording to start.

2. Record the still image

The image of one frame is recorded and the head is moved to the next frame.

3. Start the recording

The recording of the moving picture is started. If in recording, nothing is done.

4. Stop the recording

The recording is stopped to end the recording mode. If not in the recording mode, nothing is done.

5. Seek the track

The track number is made a parameter, the head is moved to the designated track and the recorded image is reproduced to be a still picture. If in the recording mode, nothing is done. If the moving picture is being reproduced, it is stopped and then this is carried out.

6. Reproduce the moving picture

The reproduction of the moving picture is started from the present track position of the head. If in the recording mode, nothing is done.

7. Stop the reproduction of the moving picture

The reproduction of the moving picture is stopped. If the moving picture is not being reproduced, nothing is done.

8. Check the state

Whether in any of the states that:
(1) The recording mode is on standby;
(2) The recording mode is in recording;
(3) The still picture is being reproduced: and
(4) The moving picture is being reproduced This state is checked and returned.

9. Check the track number

The present track position of the head is returned.

The video signal reproduced and output by this video disc recorder apparatus 704 is input into the above mentioned second television monitor 705 and is displayed as an image.

As shown in the later described flow chart, on the basis of a program, the above mentioned host computer 706 controls the entire operation and makes the following operations. That is to say, the host computer 706 receives the release on/off signal from the endoscope image inputting apparatus 702, transmits such commands as are described above to the video disc recorder apparatus 704, controls the displayed contents of the computer display 707, receives the input from the keyboard 708, receives the coordinate information from the mouse 709, senses the push down of the mouse switch 709a of the mouse 709 and inputs and outputs programs and data with the hard disc 710. Also, this host computer 706 has a watch within it so that the date and time may be obtained.

The above mentioned computer display 707 displays images on the basis of the control by the above mentioned host computer 706.

Also, the above mentioned keyboard 708 outputs the contents input by the operator to the above mentioned host computer 706.

The above mentioned mouse 709 designates specific coordinates on the computer display 707 by the operation of the operator, outputs the coordinate data to the above mentioned host computer 706 and has a mouse switch 709a so that, when this mouse switch 709a is pushed down, it may be known to the host computer 706.

Also, the above mentioned hard disc 710 records such information as of programs and data and inputs and outputs it with the above mentioned host computer 706.

Now, a photodisc not illustrated fitted to the above mentioned video disc recorder apparatus 704 has, for example, 24000 tracks, signals of one frame of an image are recorded in each track and numbers starting from 1 and increasing sequentially are attached to the respective tracks.

In the case of recording a still image, any track in which no image is yet recorded may be selected to have the still image recorded in it. In the case of recording a moving picture, the images may be recorded sequentially in the order of the numbers from the position of the track number. This is schematically shown in FIG. 40.

Figures 40, 41:
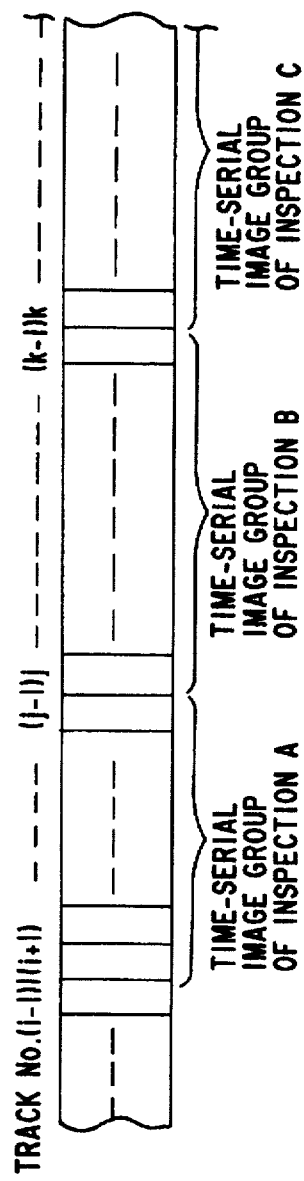

As shown in FIG. 40, when images up to the (i-1)th track are already recorded in the photodisc, if the recording of the moving images of the next inspection (called the inspection A here) is started from the i-th track and is ended in the (j-1)th track, a series of images from the i-th to (j-1)th will be images (time-serial image group) of the inspection A. The images (time-serial image groups) of the inspections B, C, . . . are recorded in the same manner hereinafter.

These recorded images are registered and controlled in a data base. The control items of this data base are shown in FIG. 41.

In this data base, one inspection is a seeking unit in which there are the following four items.

The first item is the "Patient ID Number" in which the ID number of the inspected patient is registered.

The second item is the "Inspection Date and Time" in which the date and time when the inspection was made are registered.

The third item is the "Recording Beginning Track" in which, for example, in the inspection A, (i) is registered.

The fourth item is the "Recording Ending Track" in which, for example, in the inspection A, (j-1) is registered.

Various known techniques can be applied to the formation and operation of this data base itself which shall not be detailed. In this embodiment, there are such items as are shown in FIG. 41, any specific inspection can be sought with the patient's ID number or inspection date and time as a key word and, as a result, the contents of the above mentioned four items registered as of the inspection can be referred to.

Figure 50:
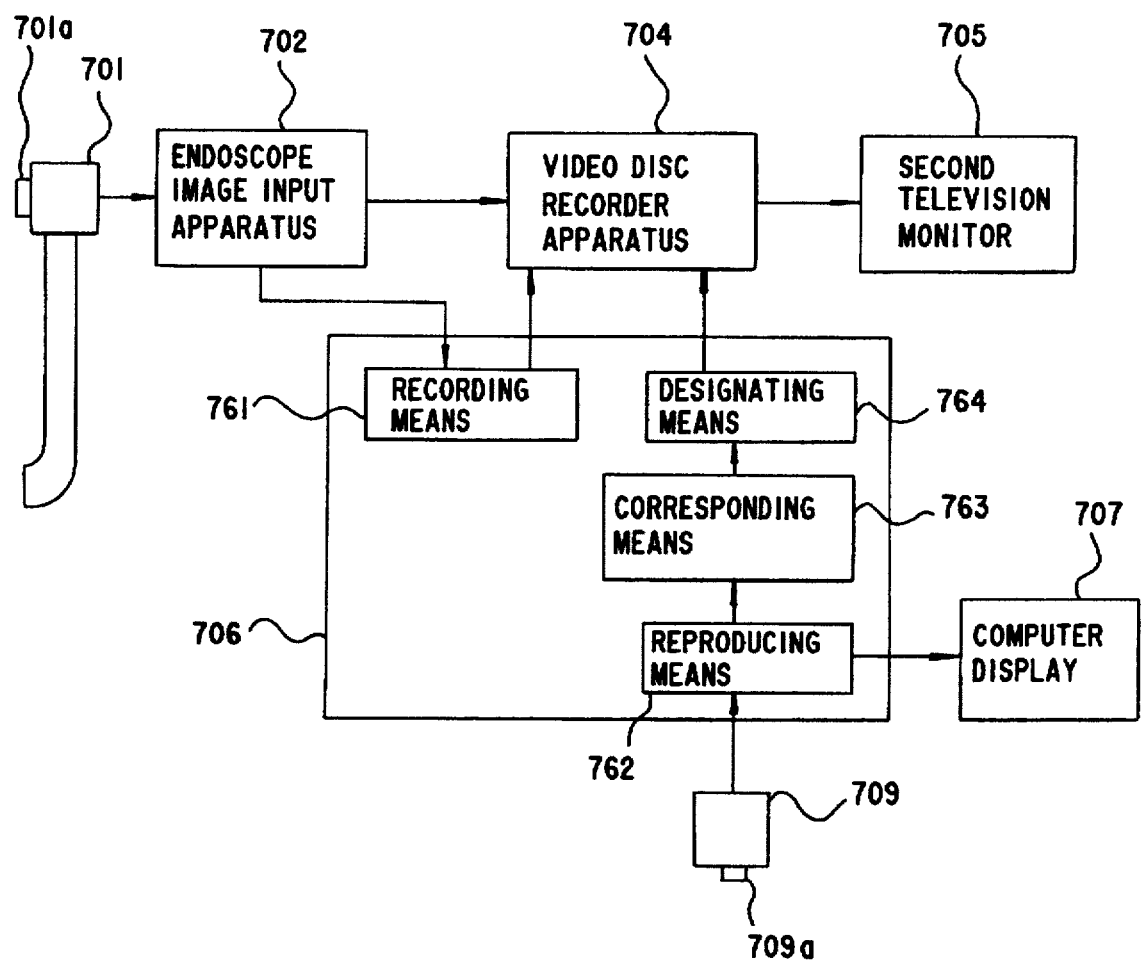

FIG. 50 shows the function of the above mentioned host computer 706 in a block diagram.

This host computer 706 comprises a recording means 761 for recording in a video disc recorder apparatus 704 images from an endoscope image inputting apparatus 702 as a series of a plurality of images ordered with a Predetermined time relation, a designating means 762 for designating a specific time for the time of the entire series of the plurality of images recorded by the above mentioned recording means 761, a corresponding making means 763 for making a specific image in the series of the plurality of images recorded by the above mentioned recording means 761 correspond to the specific time designated by the above mentioned designating means 762 and a reproducing means for reproducing the specific image made to correspond by the above mentioned corresponding means 763 from the above mentioned video disc recorder apparatus 704.

The operation of this embodiment shall be explained in the following with reference to FIGS. 42 to 48.

The host computer 706 operates as shown in the flow charts in FIGS. 42 to 45.

Figure 42:
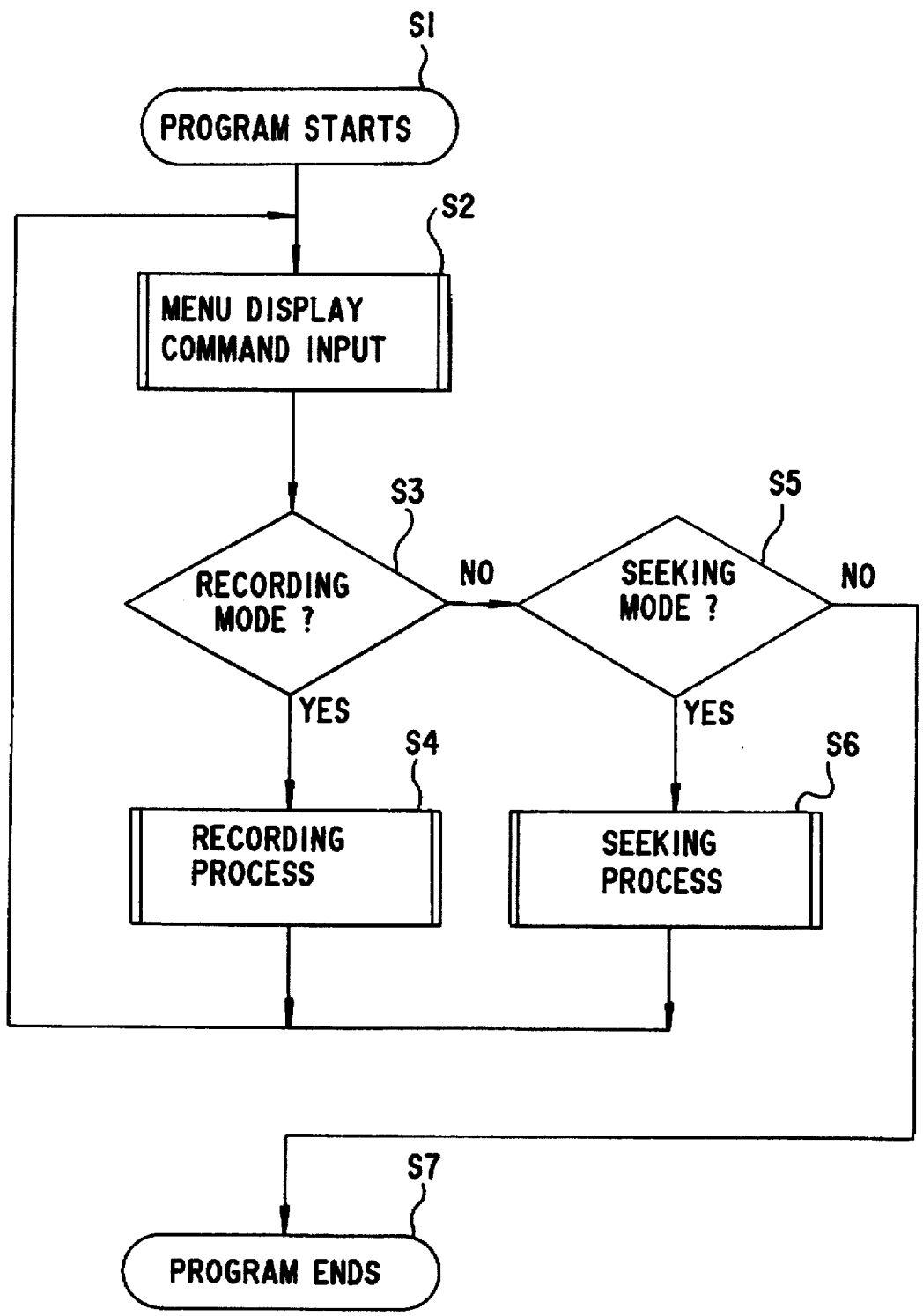

First of all, the main program shown in FIG. 42 shall be explained.

Figure 46:
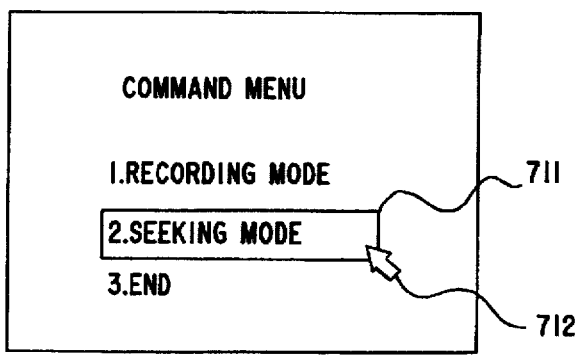

In the step S1 (which shall be mentioned merely as "S1" by omitting the word "step" hereinafter), when the program starts, in S2, the command menu image shown in FIG. 46 will be displayed in the computer display 707. In FIG. 46, when the mouse 709 is operated, the mouse cursor 712 will move on the image in the computer display 707. At this time, when the mouse cursor 712 is in the position pointing any of "1. Recording Mode", "2. Seeking Mode" and "3. End", the selecting marker 711 will be displayed as surrounding the pointing position. While this selecting marker 711 is displayed, if the operator pushes down the mouse switch 709a, the host computer 706 will recognize the command to have been selected.

Then, in S3, whether the command input in the above mentioned S3 is to select the recording mode or not is judged, if the command is to select the recording mode, it will be branched to S4 and, if not, it will be branched to S5.

Figure 43:
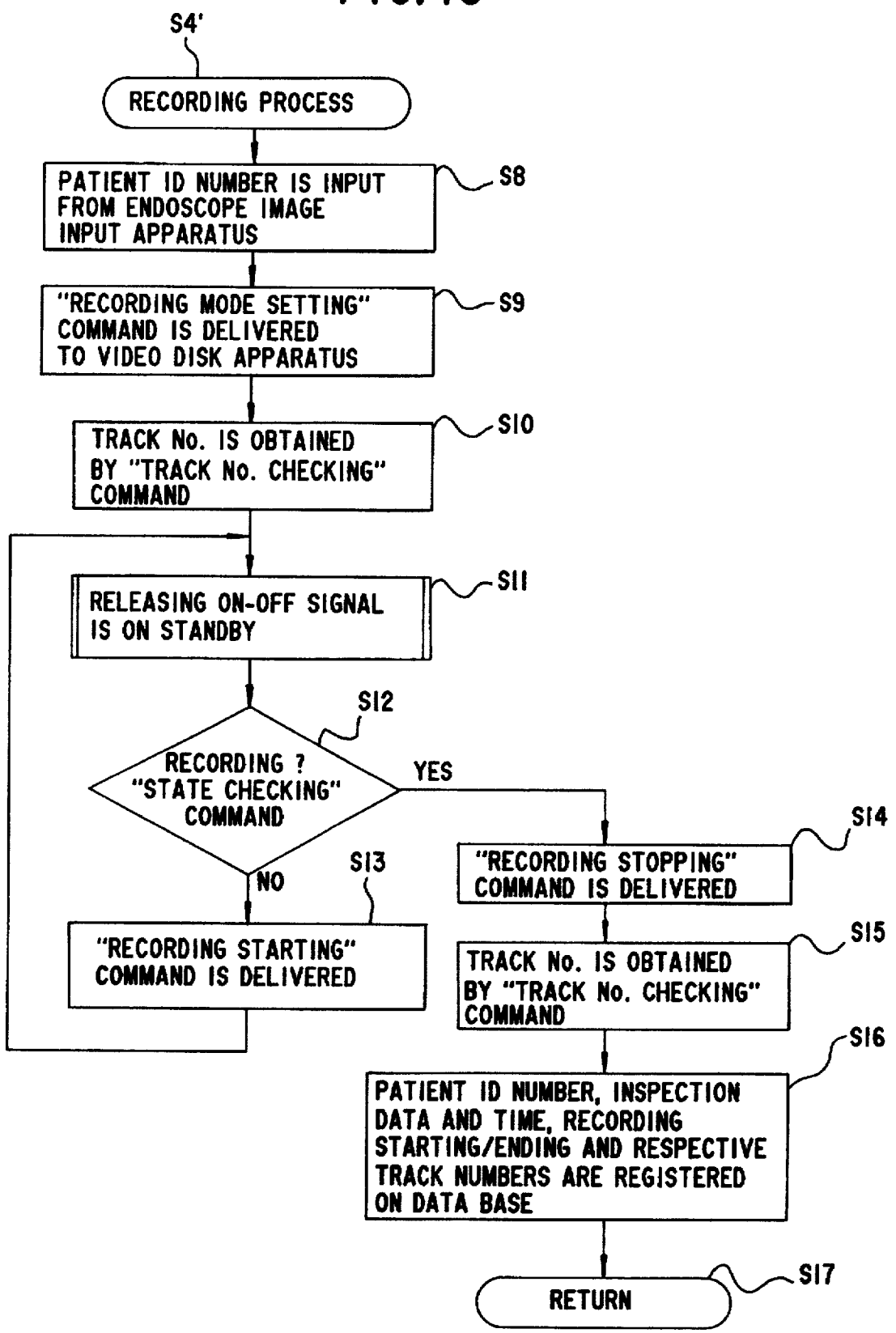

In the above mentioned S4, the sub-routine of the recording process shown in FIG. 43 is made and the process returns to the above mentioned S2.

On the other hand, in the above mentioned S5, whether the command input in the above mentioned S2 is to select the seeking mode or not, if the seeking mode is to be selected, it will be branched to S6 and, if not, it will be branched to S7.

Figure 44:
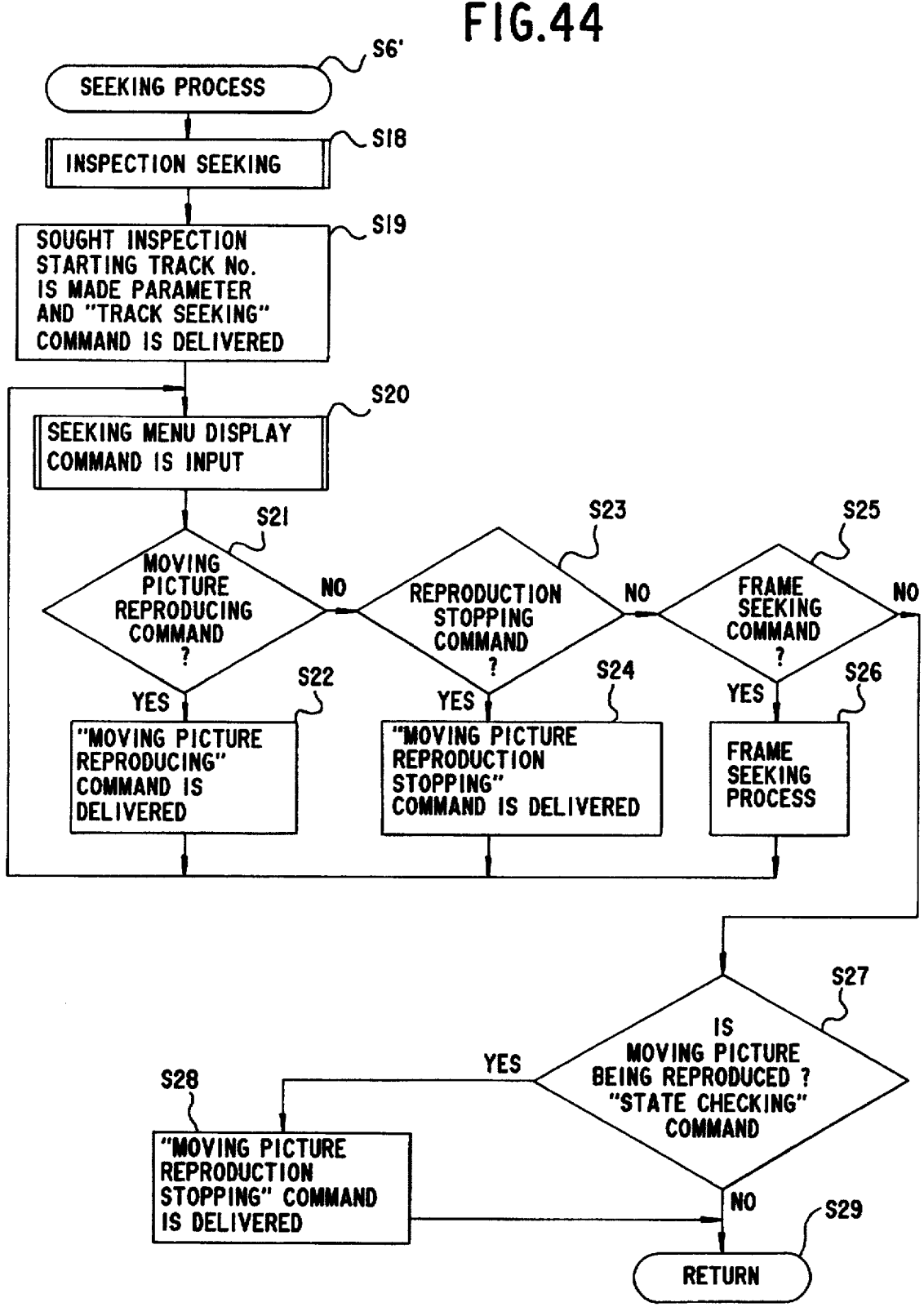

In the above mentioned S6, the sub-routine of the seeking process shown in FIG. 44 is made and the process returns to the above mentioned S2.

In the above mentioned S7, the main program ends.

The sub-routine of the recording process shown in FIG. 43 shall be explained in the following.

In S4', when the recording process starts, in S8, the patient's ID number from the endoscope image inputting apparatus 702 will be input.

Then, in S9, the command of "Set the recording mode" is delivered to the video disc recorder apparatus 704.

Then, in S10, the command of "Check the track number" is delivered to the video disc recorder apparatus 704 to obtain the present track position which is made a recording starting track number.

Then, in S11, the release on/off signal is on standby to be transmitted from the endoscope image inputting apparatus 702. When it is transmitted, the process will move to the next S12.

In S12, when the command of "Check the state" is delivered to the video disc recorder apparatus 704, the present operating state of the video disc recorder apparatus 704 will be obtained. Whether it is the "Recording mode in recording" or not is judged. If it is the "Recording mode in recording", it will be branched to S14 and, if not, it will be branched to S13.

In the above mentioned S13, the command of "Start recording" is delivered to the video disc recorder apparatus and the process returns to the above mentioned S11.

On the other hand, in the above mentioned S14, the command of "Stop recording" is delivered to the video disc recorder apparatus 704 and the process moves to the next S15.

In S15, the command of "Check the track number" is delivered to the video disc recorder apparatus 704 to obtain the present track position. The track before one from this track position is made a recording ending track number.

Then, in S16, the patient's ID number input in the above mentioned S8, then the date and time, recording beginning track number and recording ending track number are registered in the data base.

Then, in S17, this sub-routine ends and the process moves to the next the position called out.

This recording process corresponds to the recording means 761 shown in FIG. 50.

The sub-routine of the seeking process shown in FIG. 44 shall be explained in the following.

In S6', when the seeking process starts, in S18, the sub-routine called the "inspection seeking" not illustrated will be made. In this sub-routine, the patient's ID number, inspection date and others are made key words and the specific inspection is selected out of the data registered in the data base in the past to obtain the data (recording beginning track number and recording ending track number).

Then, in S19, the recording beginning track number of the inspection sought in the above mentioned S18 is made a parameter and the command of "Seek the track" is transmitted to the video disc recorder apparatus 704.

Figure 47:
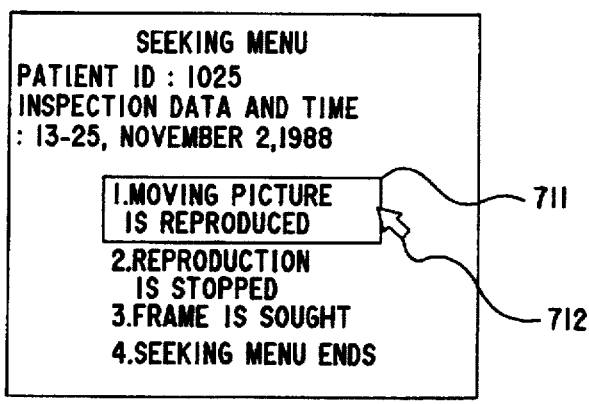

Then, the seeking menu shown in FIG. 47 is displayed in the computer display 707 and, in the same manner as the inputting manner in the above mentioned S2, either of the commands of "Reproduce the moving picture", "Stop the reproduction", "Seek the frame" and "End the seeking menu" is input.

Then, in S21, whether the command input in the above mentioned S20 is "Reproduce the moving picture" or not is judged. If so, the process is branched to S22. If no so, it is branched to S23.

In the above mentioned S22, the command of "Reproduce the moving picture" is delivered to the video disc recorder apparatus and the process returns to the above mentioned S20.

On the other hand, in the above mentioned S23, whether the command input in the above mentioned S20 is "Stop the reproduction" or not is judged. If so, the process is branched to S24. If not so, it is branched to S25.

In the above mentioned S24, the command of "Stop the moving picture reproduction" is delivered to the video disc recorder apparatus and the process returns to the above mentioned S20.

On the other hand, in the above mentioned S25, whether the command input in the above mentioned S20 is "Seek the frame" or not is judged. If so, the process is branched to S27. If not so, it is branched to S27.

Figure 45:
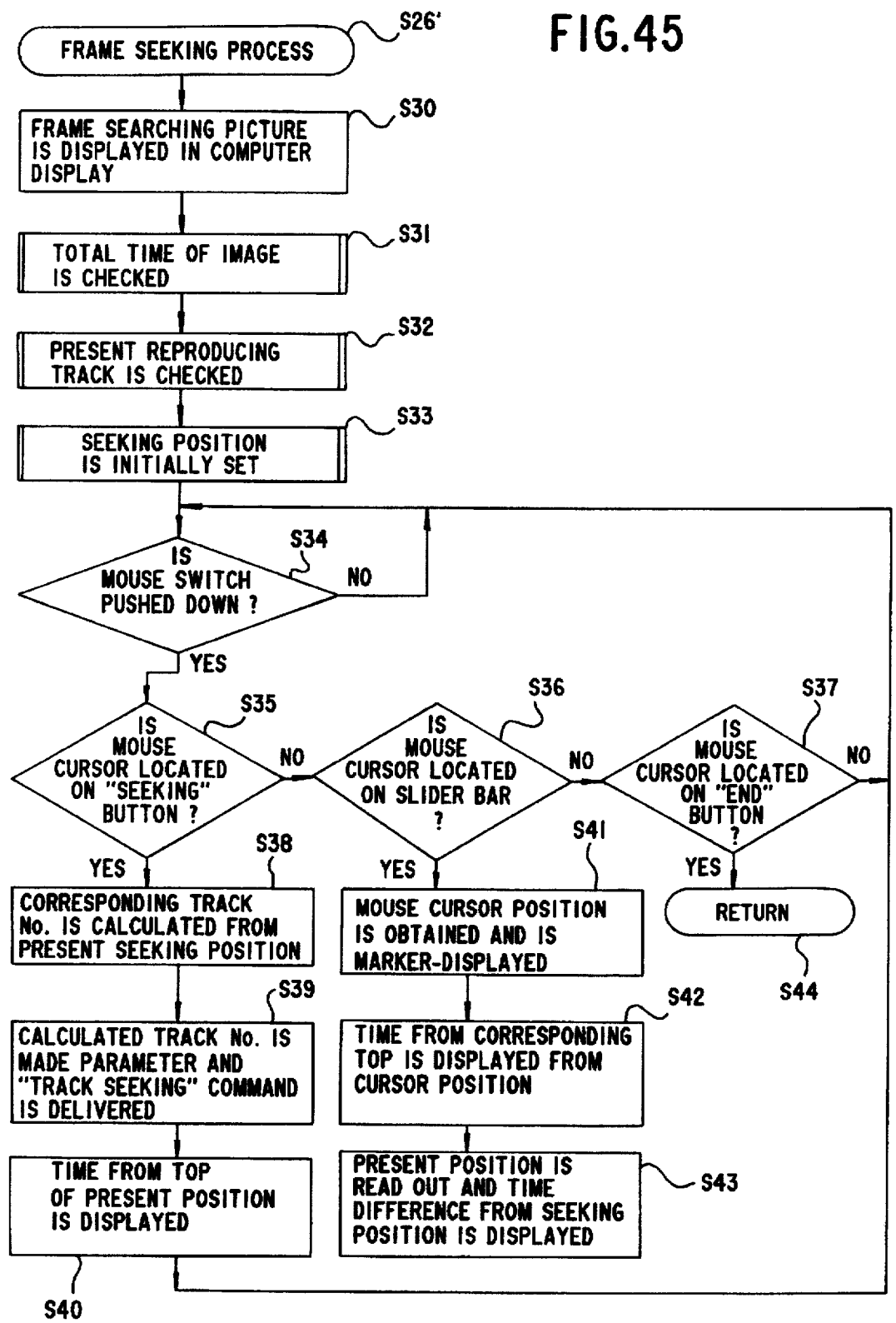

In the above mentioned S26, the sub-routine called the "frame seeking process" shown in FIG. 45 is made and the process returns to the above mentioned S20.

On the other hand, in the above mentioned S27, the command of "Check the state" is delivered to the video disc recorder apparatus 704 to obtain the present operating state of the video disc recorder apparatus 704 and whether it is "the moving picture is being reproduced" or not is judged. If it is "the moving picture is being reproduced", the process is branched to S28. If not, it is branched to S29.

In the above mentioned S28, the command of "Stop the moving picture reproduction" is delivered to the video disc recorder apparatus 704 and the process moves to S29.

In the above mentioned S29, this sub-routine is ended and the process moves to the next of the positions called out.

The sub-routine called the frame seeking process shown in FIG. 45 shall be explained in the following.

In the following, the below mentioned variables are used:

Ts: Recording beginning track of the sought inspection.

Te: Recording ending track of the sought inspection.

Tx: Track number corresponding to the present set seeking position.

Jx: Present set seeking position (second).

n: Number of frames per second of the recorded moving picture.

Figure 48:
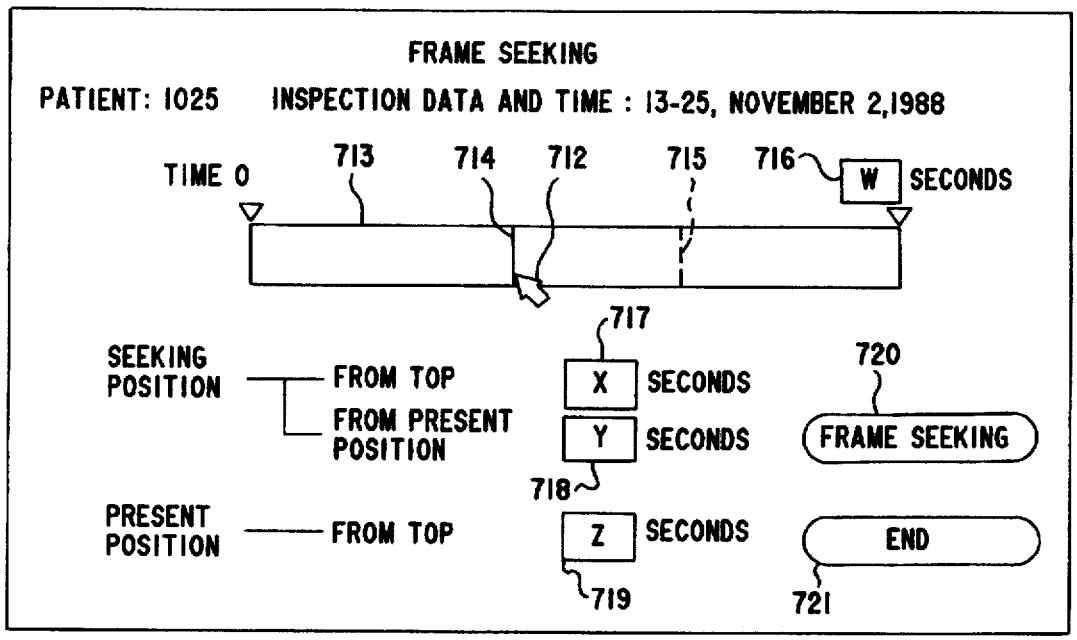

In S26', when the frame seeking process starts, in S30, the frame seeking picture shown in FIG. 48 will be displayed in the computer display 707. In this FIG. 48, the slider bar 713 represents the entire image of the inspection and the time is represented in the horizontal direction. That is to say, the left end of the slider bar 713 represents the image recording beginning time point, the right end represents the recording ending time point and the intermediate point represents the time point at which some time has elapsed from the recording beginning time point in proportion to the position.

The seeking position marker 714 is a marker of the vertical line on the slider bar 713 set at present and the image with which the time corresponding to the position on the slider bar 713 has elapsed from the recording beginning time point is sought and reproduced.

The present position marker 715 represents what time has elapsed from the recording beginning time point at the time point of the present reproduced image and is here represented by a broken line to be distinguished from the seeking position marker 714.

The first time displaying space 716 is a space for displaying the total time of the moving images of the inspection.

The second time displaying space 717 is a space for displaying the elapsed time from the recording beginning time point in the seeking position represented by the seeking position marker 714.

The third time displaying space 718 is a space for displaying the relative time positions from the present reproduced image at the positive and negative time intervals in the seeking position represented by the seeking position marker 714.

The fourth time displaying space 719 is a space for displaying the elapsed time from the recording beginning time point of the present reproduced image.

The frame seeking button 720 is to direct the frame to be sought when the operator pushes down the mouse switch 709a by fitting the mouse cursor 712 within the frame. The ending button 721 is to direct the frame seeking mode to be ended in the same manner.

Then, in S31, the sub-routine not illustrated called "checking the total time of the image" is made. In this sub-routine, the following calculation and display are made. That is to say, where the recording beginning track of the sought inspection is represented by Ts, the recording ending track is represented by Te and the number of frames per second of the moving image is represented by n, $$(Te-Ts)/n$$

is calculated and is displayed in the first time displaying space 716 as the total time of the moving image of the inspection. This value may be displayed as an integer value or may be displayed with a decimal point attached at a proper precision.

Then, in S32, the sub-routine not illustrated called "checking the present reproducing track" is made. In this sub-routine, the following calculation and display are made. That is to say, the command of "Check the track number" is delivered to the video disc recorder apparatus 704 to obtain the track number of the present displayed image. Where this track number is represented by Tc, $$(Tc-Ts)/n$$

is calculated and is displayed in the fourth time displaying space 719 as the lapsed time from the recording beginning time point of the image now being reproduced and displayed.

Then, in S33, the sub-routine not illustrated called "initial setting of the seeking Position" is made. In this sub-routine, the following calculation and display are made. That is to say, the recording beginning time point (0 second) is set as the initial value of the seeking position. The seeking position marker 714 is displayed at the extreme left end on the slider bar 713. Also, "0" is displayed in the second time displaying space 717. Further, $$(Ts-Tc)/n$$

is displayed in the third time displaying space 718 as the time from the present position in the present set seeking position.

Then, in S34, whether the mouse switch 709a is pushed down or not is checked. If it is pushed down, the process is branched to S35. If not, this S34 is repeated.

In the above mentioned S35, the Position of the mouse cursor in case the mouse switch 709a is pushed in the above mentioned S34 is checked and whether it is on the frame seeking button 720 or not is judged. If so, the process is branched to S38. If not so, it is branched to S36.

In S36, the position of the mouse cursor is checked in the same manner as in the above mentioned S35 and whether it is on the slider bar 713 or not is judged. If so, the Process is branched to S41. If not so, it is branched to S37.

In S37, the Position of the mouse cursor is checked the same as in the above mentioned S35 and 36 and whether it is on the ending button 721 or not is judged. If so, the process is branched to S44. If not so, it returns to S34.

In S44, this sub-routine ends and the process moves to the next of the positions called out.

In the above mentioned S35, in case the mouse cursor is judged to be on the frame seeking button 720, in S38, the corresponding track number is calculated from the Present seeking Position. That is to say, where the seeking position set at this time point is represented by Jx (seconds), $$Jx\times n+Ts$$

is calculated and is made the track number Tx.

Then, in S39, the Tx calculated in the above mentioned S38 is made a Parameter and the command of "Seek the track" is delivered to the video disc recorder apparatus 704.

Then, in S40, the time Jx from the top of the present position is displayed in the fourth time displaying space 719 and the process returns to the above mentioned S34.

Also, in the above mentioned S36, in case the mouse cursor is judged to be on the slider bar 713, in S41, the position on the slider bar 713 of the mouse cursor 712 is obtained and the seeking position marker 714 is moved to this position.

Then, in S42, the elapsed time Jx from the recording beginning time point corresponding to the position of the mouse cursor 712 obtained in the above mentioned S41 is displayed in the second time displaying space 717.

Then, in S43, the command of "Check the track number" is delivered to the video disc recorder apparatus 704 to obtain the present track number Tc. The time difference $$Jx-(Tc-Ts)/n$$

between the present position and seeking position is calculated and is displayed in the third time displaying space 18. The process returns to the above mentioned S34.

The seeking process shown in FIG. 44 and the frame seeking process shown in FIG. 45 correspond to the designating means 762 in FIG. 50.

Also, S38 in the frame seeking process in FIG. 45 corresponds to the corresponding making means 762 in FIG. 50 and S39 corresponds to the reproducing means 763 in FIG. 50.

The operations at the time of recording, seeking and reproducing images in this embodiment shall be explained in the following.

First of all, at the time of recording images, when the operator selects "1. Recording mode" in the command menu picture shown in FIG. 46, the recording process in S4 will be made by the flow chart in FIG. 42.

In this recording process, in FIG. 43, the image recording is prepared by S8 to S10 and, in S11, the release on/off signal from the endoscope image inputting apparatus 702 is awaited. Here, when the operator pushes down the releasing switch 701a of the electronic scope apparatus 701, the release on/off signal will be generated and will be transmitted to the host computer 706 through the endoscope image inputting apparatus 702. Then, the process of S11 will end and will proceed to S12. However, at first, as no image is being recorded, the process will branch to S13. In S13, as the recording starting command is transmitted to the video disc recorder apparatus 704, the electronic scope apparatus 701 will image the signal and the moving image recording of the image signal (video signal) input into the video disc recorder apparatus 704 through the endoscope image inputting apparatus 702 will be started. Thereafter, in S11, the release on/off signal is again waited.

Here, if the operator again pushes down the releasing switch 701a of the electronic scope apparatus 701, now that the image is being recorded, the process will branch from S12 to S14, the recording of the image will be stopped by S14 to S17, the data relating to the image recorded at this time will be registered in the data base as shown in FIG. 41 in the inspection A, for example, in FIG. 40.

Also, thereafter, if the re-recording is made, as in the inspection B, for example, in FIG. 40, the data will be registered following the inspection A as shown in FIG. 41 and will be made the same thereafter.

Then, at the time of seeking and reproducing the image, if the operator selects "2. Seeking mode" in the command menu picture shown in FIG. 46, the seeking process of S6 will be made by the flow chart in FIG. 42.

In this seeking process, in S18 in FIG. 44, the inspection A, for example, in FIGS. 40 and 41 is sought from among the already registered inspections. Then, four data registered in the inspection A in FIG. 41 are obtained. In S19, the recording beginning track i among them is made a parameter and the track seeking command is transmitted to the video disc recorder apparatus 704. Then, the first image among the moving images recorded as of the inspection A is reproduced as a still image and is displayed in the second television monitor 705.

In S20, the seeking menu in FIG. 47 is displayed in the computer display 707 and the operator waits for the command to be input.

Here, when the operator inputs the moving picture reproducing command, the reproduction of the moving image from the now reproducing track is starting by S22. That is to say, if this command is carried out immediately after the seeking, from the first of the inspection A, the reproduction of the moving image will be started and the command will be again waited to be input.

When the operator inputs the reproduction stopping command, by S24, the reproduction of the moving image will be stopped and the image at the stopping time point will be displayed as a stopped image.

When the operator inputs the seeking menu ending command, the process will branch to S27. If the moving picture is being reproduced, it will be stopped and then the process will return to S2 in FIG. 42.

When the operator inputs the frame seeking command, the process will branch to S26 and the sub-routine in FIG. 45 will be carried out.

In this FIG. 45, by S30, the frame seeking picture shown in FIG. 48 is displayed in the computer display 707 and, further, by S31 to S33, proper times are displayed in the first to fourth time displaying spaces 716 to 719 in the frame seeking picture.

That is to say, from the recording beginning track i, recording ending track (j−1) and number n of frames per second, for example, of the inspection A, $$((j-1)-i)/n$$

is calculated and is displayed in the first time displaying space 716.

As the initial value of the seeking position is 0 (second), "0" will be displayed in the second time displaying space 717.

The value obtained by multiplying by −1 the time at the time point now showing the reproduction is displayed in the third time displaying space 718.

The time at the now reproducing time point is displayed in the fourth time displaying space 719.

Thereafter, in S34, the operator's command is waited.

Here, when the operator moves the mouse cursor 712 to any position on the slider bar 713 and pushes down the mouse switch 709a, by the process of P41, the seeking position marker 714 will move to the position and, by the processes of S42 and 43, the time from the top of the time corresponding to the now designated position on the slider bar 713 and the time from the image now being displayed will be displayed in the second and third time displaying spaces 717 and 718 so as to be able to be confirmed by the operator. If these are not satisfactory, this process may be repeated any number of times so that any desired position may be set.

Then, if the operator moves the mouse cursor 712 onto the seeking button 720 and pushes down the mouse switch 709a, by the processes of S38 and S39, the still image corresponding to the prior designated seeking position will be sought in the track and will be displayed in the second television monitor 705.

If the operator moves the mouse cursor 712 onto the ending button 721 and pushes down the mouse switch 709a, by S44, the process will return to S20 in FIG. 44.

As explained above, according to this embodiment, in case the recorded moving image is to be reproduced and observed by the operator or, for example, even in case the image after the lapse of a predetermined time from the recording beginning time point is wanted to be observed or the image after the lapse of a predetermined time from the now displayed image is wanted to be observed, it will not be necessary to make such complicated operations as calculating and inputting the respective track numbers of the video disc and, by a very simple operation, any desired image can be positively and quickly selected out to be observed.

By the way, in this embodiment, as an endoscope image outputting means, the electronic scope apparatus is used but a fiber-scope and an endoscope externally fitted television camera to be fitted to this fiber-scope in the eyepiece part may be used.

Also, in this embodiment, the frame recording video disc recorder apparatus is used but a field recording one may be used and, in this case, about twice as many image recording sheets (time) can be expected.

Also, in FIG. 48, the slider bar 713 may have a scale at intervals, for example, of 10 seconds to be displayed so that the designation of the seeking position by the operator may be more convenient.

Figure 51:
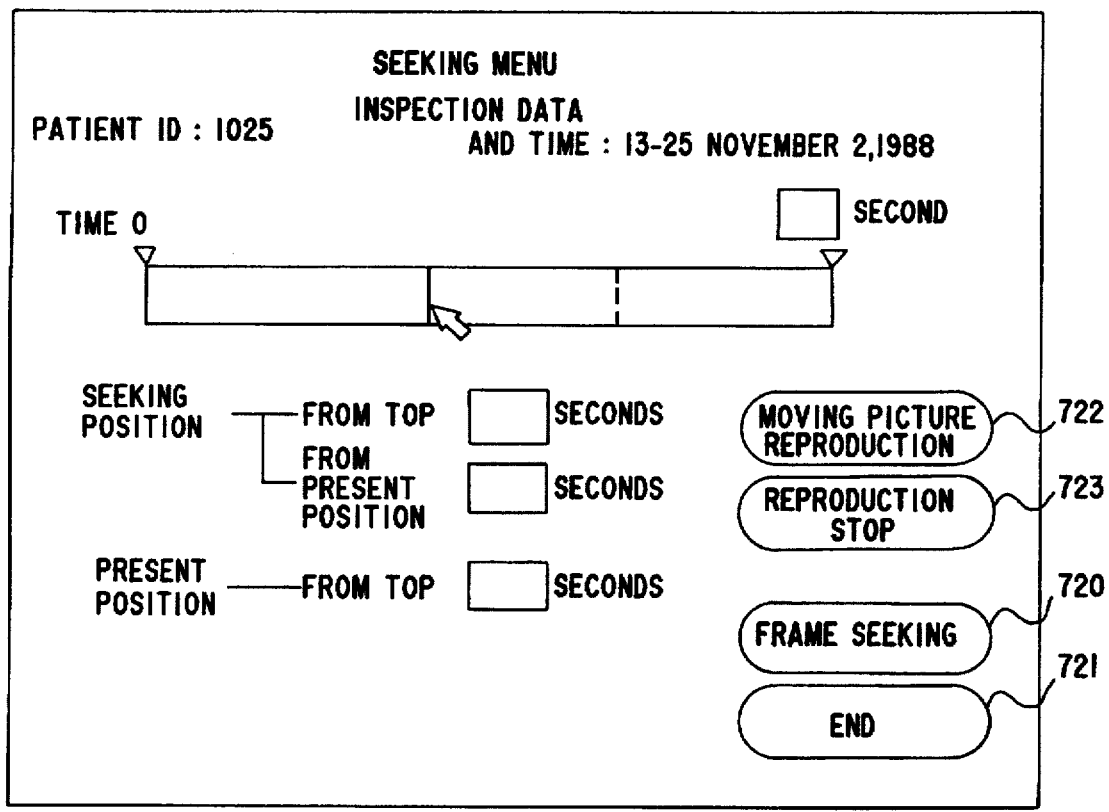

The seeking menu picture and frame seeking picture in FIGS. 47 and 48 are made respectively separate but may be formed as the same picture as shown in FIG. 51 in which the moving picture reproducing button 722 corresponding to "Moving picture reproduction" in FIG. 47 and the reproduction stopping button 723 corresponding to "Reproduction stop" in FIG. 47 are added to the picture in FIG. 48. In the program in this case, for example, when the frame seeking is directed while the moving picture is being reproduced, the moving picture reproduction will be suspended and then the track seeking will be made or such simple change as changing the timing of the picture displaying process may be made and shall not be particularly described.

The slider bar 713 is made band-like but may be of any variable form which can attain the same object.

Also, the markers are distinguished by the solid lines and broken lines but may be variously distinguished such as by colors.

Not only the mouse but also a track ball, joystick, digitizer and touch panel can be applied to obtain substantially the same operability.

Figure 52:
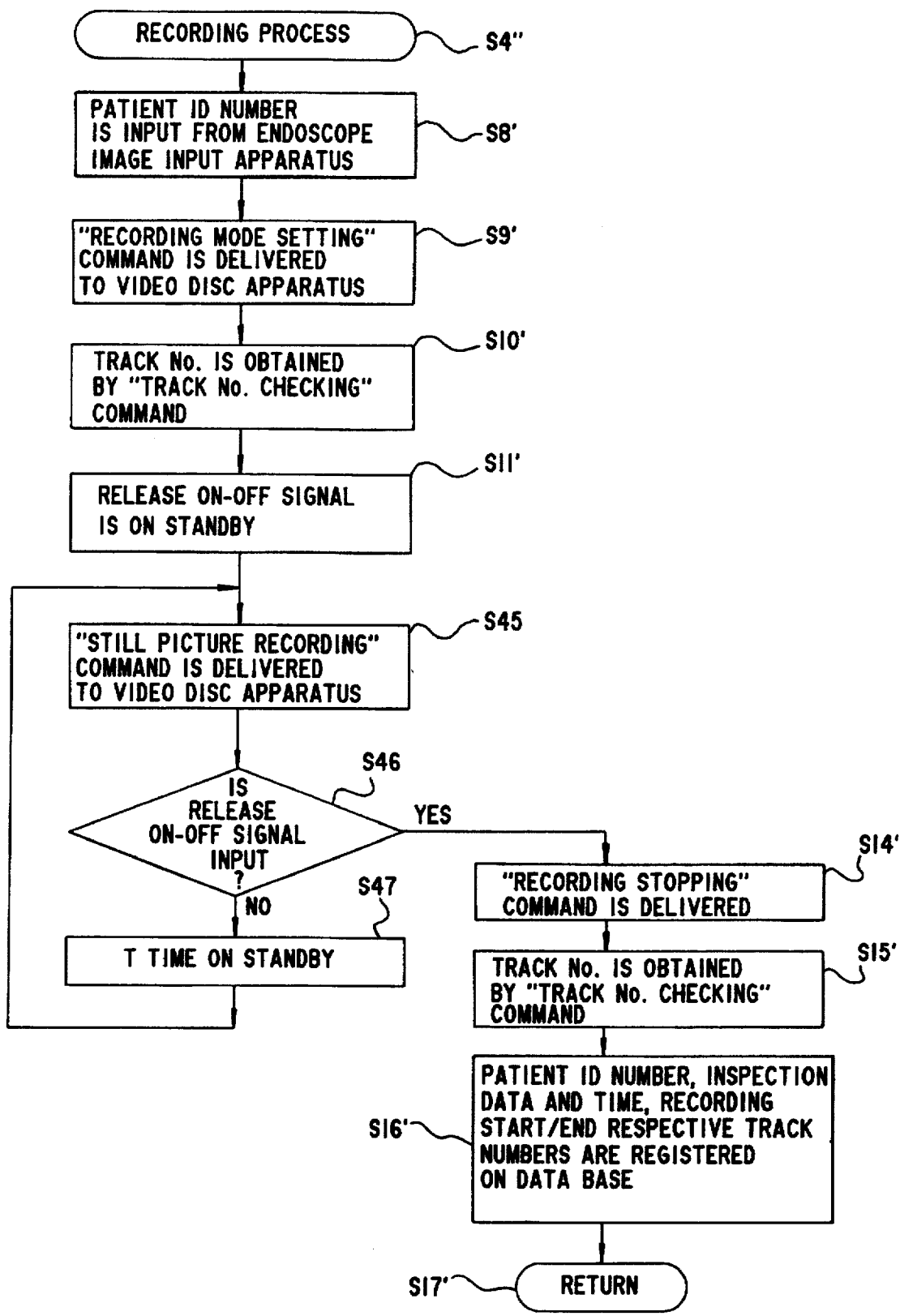
FIG. 52 is a flow chart showing the record processing in the ninth embodiment of the present invention.

FIG. 52 shows the ninth embodiment of the present invention.

Whereas a moving picture of 30 frames per second is recorded in the eighth embodiment, an image is recorded, sought and reproduced continuously at longer time intervals in this embodiment.

The formation of this embodiment is substantially the same as of the eighth embodiment, is different in the flow chart in FIG. 43 and is only different in respect that, whereas the number n of frames per second is 30 in the explanation of the eighth embodiment, the predetermined number is smaller in this embodiment. That is to say, exactly the same formation can be applied on FIGS. 39 to 42 and 44 to 50 which shall not be explained.

In the eighth embodiment, as the recording process in S4 in FIG. 42, the sub-routine in FIG. 43 is carried out, whereas, in this embodiment, as the recording process, the sub-routine shown in FIG. 52 is carried out.

The flow chart in FIG. 52 shall be explained in the following.

In S4", when the recording process is started, S8' to S11' will be made the same as in S8 to S11 in FIG. 43.

Then, in S45, the command of "Record the still picture" is delivered to the video disc recorder apparatus 704.

Then, in S46, whether the release on/off signal is present or not is checked. If it process will be bran process will be branched to S47. If it is received, the process will be branched to S14'.

In the above mentioned S47, the process is waited for a fixed time T and returns to the above mentioned S45.

On the other hand, in the above mentioned S46, if the release on/off signal is received, the above mentioned S14' to S17' will be made the same as in S14 to S17 in FIG. 43.

Also, the frame number n per second which is 30, for example, in the eighth embodiment is here as follows:

n=1/T.

The operation of this embodiment shall be explained in the following.

In this embodiment, the recording process is made by the flow chart shown in FIG. 52 as follows.

In S8' to S10', the same recording Preparation as in the eighth embodiment is made and, in S11', the release on/off signal is awaited. Here, if the operator pushes down the releasing switch 701a of the electronic scope apparatus 701, the process will proceed to P45.

In S45, the video disc recorder apparatus 704 records one frame of the input image (video) signal and advances the head to the next track. In S47, the process is on standby for a predetermined time and then advances again to S45. One frame of the next image is recorded and this recording operation is repeated until the operator pushes down the releasing switch 701a of the electronic scope apparatus 701, the release on/off signal is received and the operation is checked in S46. That is to say, the still images are continuously recorded at the intervals of T (seconds).

When the release on/off signal is received, then in the same manner as in S14 to S17 in the eighth embodiment, the recorded images and accompanying data will be registered in the data base to end the recording process.

Also, the seeking process in this embodiment is the same as in the first embodiment except that it is carried out with n=1/T.

As explained above, according to this embodiment, as the recording is made continuously at the frame time intervals longer than of the so-called moving picture, there are effects that, for example, in case the same part is imaged and recorded continuously for several minutes and is later observed on the basis of the lapse of time, a sufficient number of images will be obtained and the number of the recorded images will be able to be greatly reduced.

The other formations, operations and effects are the same as in the eighth embodiment.

By the way, in this embodiment, the time interval of the continuously recorded frame is made a fixed time T but may be made, for example, variable. That is to say, the operator may freely set this time interval prior to the recording start, this set value may be added to the data of the respective inspections so as to be registered and, in the case of seeking the frame, if the respective calculations are made by using the number of frames per second obtained from the time intervals registered in the data base, the frame will be able to be easily sought.

In this case, there is an effect that a freer recording and observation can be made.

Also, the technical idea shown in the publication, for example, of Japanese patent application laid open No.43279/ 1987, that is, the technical idea that, in the case of reproducing a plurality of continued images, the images will be continuously reproduced at the same time intervals as in being recorded may be in applied to the case of reproducing the moving picture this embodiment.

Figure 53:
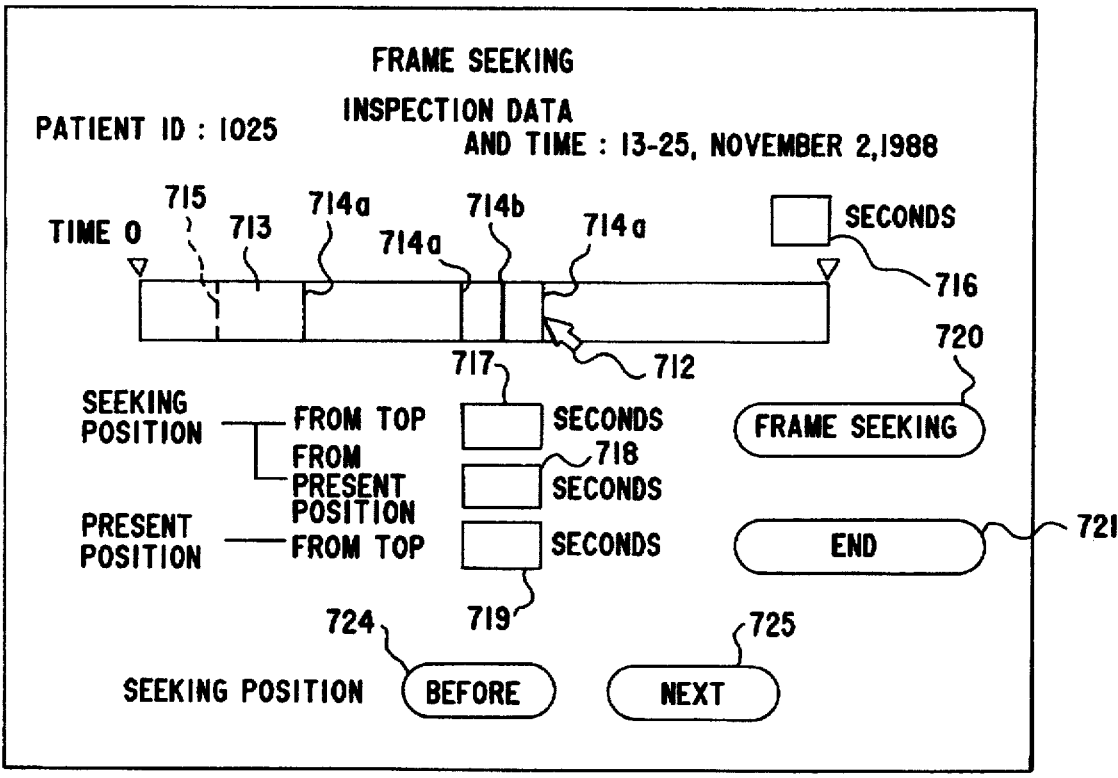
FIG. 53 is an explanatory view showing a computer display picture at the time of frame seeking in the tenth embodiment of the present invention.

FIG. 53 shows the tenth embodiment of the present invention.

In this embodiment, a plurality of seeking positions in the case of seeking frames can be simultaneously designated and the images corresponding to the respective designated positions can be switched and displayed.

FIG. 53 is a picture of the frame seeking designating a plurality of seeking positions. The other formations are substantially the same as in the eighth embodiment and shall not be explained.

The picture shown in FIG. 53 is to substitute the one shown in FIG. 48 and is different in the particulars. That is to say, the seeking position marker 714 in FIG. 48 can be designated here to be plural as the first seeking position marker 714a and second seeking position marker 714b. Either is designated as a seeking position by the mouse 709. The second seeking position marker 714b has the marker line made particularly thicker than the other so as to be distinguished and show that, when the mouse switch 709a is pushed down with the frame seeking button 720 at this time point, the frame corresponding to this second seeking position marker 714 will be sought, reproduced and displayed.

Also, in this picture, the seeking position "front" button 724 and seeking position "next" button 725 are provided to switch respectively first and second seeking position markers so that, when the above mentioned seeking position "front" button 724 is fitted to the mouse 709 and the mouse switch 709a is pushed down, the position which is now of the second seeking position marker 714b will be switched to the first seeking position marker 714a and the first seeking position marker 714a just before it will be switched to the second seeking position marker 714b. In the same manner, the seeking position "next" button 725 acts to move the second seeking position marker 714b to the position of the first seeking position marker 714a just after it. Unless the position just before (just after) the corresponding position is designated, either button will do nothing.

In this embodiment, in case the operator has images sought and displayed, a plurality of seeking positions will be designated in advance and the respective images corresponding to them will be observed while sequentially switching those positions.

Thus, according to this embodiment, as a plurality of images designated in advance can be switched and displayed, in comparing and inspecting the images, the images seen before can be sought and reproduced again so soon that the efficiency is high.

By the way, the number of the seeking position markers may be limited so that, when the number is exceeded, no new ones will be able to be designated or the marker designated first among them will be erased and a new position will be designated.

Also, all the seeking positions may be cleared and initialized.

The time display showing the seeking position may be switched to any marker.

The other formations, operations and effects are the same as in the eighth embodiment.

Figure 54:
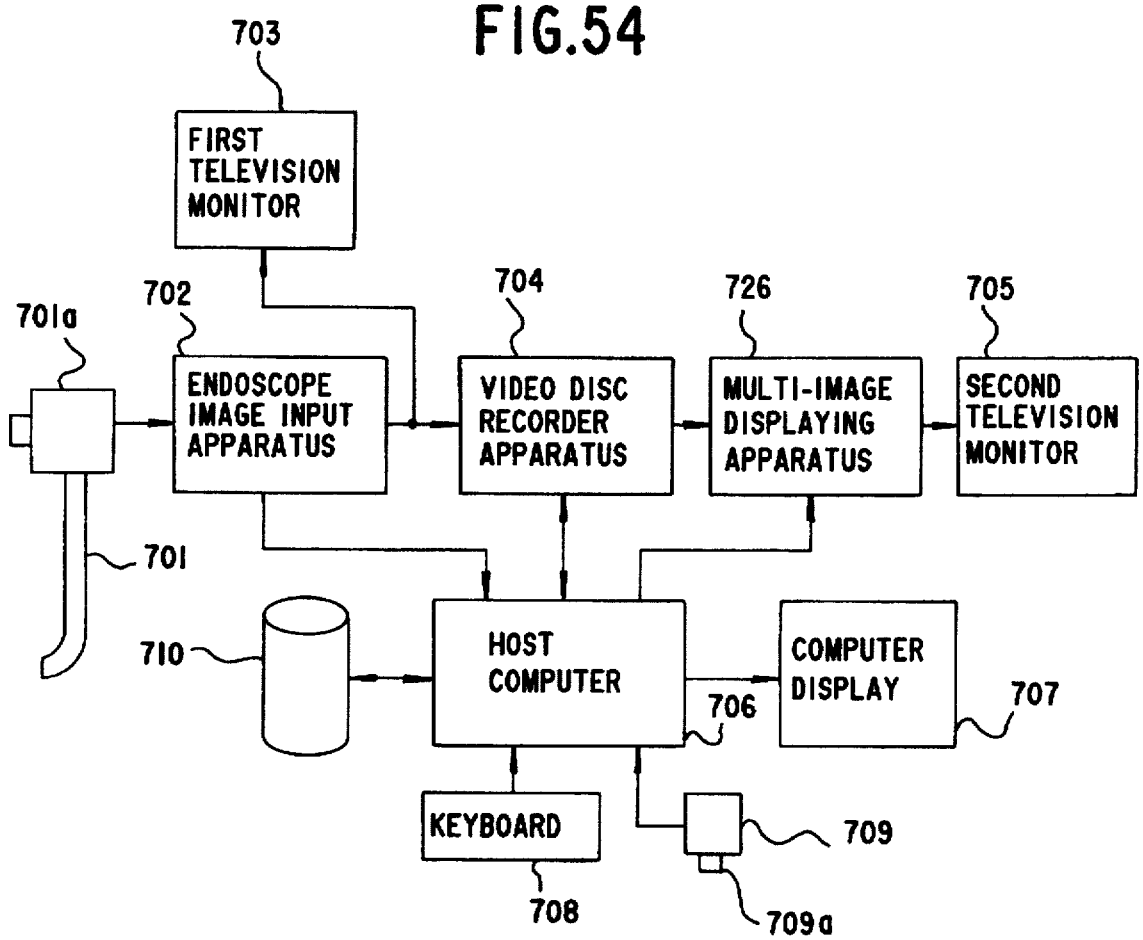
FIGS. 54 and 55 relate to the 11th embodiment of the present invention.
Figure 55:
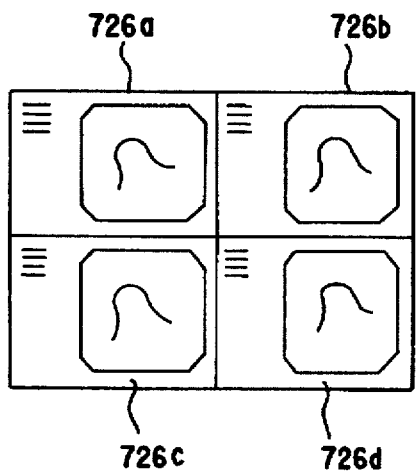

FIGS. 54 and 55 show the 11th embodiment of the present invention.

In the tenth embodiment, a plurality of simultaneously designated images are switched and displayed, whereas, in this embodiment, those plural designated images can be simultaneously observed.

As shown in FIG. 54, the formation of this embodiment is substantially the same as in FIG. 39 but is only different in respect that the multi-picture displaying apparatus 726 is added between the video disc recorder apparatus 704 and second television monitor 705.

The above mentioned multi-picture displaying apparatus 726 can be simply realized by applying the technique shown in the sixth embodiment so that the input image signal may be processed to be condensed, a plurality of these condensed images may be recorded in the frame memory and the plural images on the same picture may be simultaneously displayed.

FIG. 55 shows an example of a picture displayed in the second television monitor 705 by using this multi-picture displaying apparatus 726 and therein four pictures condensed respectively to be ¼ in the size are displayed in the positions, respectively, of 726a to 726d.

This multi-picture displaying apparatus 726 is connected to the host computer 706 so that the designated image designation, designating position and switching of the outputs of the ordinary image and multi-displayed image may be controlled from the host computer 706.

The other formations of this embodiment are substantially the same as of the tenth embodiment and shall not be explained.

In the tenth embodiment, the images corresponding to the plural designated positions are sequentially switched and displayed, whereas, in this embodiment, those images are integrally displayed. Also, the multi-picture display and ordinary image display are switched and displayed.

Thus, according to this embodiment, a plurality of images can be simultaneously displayed and therefore the variation and the like of the affected part with the lapse of time can be conveniently observed. If the ordinary image is displayed, the observation of the particulars will not be disturbed.

By the way, in FIG. 55, the images are displayed in the four-divided picture but may be in a nine-divided or 16-divided picture and the sizes of the respective condensed images to be displayed may be different from each other.

The other operations and effects are the same as in the tenth embodiment.

By the way, in the eighth to 11th embodiments, such modifications as are shown in FIGS. 56 to 58 can be made.

FIG. 56 is a view for explaining another method of designating a plurality of seeking positions and shows a slider bar 713.

In this example, as in FIG. 56(a), two points on the slider bar 713 are shown by the seeking position markers 714, as in FIG. 56(b), the part between them is divided, for example, into 8 equal parts, the dividing positions are made seeking position markers 714 and a total of 9 positions arranged at fixed time intervals can be simply and quickly designated. According to this example, for example, when the time point at which the variation with the time of the patient begins to occur and the time point at which it ends are designated, the images at regular time intervals between them will be able to be simply obtained and will be convenient to observe the variations.

FIG. 57 is a view for explaining another method of designating also a plurality of seeking positions and shows a slider bar 712.

In this example, some time intervals are set in advance, as in FIG. 57(a), a seeking position marker 714 is designated at one point on the slider bar 713 and thereby, as in FIG. 57(b), the seeking position at each designated time after the marker can be automatically designated by the seeking position marker 714.

According to this method, when only one point is designated, the images in some later time range will be able to be observed at uniform time intervals and therefore, in case a noted part is in a part, for example, within the recorded entire image, it will be quickly located to be convenient.

By the way, here the seeking position is automatically designated after the designated seeking position but may be automatically designated before and after that.

FIG. 58 is a view for explaining a method of finely designating frames. FIG. 58(a) shows a slider bar 713 and FIG. 58(b) shows frame designating frames 727.

The above mentioned frame designating frames 727 represent the frames before and after the image corresponding to the seeking position marker 714 in FIG. 58(a) and frame unit frames 727a to 727j represent respective frames.

In this example, as in FIG. 58(a), after the seeking positions are designated, if the frames are actually sought, as in FIG. 58(b), the frame designating frames 727 will be displayed, when the mouse cursor 712 is moved by the mouse 709 and one of the frame unit frames 727a to 727j is designated, this designated frame will be displayed and, when the other frame unit frames 727a to 727j are sequentially designated, they will be able to be freely displayed.

According to this method, any image can be selected and displayed from among the images (frames) substantially at the same time. Therefore, even when the image corresponding, for example, to the designated seeking position is so dull as not to be adapted for observation, a substitute image will be soon obtained to be convenient.

As explained above, according to the eighth to 11th embodiments, the input images are recorded as a series of plural images ordered with a predetermined time relation, a specific time for the time of all of this series of plural images is designated so that a specific image corresponding to that time may be reproduced and therefore there are effects that the images recorded as time-serially ordered can be controlled, the labor of the operator can be kept minimum and any desired image can be positively and quickly selected out.

What is claimed is:

1. An image filing system for recording a video signal to be retrievable comprising:

a time-serial image filing means for recording a video signal as it is as a time-serial image based on record start and stop signals;

a still image producing means for temporarily storing a video signal and obtaining a still image;

a still image filing means for recording a still image output from said still image producing means based on a release signal; and an image data recording means, operably coupled to said time-serial image filing means and to said still image filing means, for recording data on images in which a still image and a time-serial image recorded in said still image filing means and a time-serial image filing means, respectively, in common are made to correspond to each other, wherein said image data recording means records data corresponding to recording characteristics of said still image and said time-serial image which relate to each other.

2. An image filing system according to claim 1, wherein said data on images in which a still image and a time-serial image recorded by said still image filing means and said time-serial image filing means, respectively, are made to correspond to each other indicate a release time of a recorded still image.

3. An image filing system according to claim 1, wherein said data on images in which a still image and a time-serial image recorded by said still image filing means and said time-serial image filing means, respectively, are made to correspond to each other indicate a time-serial address for a still image recorded in said still image filing means.

4. An image filing system according to claim 1, wherein said data on images in which a still image and a time-serial image recorded in said still image filing means and said time-serial image filing means, respectively, are made to correspond to each other indicate a number of a still image in which release is performed when the release of the still image is performed while a time-serial image is recorded.

5. An image filing system for recording a video signal to be retrievable comprising:

a time-serial image filing means for recording a video signal as it is as a time-serial image;

an image memory for temporarily storing a video signal and obtaining a still image;

a still image filing means for recording a still image output from said image memory;

a data input means for obtaining record start and record stop signals and supplying these signals to said time-serial image filing means and at that time, for setting the beginning and end of said time-serial image recorded by said time-serial image filing means, said data input means for obtaining a release signal and supplying said release signal to said still image filing means and setting a still image to be recorded by said still image filing means; and an image data recording means, operably coupled to said time-serial image filing means and to said still image filing means, for recording data on images in which a still image and a time-serial image recorded in said still image filing means and said time-serial image filing means, respectively, in common are made to correspond to each other, wherein said image data recording means records data corresponding to recording characteristics of said still image and said time-serial image which relate to each other.

6. An image filing method, comprising the steps of: recording video signals as a time-serial image in a time-serial image filing apparatus and recorded as a still image in a still image filing apparatus recording data on images in which a still image and a time-serial image recorded in said still image filing apparatus and said time-serial image filing apparatus, respectively, in common are made to correspond to each other; and retrieving said video signal, wherein the step of recording said video signals comprises the step of recording data corresponding to recording characteristics of said still image and said time-serial image which relate to each other.

7. An image filing system for recording a video signal to be retrievable comprising:

an image input apparatus having an image processing pan for convening an electric signal supplied from an imaging apparatus, which imaged an object, and photoelectrically converted into a video signal and for superimposing data related to said object on said video signal, a data input pan for inputting and producing a control signal for recording said data related to said object and an image of said object, an image memory selectively causing one of: (a) said video signal obtained by said image processing pan to be passed through without change based on the control signal by said data input part and (b) storing and outputting the video signal as a still image, and an interface for inputting and outputting said data related to said object and said control signal;

a time-serial image filing apparatus for recording a time-serial image by said image input apparatus;

a still image filing apparatus for recording a still image by said image input apparatus; and an image file controller, operably coupled to said time-serial image filing apparatus and to said still image filing apparatus, including a first port, CPU, a memory part for temporarily storing data related to record of an image recorded in said CPU, said still image filing apparatus and said time-serial image filing apparatus during an examination, a record apparatus controlling pan for controlling a record apparatus, a second port for inputting and outputting a control signal related to a time-serial image filing apparatus, including record start and record stop signals, and a third port for inputting and outputting a control signal related to a still image filing apparatus, including a release signal, said first port for inputting and outputting data and a control signal to and from said interface of said image input apparatus and inputting and outputting data and a control signal among said CPU, said memory part, said record apparatus controlling part, said second port, and said third port, when the control signal input to said first port is one of record start and record stop signals, said CPU having a function of sending the control signal to said time-serial image filing apparatus through said second port and recording a time-serial image based on the record start and stop signals, when the control signal input to said first port is a release signal, said CPU having a function of sending the release signal to said still image filing apparatus through said third port and recording a still image based on the release signal, and further storing data on images temporarily recorded in said memory part which are made to correspond to said still image and time-serial image that are recorded in a recording apparatus through said record apparatus controlling part, wherein said image file controller controls data corresponding to recording characteristics of said still image and said time-serial image which relate to each other.

8. An image filing system according to claim 7, wherein said image file controller has a video signal distributing part for receiving a video signal from an image memory of said image input apparatus and for supplying said video signal, as a time-serial image signal, to said time-serial image filing apparatus and for further supplying said video signal, as a still image signal, to said still image filing apparatus through said memory part.

9. An image filing system according to claim 7, wherein said image input apparatus supplies retrieval instructions to said first port, and wherein said CPU refers to data stored in said memory part and sends a retrieval control signal to said second or third port and outputs a video signal retrieved from the still image filing apparatus or the time-serial image filing apparatus to a monitor when retrieval instructions from said image input apparatus is input to said first port.

10. An image filing system according to claim 7, wherein said CPU stores data on images temporarily recorded in said memory part to correspond to said still image and said time-serial image that are recorded in a recording apparatus.

* * * * *